(12) United States Patent
Park et al.

(10) Patent No.: US 11,532,957 B2
(45) Date of Patent: Dec. 20, 2022

(54) METHOD AND APPARATUS FOR PERFORMING POWER CALIBRATION IN WIRELESS POWER TRANSFER SYSTEM

(71) Applicant: LG Electronics Inc., Seoul (KR)

(72) Inventors: Yongcheol Park, Seoul (KR); Gyunghwan Yook, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/313,572

(22) Filed: May 6, 2021

(65) Prior Publication Data

US 2021/0265875 A1    Aug. 26, 2021

Related U.S. Application Data

(63) Continuation of application No. 16/938,546, filed on Jul. 24, 2020, now Pat. No. 11,031,829, which is a
(Continued)

(30) Foreign Application Priority Data

Mar. 25, 2019 (KR) .................. 10-2019-0033895
May 16, 2019 (KR) .................. 10-2019-0057363
(Continued)

(51) Int. Cl.
*H02J 50/80* (2016.01)
*H02J 50/60* (2016.01)
*H02J 50/40* (2016.01)

(52) U.S. Cl.
CPC .............. *H02J 50/80* (2016.02); *H02J 50/40* (2016.02); *H02J 50/60* (2016.02)

(58) Field of Classification Search
CPC .. H02J 50/80; H02J 50/40; H02J 50/60; H02J 50/12; H02J 50/10
See application file for complete search history.

(56) References Cited

U.S. PATENT DOCUMENTS 11,342,799 B2 *  5/2022 Yang ................. H02J 50/10
2012/0306284 A1 * 12/2012 Lee .................. H04B 5/0037
                                                           307/104
(Continued)

FOREIGN PATENT DOCUMENTS

CN        104704710        6/2015
EP         2909917         8/2015
(Continued)

OTHER PUBLICATIONS

EP extended European search report, in European Appln. No. 20743047.1, dated Dec. 17, 2020, 9 pages.
(Continued)

*Primary Examiner* — Daniel Cavallari
(74) *Attorney, Agent, or Firm* — Fish & Richardson P.C.

(57) ABSTRACT

A wireless power transmitter including a power conversion unit configured to transmit wireless power generated based on magnetic coupling in a power transfer phase and a control unit configured to receive, from the wireless power receiver operating at a first operating point, a first received power packet of the first operating point and a second received power packet of the first operating point based on the first received power packet of the first operating point and the second received power packet of the first operating point and configured to receive a first received power packet of the second operating point and a second received power packet of the second operating point related to power calibration and construct a second power calibration curve based on the first received power packet of the second operating point and the second received power packet of the second operating point.

11 Claims, 42 Drawing Sheets

Power Receiver to Power Transmitter data stream

Power Transmitter to Power Receiver data stream

Related U.S. Application Data continuation of application No. PCT/KR2020/004072, filed on Mar. 25, 2020.

(30) Foreign Application Priority Data

Jun. 13, 2019 (KR) .................. 10-2019-0070057
Jun. 18, 2019 (KR) .................. 10-2019-0072096

(56) References Cited

U.S. PATENT DOCUMENTS

2015/0263532 A1  9/2015  Van Wageningen
2019/0052128 A1  2/2019  Van Wageningen et al.

FOREIGN PATENT DOCUMENTS

| | | |
|---|---|---|
| JP | 2015535168 | 12/2015 |
| JP | 2017070074 | 4/2017 |
| JP | 2017511109 | 4/2017 |
| JP | 2020516215 | 5/2020 |
| KR | 20110074761 | 7/2011 |
| KR | 20140114924 | 9/2014 |
| KR | 20160142927 | 12/2016 |
| KR | 20180027104 | 3/2018 |
| WO | WO2014060871 | 4/2014 |
| WO | WO2018093099 | 5/2018 |

OTHER PUBLICATIONS

Office Action in Japanese Appln. No. 2020-544732, dated Oct. 12, 2021, 5 pages (with English translation).
Notice of Allowance in Japanese Application No. 2020-544732, dated May 31, 2022, 4 pages (with English translation).
Office Action in Korean Application No. 10-2020-7025285, dated May 27, 2022, 10 pages (with English translation).

* cited by examiner

FIG. 3b

|  | b7 | b6 | b5 | b4 | b3 | b2 | b1 | b0 |
|---|---|---|---|---|---|---|---|---|
| Byte 0 | colspan="8" Application Profile |
| Byte 1 | Version |||||||||
| Byte 2-N-1 | Profile-specific data |||||||||

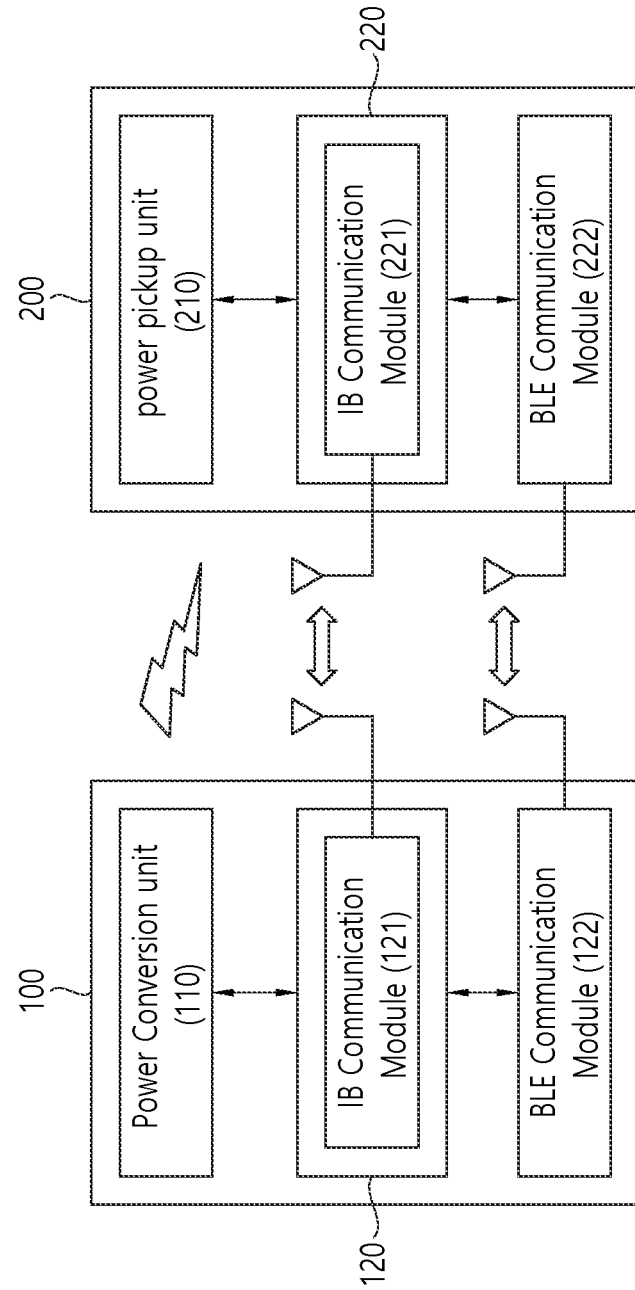

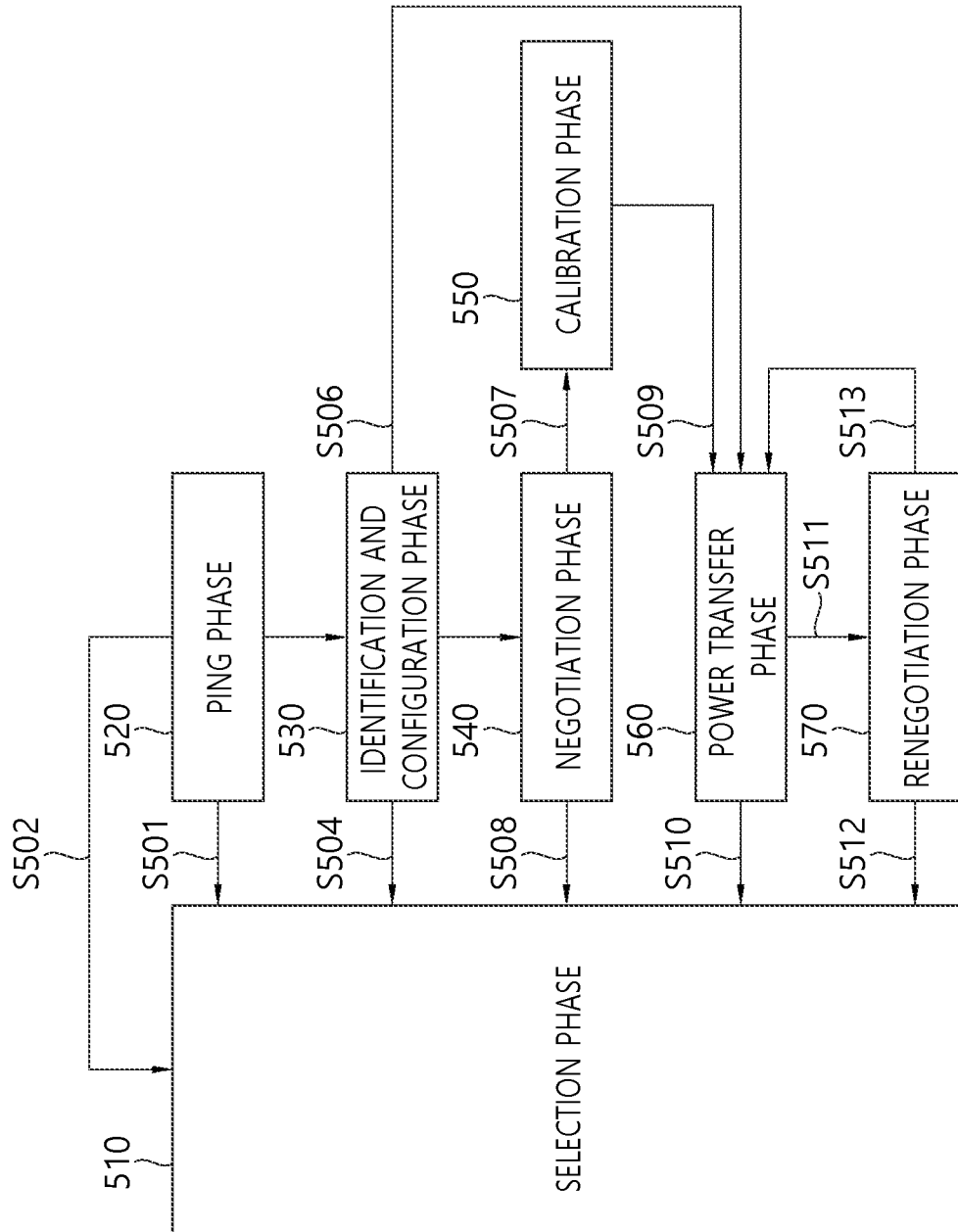

FIG. 10

| Preamble | ZERO | Response | Type | Info | Parity |

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 12

| | b7 | b6 | b5 | b4 | b3 | b2 | b1 | b0 |
|---|---|---|---|---|---|---|---|---|
| B0 | Certificate Structure Version ||||||||
| B1 | Reserved |||| Certificate Type ||||
| B2 | Signature Offset ||||||||
| B3 ... B11 | MSB Serial Number LSB ||||||||
| B12 ... B17 | Issuer ID ||||||||
| B18 ... B23 | Subject ID ||||||||
| B24 ... B56 | Public Key ||||||||
| --- | Future extensions may have additional field in this area ||||||||
| B signature_offset ... B signature_offset+63 | Signature ||||||||

FIG. 13

| | b7 | b6 | b5 | b4 | b3 | b2 | b1 | b0 |
|---|---|---|---|---|---|---|---|---|
| B0 | Power Class | | Guaranteed Power Value | | | | | |
| B1 | Reserved | | | Potential Power Value | | | | |
| B2 | AI | AR | OB | Reserved | | | WPID | Not Res Sens |

FIG. 14

| | b7 | b6 | b5 | b4 | b3 | b2 | b1 | b0 |
|---|---|---|---|---|---|---|---|---|
| B0 | Power Class | | Maximum Power value | | | | | |
| B1 | Reserved | | | | | | | |
| B2 | Prop | AI | AR | OB | ZERO | | Count | |
| B3 | Window Size | | | | | | Window Offset | |
| B4 | Neg | Polarity* | Depth* | | | | Reserved | |

FIG. 17

|  | $b_7$ | $b_6$ | $b_5$ | $b_4$ | $b_3$ | $b_2$ | $b_1$ | $b_0$ |
|---|---|---|---|---|---|---|---|---|
| $B_0$ | \multicolumn{5}{c|}{Reserved} | | | Mode | |
| $B_1$ | (msb) | | | | | | | |
| $B_2$ | \multicolumn{8}{c|}{Estimated Received Power Value (lsb)} | | | | | | | | |

FIG. 24

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | Reserved ||| Re-ping time |||||

METHOD AND APPARATUS FOR PERFORMING POWER CALIBRATION IN WIRELESS POWER TRANSFER SYSTEM

CROSS-REFERENCE TO RELATED APPLICATION

This application is a continuation of U.S. application Ser. No. 16/938,546, filed on Jul. 24, 2020, which is a continuation pursuant to 35 U.S.C. § 119(e) of International Application PCT/KR2020/004072, with an international filing date of Mar. 25, 2020, which claims the benefit of Korean Patent Application Nos. 10-2019-0033895 filed on Mar. 25, 2019, 10-2019-0057363 filed on May 16, 2019, 10-2019-0070057 filed on Jun. 13, 2019 and 10-2019-0072096 filed on Jun. 18, 2019 the contents of which are hereby incorporated by reference herein in their entirety.

BACKGROUND OF THE DISCLOSURE

Field of the Disclosure

The present disclosure relates to wireless charging and, more particularly, to an apparatus and method for performing power calibration in a wireless power transfer system.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

The wireless power transmitter and the wireless power receiver include various circuit components therein and configure independent devices, but since wireless power is transmitted therebetween by magnetic coupling, the wireless power transmitter and the wireless power receiver configure a single wireless power transfer system. However, there may be an error between transmitted power and reception power due to a change in magnetic coupling based on actual usage environments of the transmitter (Tx) and the receiver (Rx) (magnitudes, frequencies, and duty cycles of signals applied to the wireless power transfer system, distances/position alignment between the transmitter and the receiver, etc.). Such an error may be an obstacle to elaborate foreign object detection (FOD).

Therefore, there is a need for a method for calibrating transmitted power and reception power by reflecting unique characteristics of the wireless power transfer system and changes in an actual usage environment and performing more elaborate FOD based thereon.

SUMMARY OF THE DISCLOSURE

The present disclosure provides an apparatus and method for performing power calibration in a wireless power transfer system.

The present disclosure also provides an apparatus and method for adaptively calibrating power in response to a load change and performing foreign object detection (FOD).

The present disclosure also provides an apparatus and method for adaptively calibrating power in response to a change in magnetic coupling between a wireless power transmitter and a wireless power receiver and performing FOD.

Technical objects to be achieved by the present disclosure are not limited to the aforementioned technical objects, and other technical objects not described above may be evidently understood by a person having ordinary skill in the art to which the present disclosure pertains from the following description.

In an aspect, a wireless power transmitter includes: a power conversion unit configured to transmit, to a wireless power receiver, wireless power generated based on magnetic coupling in a power transfer phase; and a communication/control unit configured to receive, from the wireless power receiver, a first received power packet and a second received power packet related to power calibration and construct a first power calibration curve based on the first received power packet and the second received power packet and configured to receive, from the wireless power receiver, a third received power packet and a fourth received power packet related to power calibration and construct a second power calibration curve based on the third received power packet and the fourth received power packet.

In another aspect, a wireless power receiver includes: a power conversion unit configured to receive, from a wireless power transmitter, wireless power generated based on magnetic coupling in a power transfer phase; and a communication/control unit configured to transmit, to the wireless power transmitter, a first received power packet and a second received power packet related to power calibration in a first operating mode and configured to transmit, to the wireless power transmitter, a third received power packet and a fourth received power packet related to power calibration in a second operating mode.

In another aspect, a wireless power transmitter includes: a power conversion unit configured to transmit, to a wireless power receiver, wireless power generated based on magnetic coupling in a power transfer phase; and a communication/control unit configured to receive, from the wireless power receiver operating at a first operating point, a first received power packet of the first operating point and a second received power packet of the first operating point related to power calibration and construct a first power calibration curve based on the first received power packet of the first operating point and the second received power packet of the first operating point and configured to receive, from the wireless power receiver operating at a second operating point, a first received power packet of the second operating point and a second received power packet of the second operating point related to power calibration and construct a second power calibration curve based on the first received power packet of the second operating point and the second received power packet of the second operating point.

In another aspect, a wireless power receiver includes: a power conversion unit configured to receive, from a wireless power transmitter, wireless power generated based on magnetic coupling in a power transfer phase; and a communication/control unit configured to operate at a first operating point and to transmit, to the wireless power transmitter, a first received power packet of the first operating point and a second received power packet of the first operating point related to power calibration and configured to transmit, to the wireless power transmitter, a first received power packet of a second operating point and a second received power packet of the second operating point related to power calibration when an operating power is switched from the first operating point to the second operating point.

Other specific matters of the present disclosure are included in the detailed description and drawings.

Advantageous Effects

Transmission power and reception power are calibrated by adaptively responding to a newly changed wireless charging environment and power loss is detected based thereon, thereby enabling more sophisticated FOD.

The effects according to the present disclosure is not limited by the contents exemplified above, and more various effects are included in the present disclosure.

BRIEF DESCRIPTION OF THE DRAWINGS

FIG. 3B shows an example of a WPC NDEF in a wireless power transfer system.

FIG. 4D is a block diagram illustrating a wireless power transfer system using BLE communication according to another example.

FIG. 5 is a state transition diagram for describing a wireless power transfer procedure.

FIG. 10 is a structure of a sync pattern according to an exemplary embodiment of the present disclosure.

FIG. 12 is a block diagram showing a wireless charging certificate format according to an exemplary embodiment of the present disclosure.

FIG. 13 is a capability packet structure of a wireless power transmitter according to an exemplary embodiment of the present disclosure.

FIG. 14 is a configuration packet structure of a wireless power receiver according to an exemplary embodiment of the present disclosure.

FIG. 17 is a format of a received power packet according to an example.

FIG. 24 shows the format of a re-ping packet according to an example.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
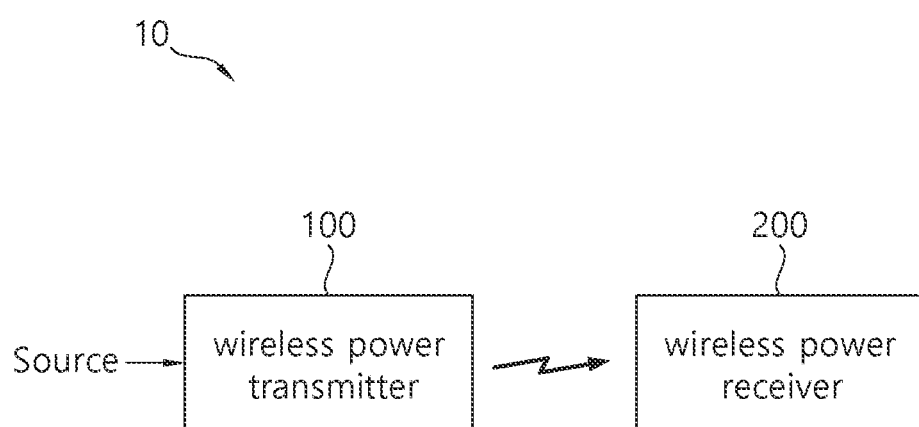
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
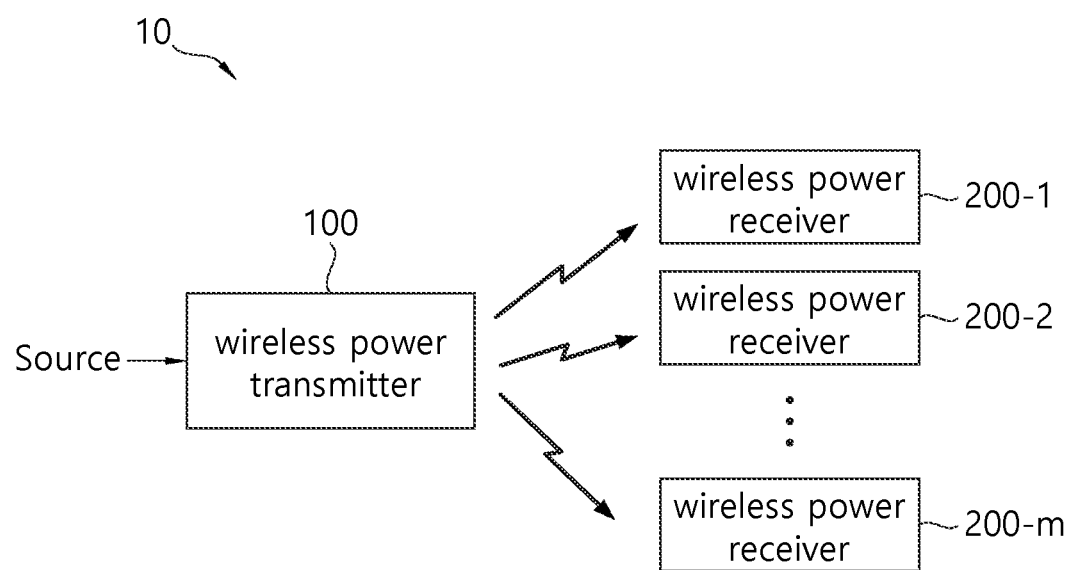
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
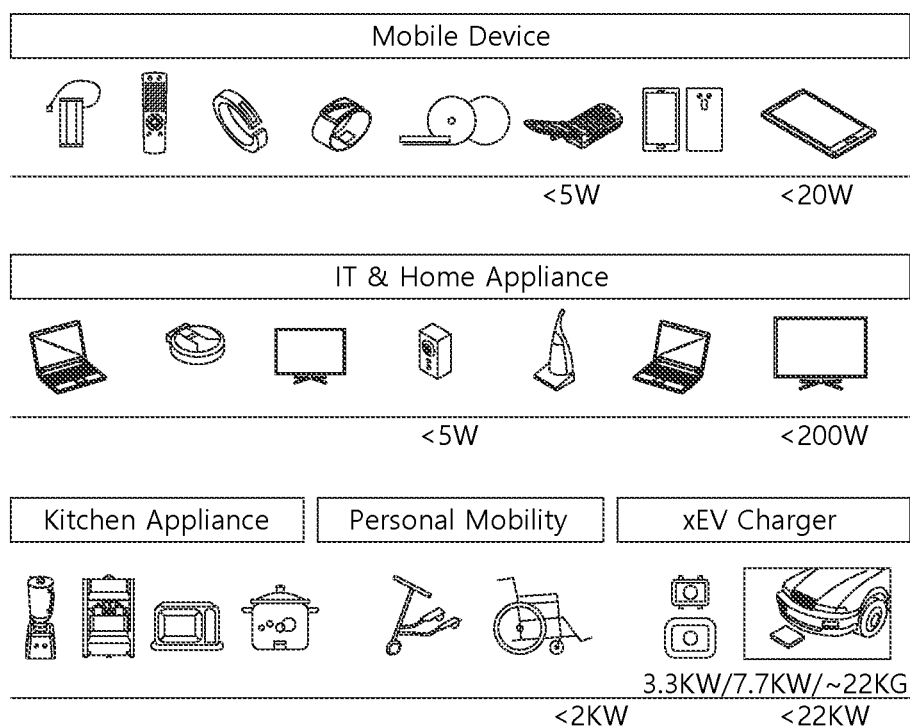
FIG. 3A shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select" Yes "to activate smart charging functions: Yes I No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3B shows an example of a WPC NDEF in a wireless power transfer system.

Referring to FIG. 3B, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
| --- | --- | --- |
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
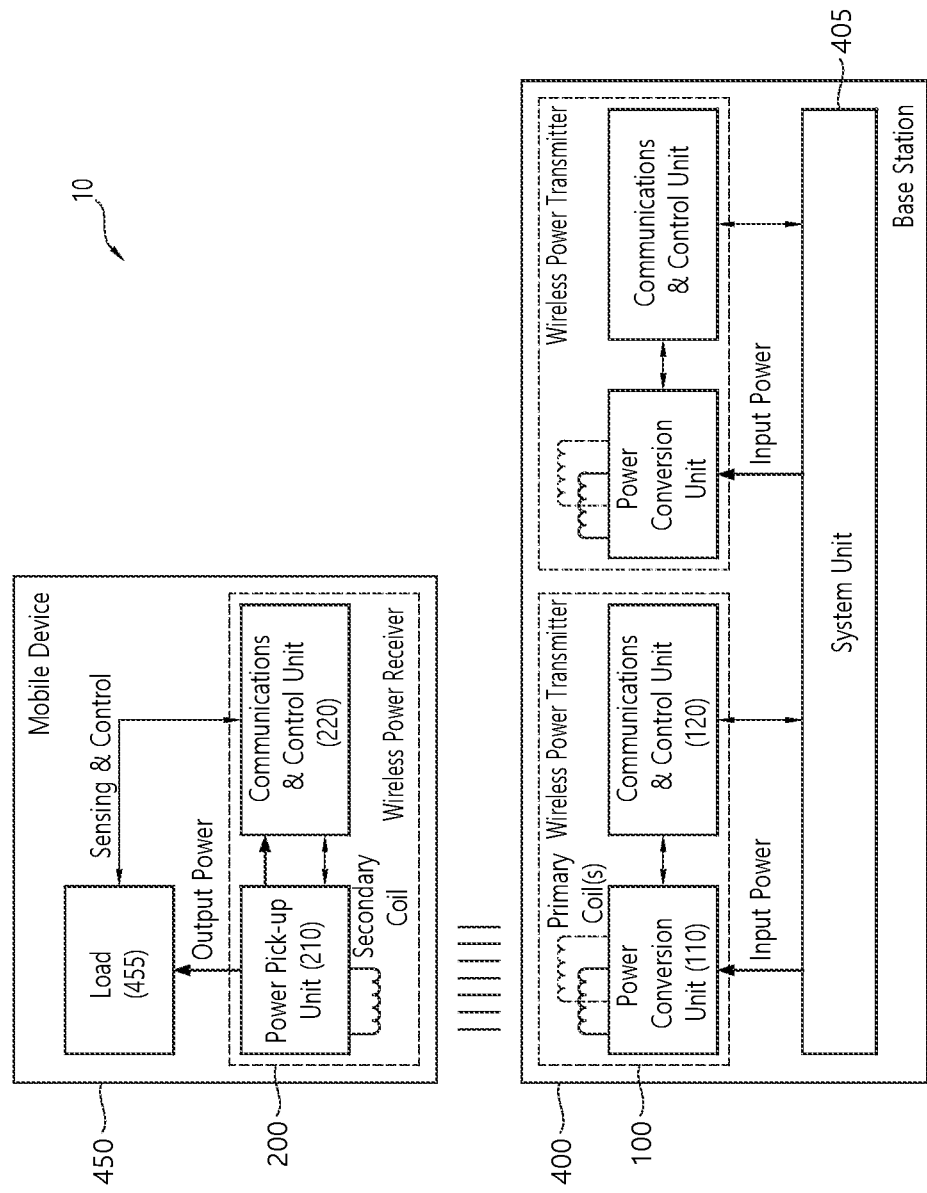
FIG. 4A is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying(FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
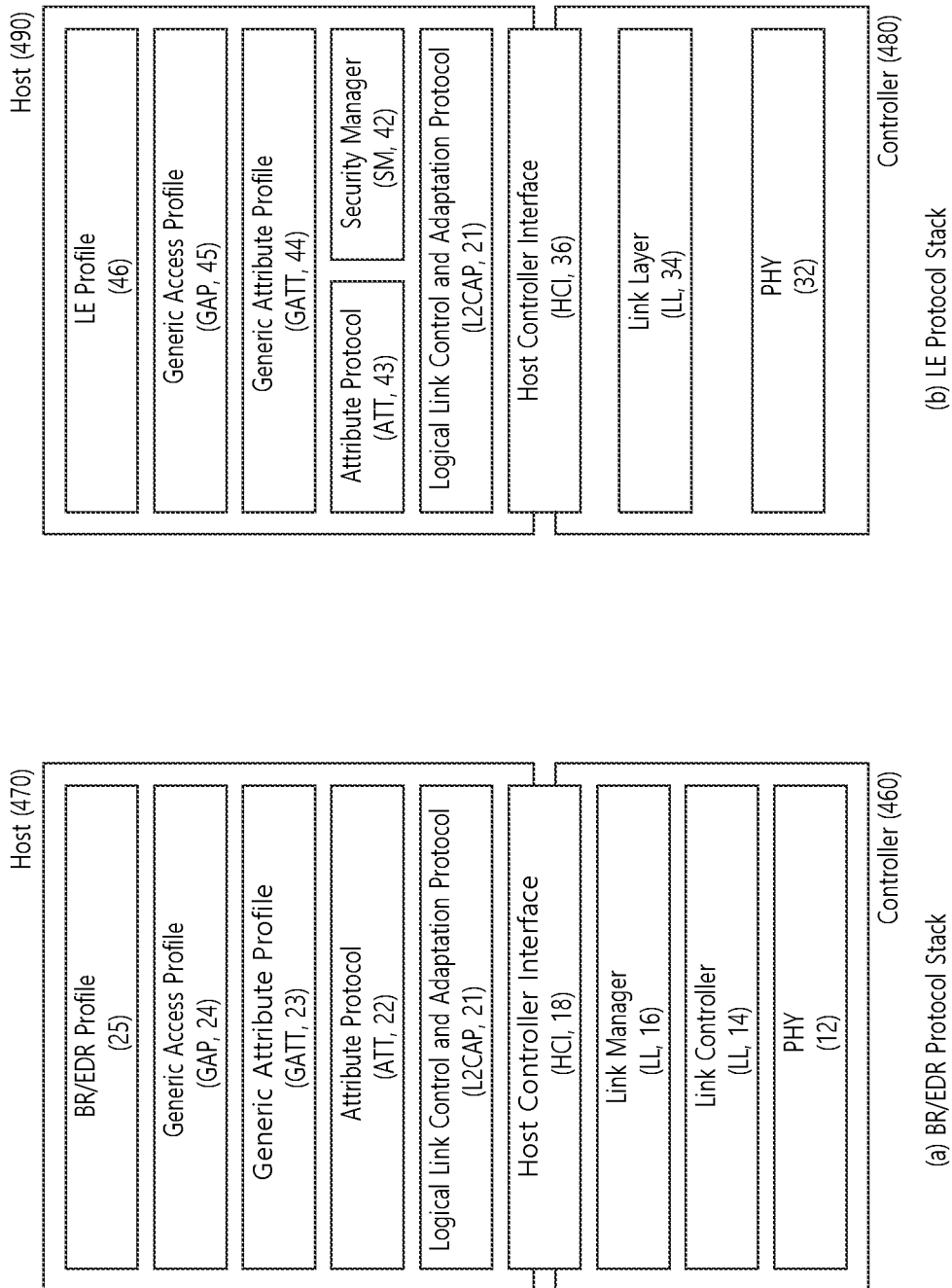
FIG. 4B is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4B.

FIG. 4B is a diagram illustrating an example of a Bluetooth communication architecture to which an embodiment according to the present disclosure may be applied.

Referring to FIG. 4B, (a) of FIG. 4B shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4B, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4B, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet_Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
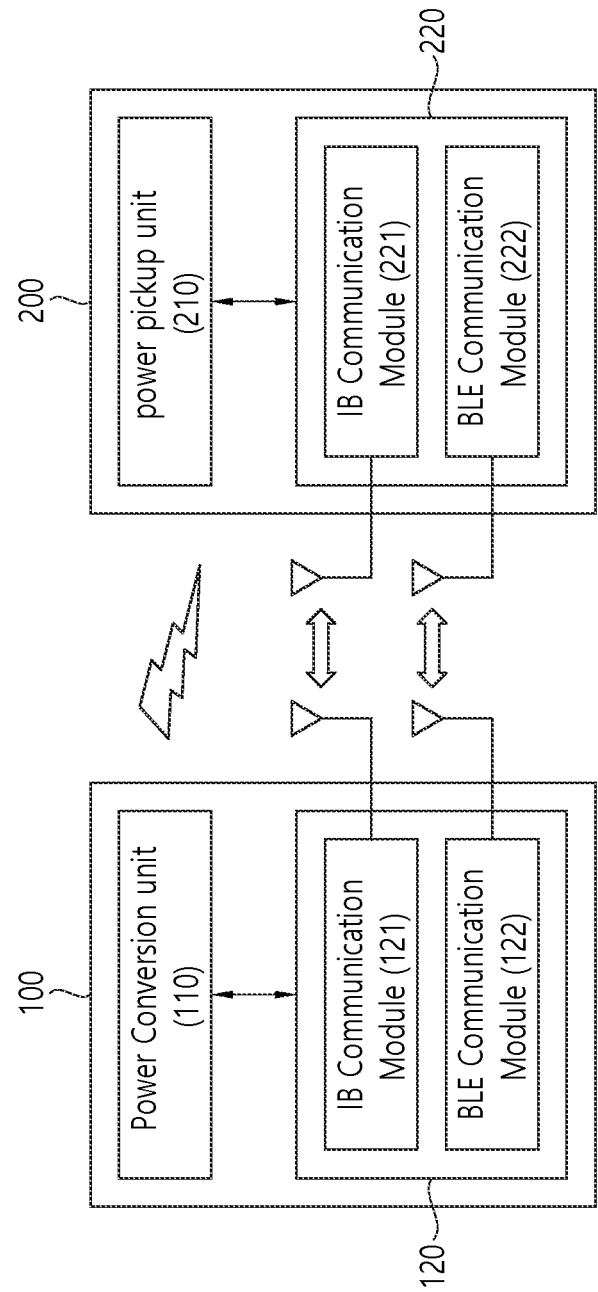
FIG. 4C is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4C.

FIG. 4C is a block diagram illustrating a wireless power transfer system using BLE communication according to an example.

Referring to FIG. 4C, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4B. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

FIG. 4D is a block diagram illustrating a wireless power transfer system using BLE communication according to another example.

Referring to FIG. 4D, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal(or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
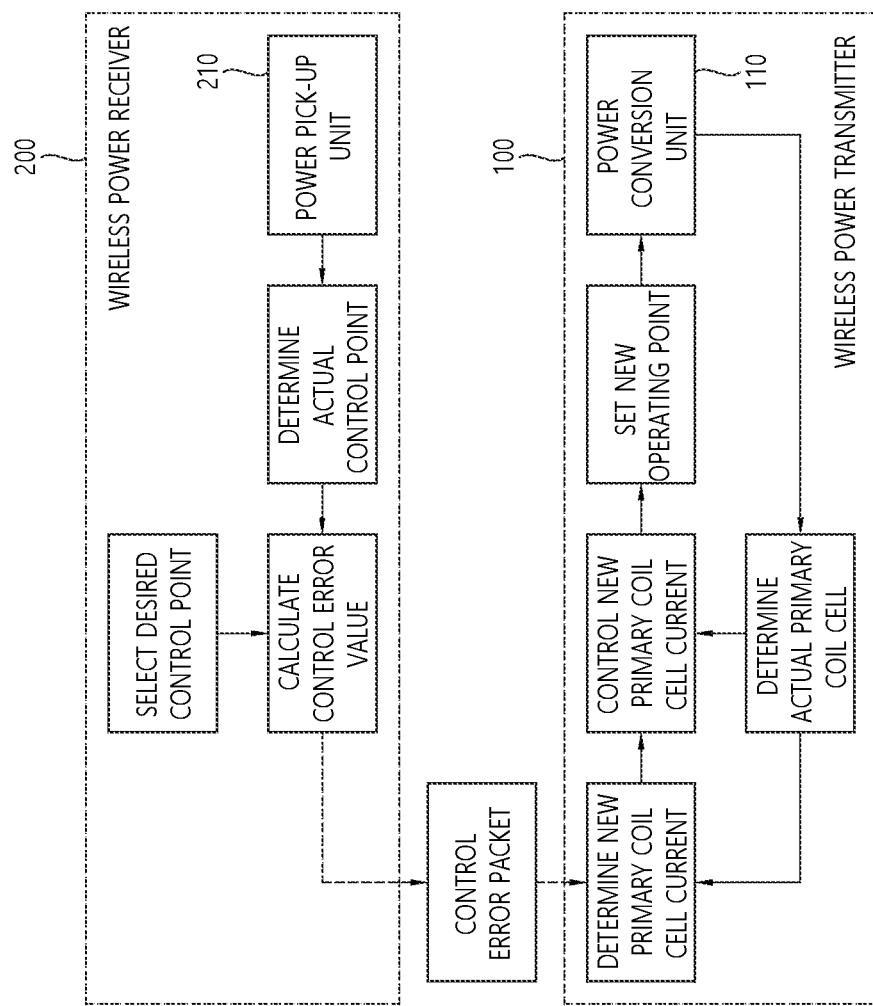
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
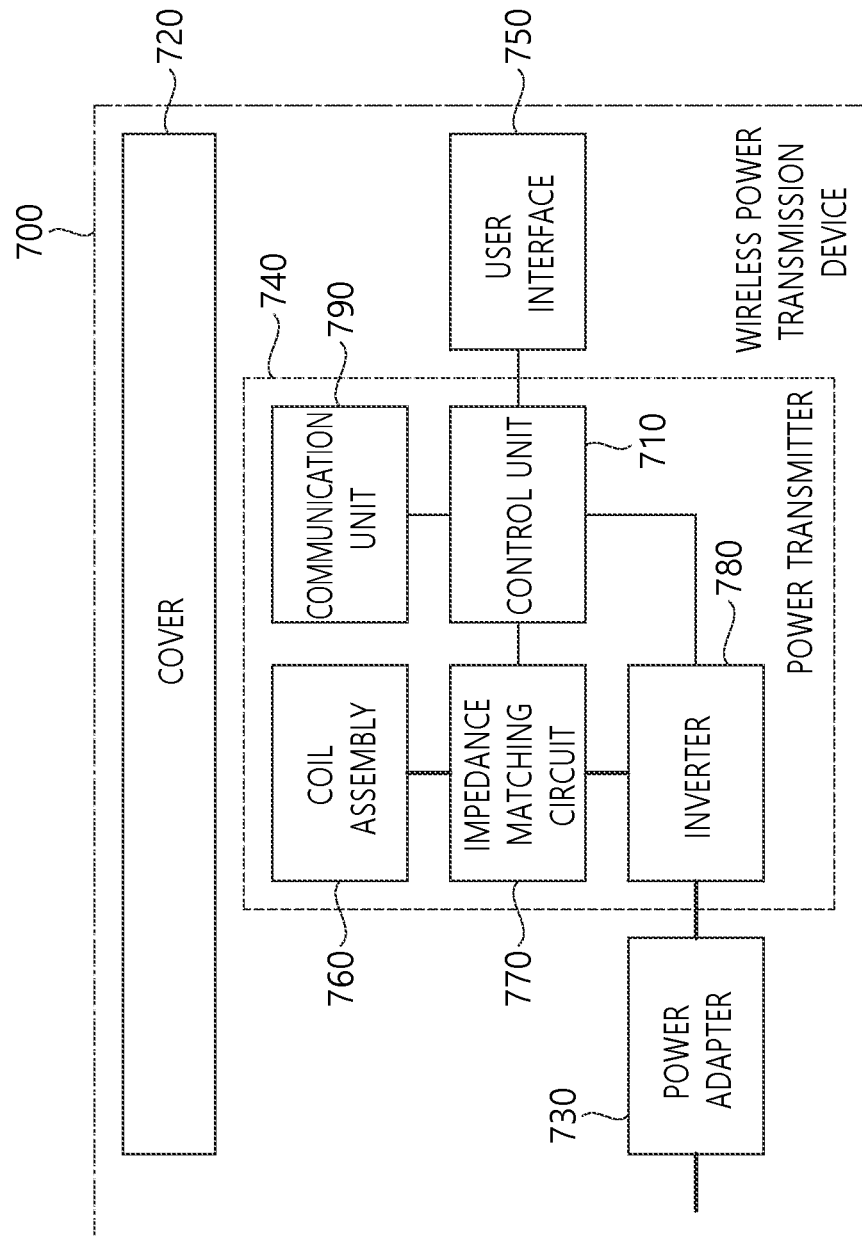
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
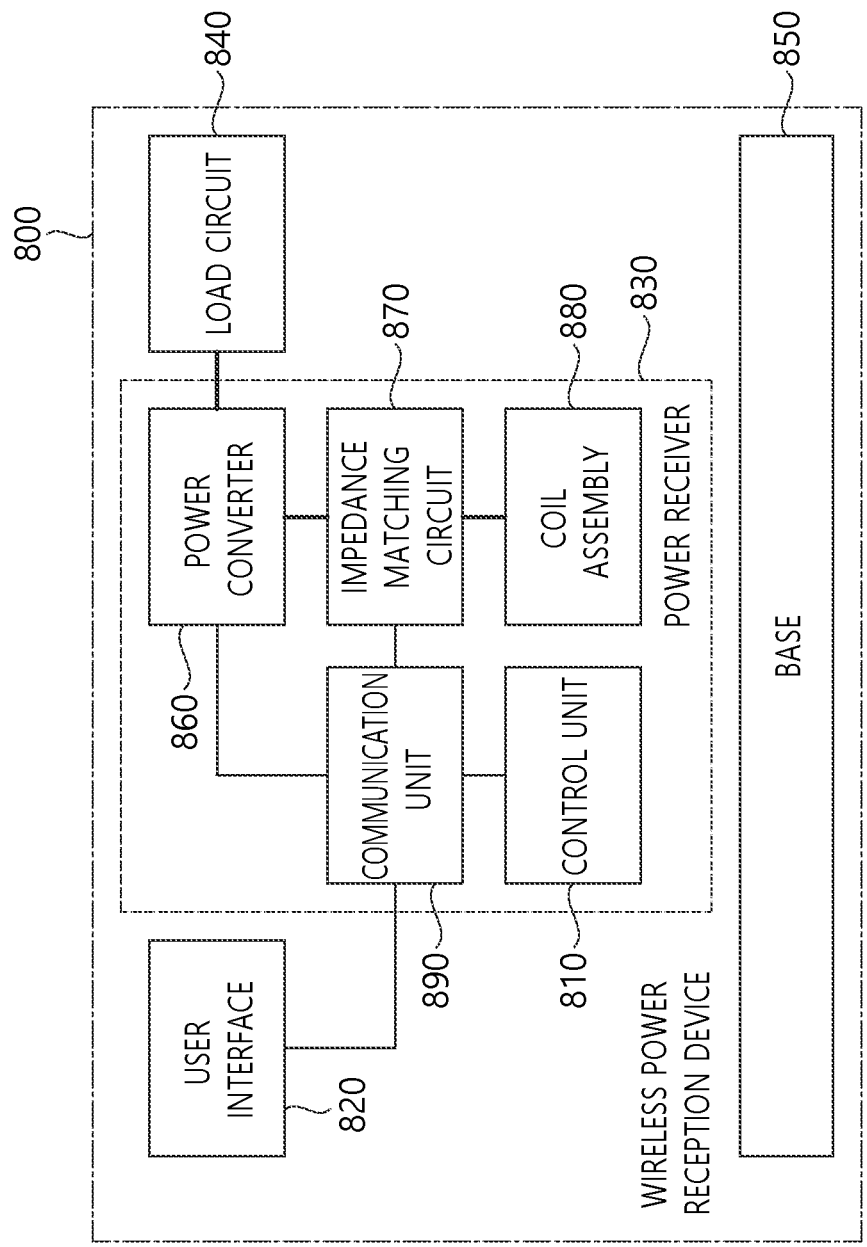
FIG. 8 shows a wireless power receiver according to another exemplary embodiment of the present disclosure.

FIG. 8 shows a wireless power receiver according to another exemplary embodiment of the present disclosure.

This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
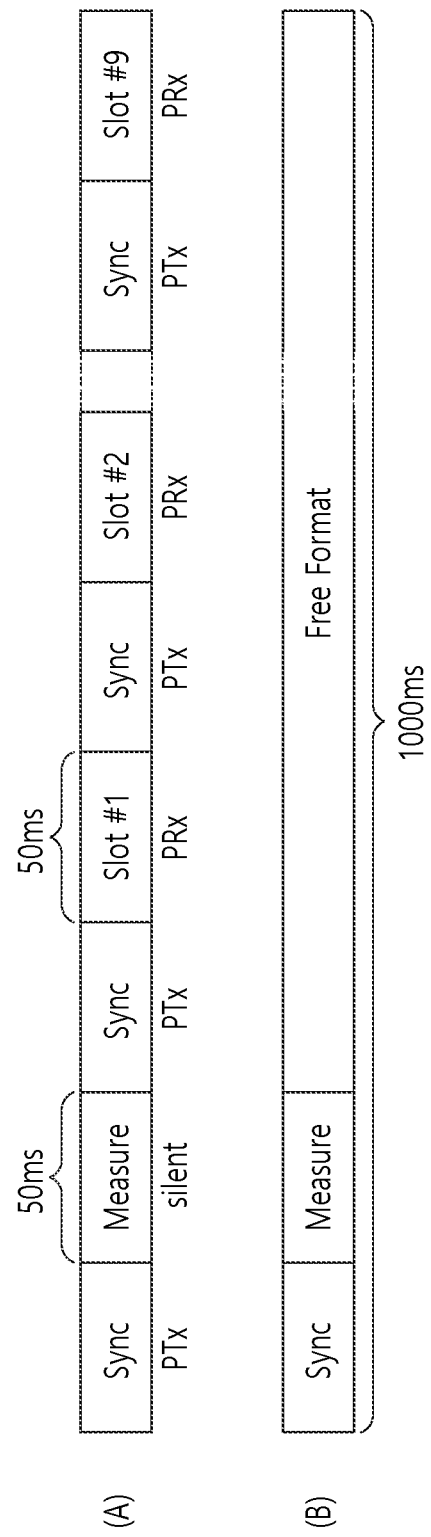
FIG. 9 shows a communication frame structure according to an exemplary embodiment of the present disclosure.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
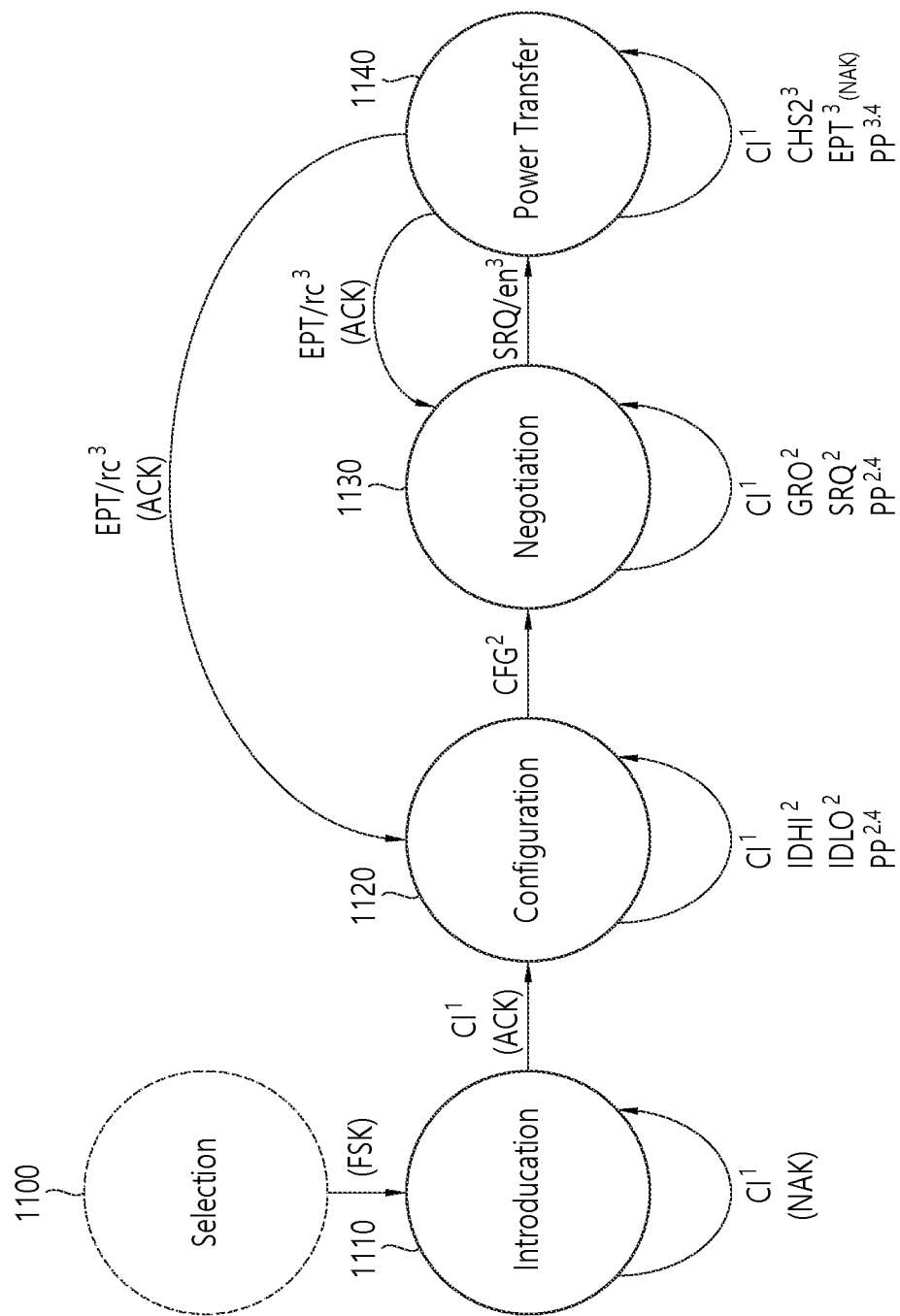
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control unit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

Hereinafter, authentication between a wireless power transmitter and a wireless power receiver will be disclosed.

The wireless power transfer system using in-band communication may use USB-C authentication. The authentication may include an authentication of the wireless power transmitter that is performed by the wireless power receiver (i.e., PTx Authentication by PRx), and an authentication of the wireless power receiver that is performed by the wireless power transmitter (PRx Authentication by PTx).

FIG. 12 is a block diagram showing a wireless charging certificate format according to an exemplary embodiment of the present disclosure.

Referring to FIG. 12, the wireless charging certificate format includes a Certificate Structure Version, a reserved field, PTx and leaf indicators, a certificate type, a signature offset, a serial number, an issuer ID, a subject ID, a public key, and a signature.

The certificate type may, for example, by assigned with 3 bits, and the certificate type may indicate that the corresponding certificate is any one of a root certificate, an intermediate certificate, and a last certificate. And, the certificate type may also indicate that the corresponding certificate is a certificate relating to a wireless power transmitter or a wireless power receiver or all type.

For example, the certificate type is 3 bits and may indicate information on a root certificate, manufacturer/secondary certificate, and product unit certificate (for the power transmitter). More specifically, a certificate type '001'b may indicate the root certificate, and '010'b may indicate an intermediate certificate (manufacturer/secondary Certificate), and '111'b may indicate a product unit certificate for the power transmitter, which is a final certificate.

The wireless power transmitter may notify (or announce) whether or not it supports the authentication function to the wireless power receiver by using a capability packet (in case of an authentication of the wireless power transmitter by the wireless power receiver (authentication of PTx by PRx)). Meanwhile, the wireless power receiver may notify (or announce) whether or not it supports the authentication function to the wireless power transmitter by using a capability packet (in case of an authentication of the wireless power receiver by the wireless power transmitter (authentication of PRx by PTx)). Hereinafter, a structure of indication information (a capability packet and a configuration packet) related to whether or not a device supports the authentication function will be disclosed and described in detail.

FIG. 13 is a capability packet structure of a wireless power transmitter according to an exemplary embodiment of the present disclosure.

Referring to FIG. 13, a capability packet having a respective header value of 0X31 is assigned with 3 bytes. Herein, a first byte (B0) includes a power class and a guaranteed power value, a second byte (B1) includes a reserved field and a potential power field, and a third byte (B2) includes an Authentication Initiator (AI), an Authentication Responder (AR), a reserved field, a WPID, and a Not Res Sens field. More specifically, the Authentication Initiator (AI) is assigned with 1 bit. Herein, for example, if the value is equal to '1b', this may indicate that the corresponding wireless power transmitter may operate as the authentication initiator. Additionally, the Authentication Responder (AR) is also assigned with 1 bit. Herein, for example, if the value is equal to '1b', this may indicate that the corresponding wireless power transmitter may operate as the authentication responder.

FIG. 14 is a configuration packet structure of a wireless power receiver according to an exemplary embodiment of the present disclosure.

Referring to FIG. 14, a capability packet having a respective header value of 0X51 is assigned with 5 bytes. Herein, a first byte (B0) includes a power class and a maximum power value, a second byte (B1) includes an AI, an AR, a reserved field, a third byte (B2) includes a Prop, a reserved field, a ZERO field, and a Count field, a fourth value (B3) includes a Window size and a window offset, and a fifth byte (B4) includes a Neg field, a polarity field, a Depth field, an authentication field (Auth), and a reserved field. More specifically, the Authentication Initiator (AI) is assigned with 1 bit. Herein, for example, if the value is equal to '1b', this may indicate that the corresponding wireless power receiver may operate as the authentication initiator. Additionally, the Authentication Responder (AR) is also assigned with 1 bit. Herein, for example, if the value is equal to '1b', this may indicate that the corresponding wireless power receiver may operate as the authentication responder.

A message that is used during the authentication procedure is referred to as an authentication message. The authentication message is used for carrying information related to authentication. Herein, 2 different types of authentication messages exist. One type corresponds to an authentication request, and another type corresponds to an authentication response. The authentication request is transmitted by the authentication initiator, and the authentication response is transmitted by the authentication responder. Both the wireless power transmitter and the wireless power receiver may be the authentication initiator or the authentication responder. For example, in case the wireless power transmitter is the authentication initiator, the wireless power receiver becomes the authentication responder. And, in case the wireless power receiver is the authentication initiator, the wireless power transmitter becomes the authentication responder.

An authentication request message includes a GET_DI-GESTS (i.e., 4 bytes), a GET_CERTIFICATE (i.e., 8 bytes), and a CHALLENGE (i.e., 36 bytes).

An authentication response message includes a DIGESTS (i.e., 4+32 bytes), a CERTIFICATE (i.e., 4+certificate chain (3×512 bytes)=1,540 bytes), a CHALLENGE_AUTH (i.e., 168 bytes), and an ERROR (i.e., 4 bytes).

An authentication message may be referred to as an authentication packet and may also be referred to as authentication data or authentication control information. Additionally, messages, such as GET_DIGEST, DIGESTS, and so on, may also be referred to as a GET_DIGEST packet, a DIGEST packet, and so on.

Figure 15:
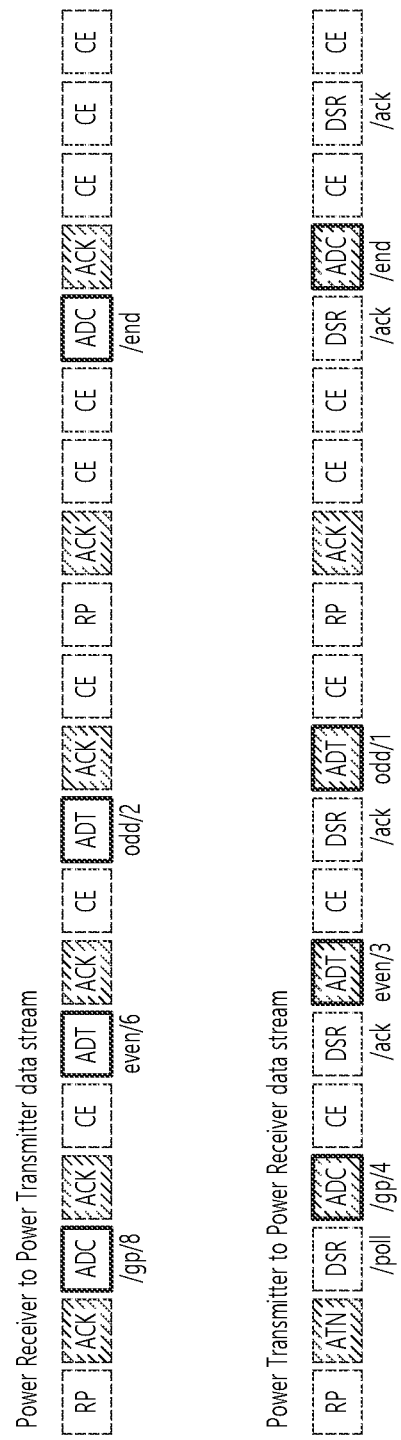
FIG. 15 shows an application-level data stream between a wireless power transmitter and a wireless power receiver according to an example.

FIG. 15 shows an application-level data stream between a wireless power transmitter and a receiver according to an example.

Referring to FIG. 15, a data stream may include an auxiliary data control (ADC) data packet and/or an auxiliary data transport (ADT) data packet.

The ADC data packet is used to open a data stream. The ADC data packet may indicate the type of a message included in a stream and the number of data bytes. Meanwhile, the ADT data packet is sequences of data including an actual message. An ADC/end data packet is used to indicate the end of the stream. For example, the maximum number of data bytes in a data transport stream may be limited to 2047.

ACK or NAC (NACK) is used to indicate whether the ADC data packet and the ADT data packet are normally received. Control information necessary for wireless charging such as a control error packet (CE) or DSR may be transmitted between transmission timings of the ADC data packet and the ADT data packet.

Using this data stream structure, authentication related information or other application level information may be transmitted and received between the wireless power transmitter and the wireless power receiver.

Hereinafter, a method of detecting a foreign object and calibrating power will be described.

When a wireless power transmitter transmits wireless power to a wireless power receiver using a magnetic field, if a foreign object is present therearound, a part of magnetic field may be absorbed to the foreign object. That is, a part of the wireless power transmitted from the wireless power transmitter is supplied to the foreign object and the rest is supplied to the wireless power receiver. From the viewpoint of the efficiency of power transfer, loss of transmitted power occurs as much as power or energy absorbed by the foreign object. Thus, since a causal relationship may be established between the presence of the foreign object and power loss (Ross), the wireless power transmitter may detect how much power loss occurs through the foreign object. Such a foreign object detection method may be referred to as a foreign object detection method based on power loss.

The power lost by the foreign object may be defined as a value obtained by subtracting the power ($P_{received}$) actually received by the wireless power receiver from the power ($P_{transmitted}$) transmitted from the wireless power transmitter. From the standpoint of the wireless power transmitter, the wireless power transmitter knows the power ($P_{transmitted}$) transmitted by itself, and thus, the lost power may be obtained if only the power actually received by the wireless power receiver is known. To this end, the wireless power receiver may notify the wireless power transmitter of the received power by transmitting a received power packet (RPP) to the wireless power transmitter.

Meanwhile, the wireless power transmitter and the wireless power receiver include various circuit components therein and configure devices independent of each other. However, since wireless power is transmitted by magnetic coupling therebetween, the wireless power transmitter and the wireless power receiver constitute one wireless power transfer system. In addition, the amount of power (transmitted power) transmitted by the wireless power transmitter and the amount of power (received power) received by the wireless power receiver are uniquely determined by the power transfer characteristics. As an example, power transfer characteristics may be considered as a ratio or function of transmitted power and received power. Therefore, if the wireless power transmitter knows the power transfer characteristics in advance, the wireless power transmitter may be able to predict how much of the power transmitted by the wireless power transmitter will be received by the wireless power receiver. If actual received power reported by the wireless power receiver is smaller than received power predicted based on the power transfer characteristics, it may be considered that power loss occurred in the power transfer process. The foreign object detection method based on power loss may determine that a foreign object exists in the above case. As described above, power loss used for the determination of a foreign object is also determined based on the power transfer characteristics, and therefore, power transfer characteristics need to be properly recognized to increase reliability of foreign object detection.

The power transfer characteristic is dependent on an environment in which wireless power is transmitted or a unique characteristic of a device transmitting wireless power. The wireless power transmitter and the wireless power receiver may generally use power calibration at the start of wireless power transfer to determine the power transfer characteristics in a certain currently given wireless charging environment. When the power transfer characteristics are identified or set by power calibration, foreign object detection is performed accordingly.

The power transfer characteristics may also be dependent on a change in load or a degree of magnetic coupling. For example, when the wireless power receiver uses multiple load steps or variable load (or load increase) or when the degree of a change in magnetic coupling due to a change in position between the wireless power transmitter and the wireless power receiver, at least a part of the power transfer characteristics may be changed. If at least a part of the power transfer characteristic changes, at least a part of power calibration set according to the previous power transfer characteristic becomes invalid. In addition, power loss and foreign object detection according to the at least part of the set power calibration are no longer valid. Therefore, it is necessary to additionally calibrate power for the changed power transfer characteristics.

Power Calibration Due to Load Change (1)

Figure 16:
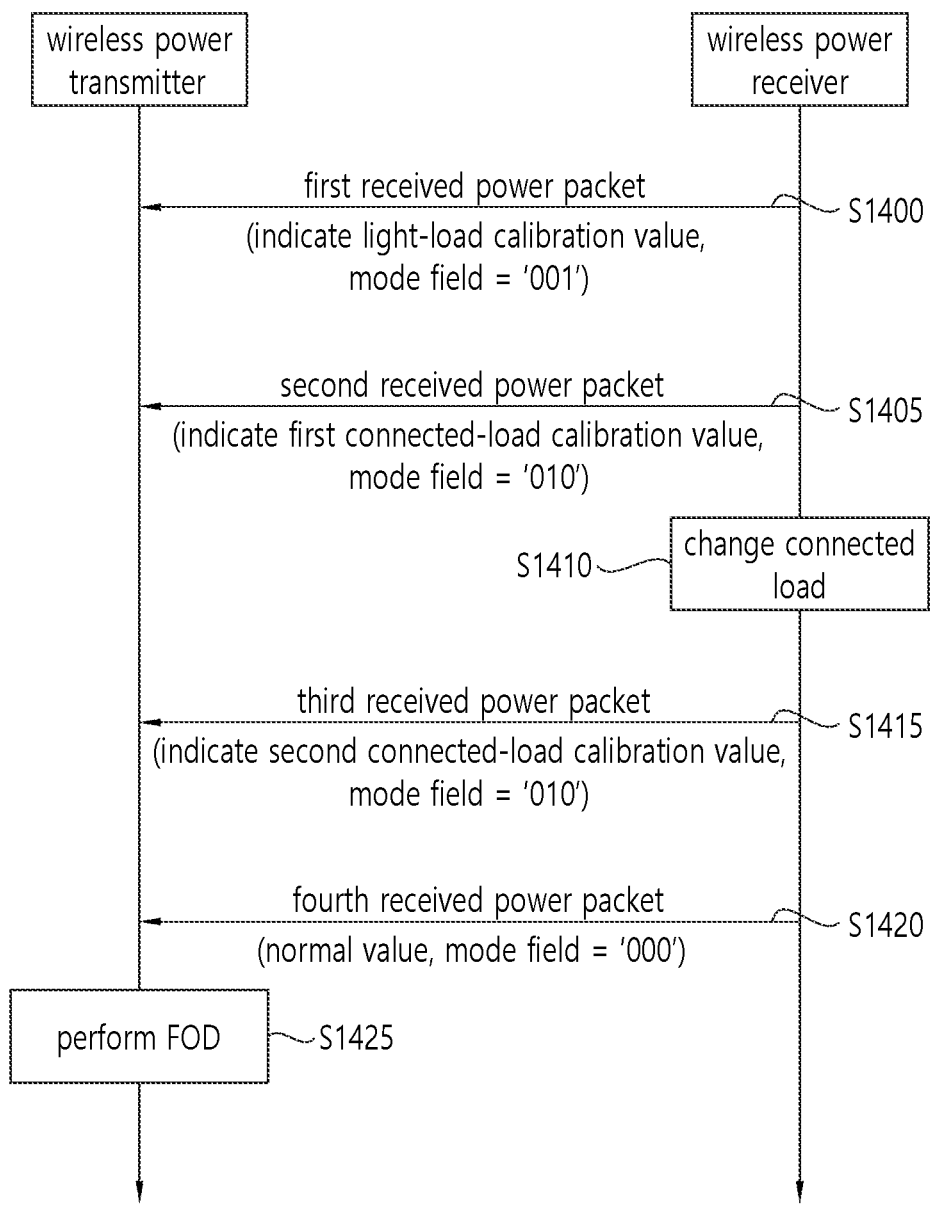
FIG. 16 is a flowchart illustrating a method of performing power calibration and foreign object detection (FOD) according to an embodiment.

FIG. 16 is a flowchart illustrating a method of performing power calibration and foreign object detection according to an embodiment.

Referring to FIG. 16, the wireless power receiver receives and measures transmitted power (hereinafter, referred to as first light load transmitted power; Ptr_light) from the wireless power transmitter in a light-load condition and transmits a first received power packet (RPP) indicating a received power value under the light load condition to the wireless power transmitter (S1400). The first received power packet may have, for example, the format of FIG. 17.

FIG. 17 is a format of a received power packet according to an example.

Referring to FIG. 17, the received power packet totaling 24 bits, for example, may include a field indicating an estimated received power value (e.g., 8 bits) and a mode field (e.g., 3 bits). The mode field indicates how to interpret the received power value. Table 4 shows an example of the mode field.

TABLE 4

| Mode | Indication contents |
| --- | --- |
| '000' | Normal value; Response requested |
| '001' | Light-load calibration value; Response requested |
| '010' | Connected-load calibration value; Response requested |
| '011' | reserved |
| '100' | Normal value; no response requested |

Referring to Table 4, the mode field='000' indicates that a received power value is a general power value (which may be indicated as RP/0), and the mode field='001' or '010' may indicate that a received power packet is related to power calibration (which may be indicated as RP/1, RP/2, respectively). That is, the wireless power receiver may instruct power calibration by transmitting the received power packet with the mode field='001' or '010' to the wireless power transmitter. Specifically, the mode field='001' (i.e., RP/1), the received power packet refers to the first information for constructing a power calibration curve and may indicate a power value (hereinafter, referred to as a light-load calibration value, Prec_light) received by the wireless power receiver. In addition, when the mode field='010' (i.e., RP/2), the received power packet refers to additional information for constructing a power calibration curve and may indicate a power value received by the wireless power receiver (hereinafter, referred to as a connected-load calibration value, Prec_connected) when the wireless power receiver is generally in a connected-load condition. The light load condition may refer to a condition in which a load (e.g., a battery) is not electrically connected to the wireless power receiver, and the connected-load condition may refer to a condition in which a load is connected to the wireless power receiver. Meanwhile, the wireless power transmitter may know that power calibration is still ongoing by receiving the received power packet with the mode field='001' or '010' from the wireless power receiver. Referring back to FIG. 16, since the first received power packet indicates the received power value (i.e., the light load calibration value, Prec_light) measured under the light load condition, the mode field of the first received power packet='001' (i.e., RP/1). Therefore, step S1400 may further include a step in which the wireless power receiver sets the mode field to '001' (mode field='001'). When it is determined that the mode field='001', the wireless power transmitter may identify that the received power value indicated by the first received power packet is first information for constructing the power calibration curve, and the first information for constructing the power calibration curve may be a light load calibration value (Prec_light). The wireless power transmitter may store the light load calibration value Prec_light in a memory to perform power calibration. Although not shown, the wireless power transmitter may transmit ACK or NAK to the wireless power receiver in response to the first received power packet. In addition, the first received power packet may be continuously transmitted a plurality of times until an ACK response is received from the wireless power transmitter. In this case, the first received power packet which is continuously transmitted (i.e., RP/1) may be treated as one received power packet (i.e., a single RP/1).

In one aspect, when receiving the RP/1, the wireless power transmitter transmits NAK until the wireless power receiver stably reaches a corresponding power level (while monitoring a CE value), and when the power level is stabilized, the wireless power transmitter transmits ACK and takes the RP1 value at that time.

The wireless power receiver receives and measures a first connected-load transmitted power (Ptr_connected (1)) from the wireless power transmitter under the first connected load condition, and then transmits a second received power packet (i.e., RP/2) indicating the first connected-load calibration value (Prec_connected(1)) to the wireless power transmitter (S1405).

Step S1405 may further include a step in which the wireless power receiver sets the mode field to '010' (mode field='010'). When the mode field='010' is confirmed, the wireless power transmitter identifies that the received power value indicated by the second received power packet is the first connected-load calibration value (Prec_connected (1)). The wireless power transmitter may store the first connected-load calibration value (Prec_connected (1)) in the memory to perform power calibration.

Although not shown, the wireless power transmitter may transmit an ACK or NAK to the wireless power receiver in response to the second received power packet RP/2. Also, the second received power packet RP/2 may be transmitted multiple times in succession. In this case, the second received power packet RP/2 which is continuously transmitted may be treated as one received power packet (i.e., a single RP/2). When receiving the RP/2, the wireless power transmitter transmits NAK until the wireless power receiver stably reaches the corresponding power level (while monitoring the CE value), and when the power level is stabilized, the wireless power transmitter transmits ACK and takes the RP2 value at that time.

The light load transmitted power (Ptr_light), the light load calibration value (Prec_light), the first connected-load transmitted power (Ptr_connected (1)), and the first connected-load calibration value (Prec_connected (1)) obtained in steps S1400 and S1405 are called power calibration data. Power transfer characteristics may be derived or set by the power calibration data. The derived power transfer characteristic may be referred to as a calibration curve. Throughout this specification, the operation of calculating or deriving or setting the power transfer characteristic or the operation of deriving or setting or calculating the calibration curve is widely referred to as power calibration. In this embodiment, the power calibration performed at the start of the power transfer phase is called initial power calibration. Therefore, the wireless power transmitter performs initial power calibration using RP1 and RP2 at the time of sending the ACK.

Figure 18:
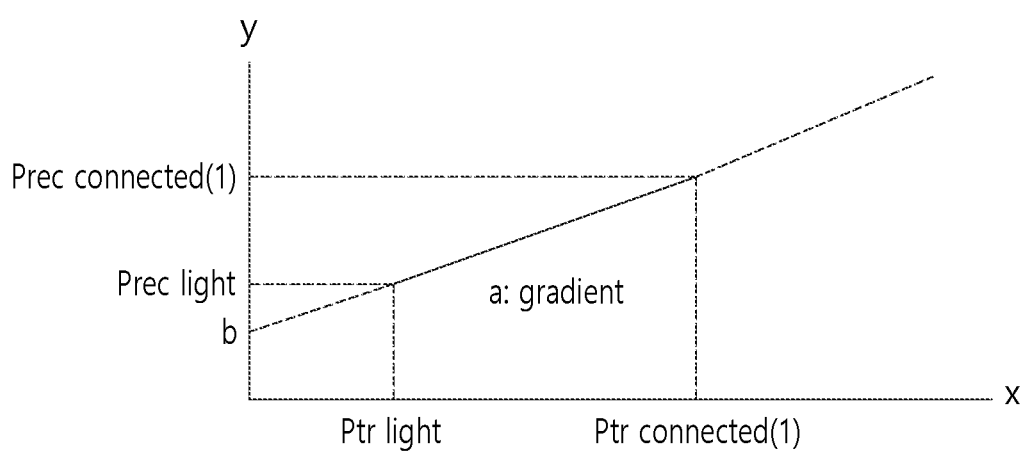
FIG. 18 is a power transfer characteristic or calibration curve according to an embodiment.

FIG. 18 is a power transfer characteristic or calibration curve according to an embodiment.

Referring to FIG. 18, when the power calibration data (light load transmitted power (Ptr_light), the light load calibration value (Prec_light), the first connected-load transmitted power (Ptr_connected (1)), and the first connected-load calibration value are expressed in the form of coordinates (x, y) composed of a pair of transmission power and reception power, one is first coordinates (Ptr_light, Prec_light) under the light load condition and the other is second coordinates (Ptr_connected (1), Prec_connected (1)) under the first connected-load condition.

If the graph is represented by linear interpolation based on the first and second coordinates, a power transfer characteristic or a calibration curve as shown in FIG. 18 may be derived. The power transfer characteristic (or calibration curve) is gradient a and a y-axis offset is set by b. Here, a is a first calibration constant and b may be called a second calibration constant.

The process of deriving the calibration constants a and b is expressed as follows $$a = \frac{P_{received}^{(connected)} - P_{received}^{(light)}}{P_{transmitted}^{(connected)} - P_{transmitted}^{(light)}}$$ [Equation 1]

$$b = \frac{P_{transmitted}^{(connected)} P_{received}^{(light)} - P_{received}^{(connected)} P_{transmitted}^{(light)}}{P_{transmitted}^{(connected)} - P_{transmitted}^{(light)}}$$ [Equation 2]

Since the power transfer characteristic (or calibration curve) according to FIG. 18 is derived using two coordinates according to two load conditions, it may also be referred to as 2 point calibration.

Meanwhile, power calibration is valid within a range of the power calibration data (i.e., the range in which the transmitted power Ptr is Ptr_light≤Ptr≤Ptr_connected (1)). That is, when the first connected-load transmitted power is used as the power calibration data for power calibration, the corresponding power calibration may be valid within a range less than or equal to the first connected-load transmitted power, and a range greater than the first connected-load transmitted power (e.g., a range of Ptr_connected (1)<Ptr) may not be valid. When the wireless power transmitter performs power calibration by extrapolating a range not covered by the calibration curve, false detection or non-detection of a foreign object may be caused.

Referring back to FIG. 16, the wireless power receiver changes the connected-load (S1410). The change in the connected-load may include an increase or decrease in the connected-load. The change in the connected-load may mean that a target rectified voltage (target Vrec) or target power of the wireless power receiver increases or decreases compared to the previous connected-load. A situation in which the connected-load is changed may include a case in which the wireless power receiver uses multiple load steps to reach the target power. When the connected-load is changed, at least a part of the previously set power transfer characteristics may be changed, or additional power transfer characteristics may be set, while maintaining the previously set power transfer characteristics. For example, if the transmitted power Ptr increases to a range where Ptr_connected (1)<Ptr due to an increase in the connected-load, the power transfer characteristic of FIG. 18 cannot cover this situation.

Therefore, additional power calibration data is required to reflect the changed state of the connected-load in the power calibration. To this end, the wireless power receiver receives and measures the second connected-load transmitted power (Ptr_connected (2)) from the wireless power transmitter under the second connected-load condition, and then transmits a third received power packet indicating the second connected-load calibration value (Prec_connected (2)) to the wireless power transmitter (S1415). When the wireless power transmitter responds with ACK to the second received power packet RP/2 in step S1410, additional RP/2 transmission of the wireless power receiver may not be permitted. However, in order to improve the power loss-based foreign object detection function, the limitation on the timing of power calibration may be removed and multi-point power calibration of two or more points may be required, and thus, the transmission of the third received power packet as in step S1415 may be permitted.

Step S1415 may further include a step in which the wireless power receiver set the mode field to '010' (mode field='010'). When it is confirmed that the mode field='010', the wireless power transmitter identifies that the received power value indicated by the third received power packet is the second connected-load calibration value (Prec_connected (2)). Since the mode field='010', the wireless power transmitter may know that additional power calibration is required.

In order to perform power calibration, the wireless power transmitter may store the second connected-load calibration value (Prec_connected (2)) in a memory.

Figure 19:
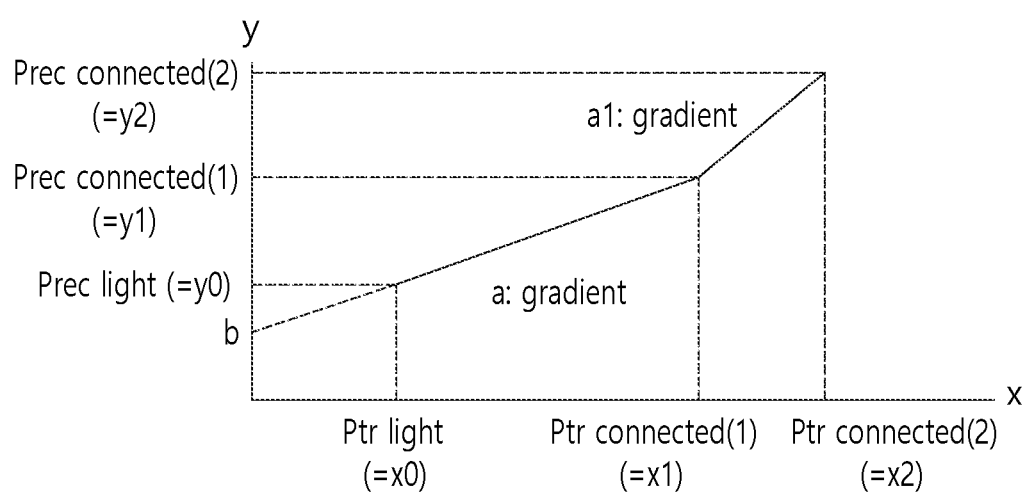
FIG. 19 is a power transfer characteristic or calibration curve according to another embodiment.

Power transfer characteristics may be derived or set based on the power calibration data obtained in steps S1400 to S1415. FIG. 19 shows a graph representing the derived power transfer characteristics by an interpolation technique.

FIG. 19 is a power transfer characteristic or calibration curve according to another embodiment.

Referring to FIG. 19, when the power calibration data (light load transmitted power (Ptr_light), the light load calibration value (Prec_light), the first connected-load transmitted power (Ptr_connected (1)), the first connected-load calibration value (Prec_connected (1)), the second connected-load transmitted power (Ptr_connected (2)), and the second connected-load calibration value (Prec_connected (2)) are represented in the form of coordinates (x, y) consisting of a pair of transmitted power and received power, first coordinates (Ptr_light, Prec_light), second coordinates (Ptr_connected (1), Prec_connected (1)), and third coordinates (Ptr_connected (2), Prec_connected (2)) may be obtained.

When graphed by linear interpolation based on the first to third coordinates, power transfer characteristics or calibration curves having different gradients for each section may be derived as illustrated in FIG. 19. For convenience of description, it is assumed that the first to third coordinates are (x0, y0), (x1, y1), and (x2, y2), respectively.

The power transfer characteristic (or calibration curve) in a first section (x0 to x1) has a gradient a0 and a y-axis offset is derived by b0. In addition, the power transfer characteristic (or calibration curve) in a second section (x1 to x2) has a gradient a1 and a y-axis offset is derived by b1. The process of deriving the calibration constants a0, b0, a1, and b1 is expressed as follows.

$$a0 = \frac{y1 - y0}{x1 - x0}$$ [Equation 3]

$$b0 = \frac{y0x1 - y1x0}{x1 - x0}$$ [Equation 4]

$$a1 = \frac{y2 - y1}{x2 - x1}$$ [Equation 5]

$$b1 = \frac{y1x2 - y2x1}{x2 - x1}$$ [Equation 6]

Since the power transfer characteristic (or calibration curve) according to FIG. 19 is derived using three coordinates based on the three load conditions, it may also be referred to as 3 point calibration or multiple calibration.

When comparing FIG. 19 and FIG. 18, it may be seen that the range of calibration of the 3 point calibration is increased to Ptr_connected (2) compared to a 2 point calibration. Therefore, it is possible to detect a foreign object even in a section in which the transmitted power is Ptr_connected (2)<Ptr≤Ptr_connected (2).

Thereafter, when the wireless power receiver receives a received power packet indicating a normal value (i.e., mode field='000'b) $P_{received}$, rather than the received power packet (i.e., mode field='001'b or '010b') related to power calibration no longer for the power $P_{transmitted}$ transmitted by the wireless power transmitter (S1420), the wireless power transmitter terminates the power calibration and performs FOD based on the transmitted power $P_{transmitted}$ and the received power $P_{received}$ (S1425). For example, step S1425 may include a step in which the wireless power transmitter performs FOD based on the power loss according to FIG. 20.

Although not shown in the figure, the wireless power transmitter transmits ACK or NAK to the wireless power receiver in response to receiving of the received power packet related to power calibration.

Specifically, the wireless power transmitter may repeat the operation of transmitting NAK to the wireless power receiver until control is achieved at a target operating point.

For example, according to the embodiment according to FIG. 16, after the wireless power receiver transmits the first received power packet to the wireless power transmitter (S1400), when the NAK is received, the wireless power receiver may transmit a control error packet to the wireless power transmitter, while changing operating points. When control is achieved to a target operating point, the wireless power transmitter may transmit ACK to the wireless power receiver. From the standpoint of the wireless power transmitter, the wireless power transmitter determines whether the first received power packet is transmitted in a stable state of the wireless power receiver based on the received control error packet. That is, when it is determined that the wireless power receiver is not stabilized, the wireless power transmitter transmits NAK for the first received power packet, and when control is achieved to a target operating point by changing operating points, the wireless power transmitter transmits ACK to the wireless power receiver.

When the ACK is received in response to the first received power packet, the wireless power receiver transmits a second received power packet to the wireless power transmitter (S1405). By transmitting a control error packet between the received power packets to the wireless power transmitter, the wireless power receiver may inform the wireless power transmitter about the degree to which the operating point of the wireless power receiver deviates from a target operating point. This operation is repeated each time the wireless power receiver receives the NAK in response to the second received power packet, and is finally terminated when the wireless power transmitter transmits ACK to the wireless power receiver when the wireless power transmitter is controlled to the target operating point.

Thereafter, due to a change in the connected-load (S1410), the wireless power receiver may transmit a third received power packet to the wireless power transmitter (S1415), and transmit a control error packet to the wireless power transmitter. This operation is repeated each time the wireless power receiver receives the NAK in response to the second received power packet, and then when the wireless power transmitter is controlled to the target operating point and transmits the ACK to the wireless power receiver, the wireless power transmitter terminates power calibration.

Thereafter, when the wireless power receiver receives a received power packet indicating a normal value (i.e., mode field='000'b) $P_{received}$, rather than the received power packet (i.e., mode field='001'b or '010b') related to power calibration no longer (S1420), the wireless power transmitter calibrates $P_{received}$ based on power calibration, calculates power loss, and performs FOD based on the power loss (S1425).

Meanwhile, another embodiment includes a wireless power transmitter and method and a wireless power receiver and method for performing power calibration associated with an authentication procedure.

As an example, the wireless power receiver supporting authentication may adaptively perform power calibration according to whether the wireless power transmitter is authenticated or by authentication performing steps.

For example, the present embodiment includes a wireless power receiver and method including a step of performing power calibration using a connected load corresponding to a basic power profile (BPP or 5V) at the time of entering an initial power transfer phase, a step of verifying that the wireless power transmitter supports an authenticated (i.e., Qi-certified) extended power profile (EPP or 5 W or greater), a step of making a contract for power transfer with a desired target power value (i.e., 8 W or 15 W) when authentication is successfully performed as a result of verification, and a step of transmitting a received power packet regarding power calibration to the wireless power transmitter under a connected-load condition.

Thus, the wireless power transmitter is controlled to perform additional power calibration. Here, the step of making the contract for power transfer with the target power value (i.e. 8 W or 15 W) may be performed in a renegotiation phase. When receiving the received power packet RP/1 under the light load condition or the received power packet RP/2 under the connected-load condition, the wireless power transmitter may inform the wireless power received that the power calibration operation has been normally performed by sending an ACK signal for the RP(1) or RP(2) when it is controlled to the target operating point with reference to a control error packet value.

Figure 20:
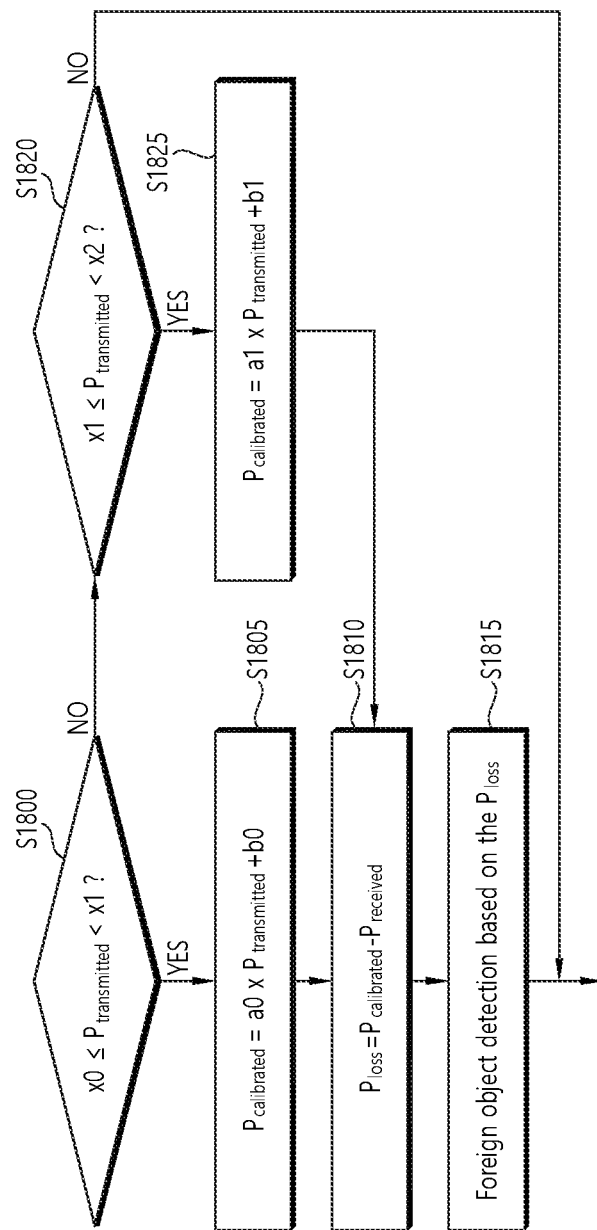
FIG. 20 is a flowchart illustrating a foreign object detection method according to an embodiment.

FIG. 20 is a flowchart illustrating a foreign object detection method according to an embodiment.

Referring to FIG. 20, the wireless power transmitter compares transmit power $P_{transmitted}$ with power calibration data x0, x1, and x2 to determine which calibration section the transmit power belongs to (S1800, S1820). If the transmit power $P_{transmitted}$ exists between x0 and x1 (S1800), the wireless power transmitter calculates a calibrated transmit power value $P_{calibrated}$ using the calibration constants a0 and b0 (S1805). If the transmit power $P_{transmitted}$ exists between x1 and x2 (S1820), the wireless power transmitter calculates the calibrated transmit power value $P_{calibrated}$ using the calibration constants a1 and b1 (S1825).

When the calibrated transmit power value $P_{transmitted}$ is calculated, the wireless power transmitter calculates power loss $P_{loss}$ from a difference between the calibrated transmit power value $P_{transmitted}$ and the received power $P_{received}$ (S1810). In addition, the wireless power transmitter detects a foreign object based on the power loss $P_{loss}$ (S1815).

Since the calibration range is increased, a wider range of power values may be calibrated, and since reliability of the calibration is increased, the reliability of foreign object detection based on power loss may also be increased.

This embodiment describes a case in which three received power packets related to power calibration are continuously transmitted and received, but the present disclosure is not limited to the above embodiment. That is, the embodiment of the present disclosure may also include a case where more received power packets related to power calibration (e.g., received power packets RP/1 and RP/ for power calibration calculation) are continuously transmitted and received according to the number of changing connected loads or the number of multiple load steps.

In addition, the present embodiment includes an operation of performing power calibration during the power transfer phase if the load of the wireless power receiver changes in the power transfer phase. That is, in steps S1400 to S1425, the wireless power transmitter and the wireless power receiver are operating in the power transfer phase and the wireless power transmitter may continuously transmit wireless power.

The wireless power transmitter in the embodiments according to FIGS. 16 to 20 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, in this embodiment, the operation of transmitting wireless power may be performed by the power conversion unit 110. In addition, in the present embodiment, the operation of receiving the received power packet, the operation of performing power calibration, the operation of deriving or calculating the power transfer characteristic, the operation of performing FOD, etc., may be performed by the communication/control unit 120.

In addition, the wireless power receiver in the embodiment according to FIGS. 16 to 20 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, in this embodiment, an operation of receiving wireless power may be performed by the power pickup unit 210. In addition, in this embodiment, the operation of generating and transmitting the received power packet, the operation of performing power calibration, the operation of performing FOD, etc., may be performed by the communication/control unit 220.

Figure 21:
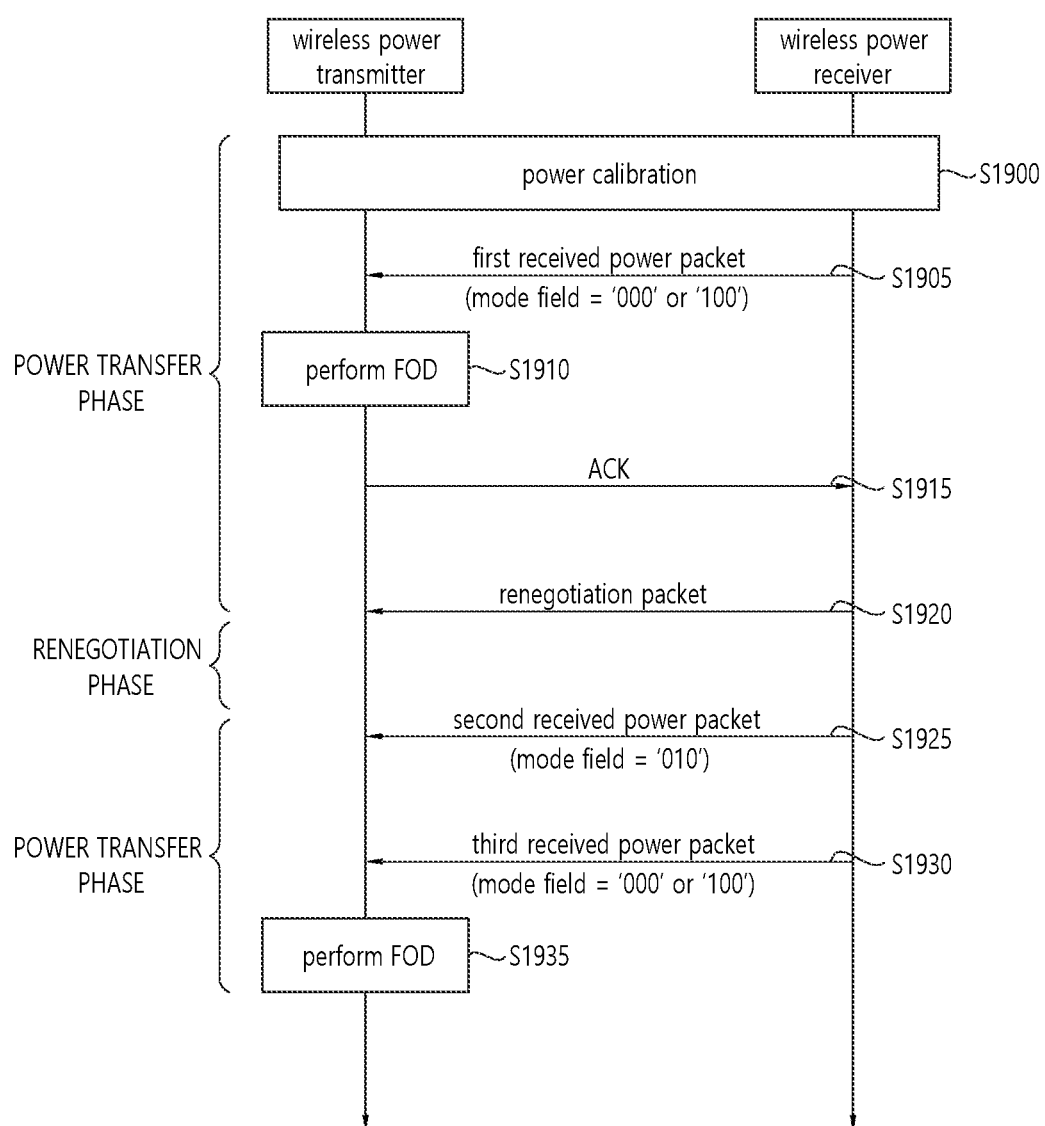
FIG. 21 is a flowchart illustrating a method of performing power calibration and foreign object detection (FOD) according to another embodiment.

FIG. 21 is a flowchart illustrating a method of performing power calibration and foreign object detection according to another embodiment. This embodiment relates to power re-calibration that performs power calibration again after the renegotiation phase.

Referring to FIG. 21, the wireless power transmitter and the wireless power receiver in the negotiation step establish an initial basic power contract (e.g., 5 W), and when the power transfer phase starts, the wireless power transmitter and the wireless power receiver perform power calibration (S1900). Here, the power calibration may include power calibration according to the embodiments described in FIGS. 16 to 20.

In one aspect, the power calibration according to step S1900 includes a step in which the wireless power receiver transmits a plurality of received power packets related to power calibration to the wireless power transmitter and a step in which the wireless power transmitter performs multiple calibrations using the power calibration data according to the plurality of received power packets. As an example, when the plurality of received power packets is two received power packets, multiple calibration may be two-point calibration. In the case of two-point calibration, a calibration curve or power transfer characteristic derived according to step S1900 may be as shown in FIG. 18. As another example, when the plurality of received power packets is three received power packets, multiple calibration may be three point calibration. In the case of three-point calibration, a calibration curve or power transfer characteristic derived according to step S1900 may be as shown in FIG. 19.

The wireless power receiver transmits the first received power packet with the mode field set to '000'b or '100'b (normal value) to the wireless power transmitter (S1905). The wireless power transmitter performs FOD based on the first received power packet to check whether there is a foreign object (S1910), and if no foreign object is detected, the wireless power transmitter transmits an ACK response for the first received power packet to the wireless power receiver (S1915). If it is determined that there is no foreign object based on the ACK response, the wireless power receiver transmits a renegotiation packet to the wireless power transmitter (S1920). In one aspect, the wireless power receiver supporting authentication may perform verification on the wireless power transmitter supporting authentication to determine whether the wireless power transmitter has been authenticated, and request renegotiation if the wireless power transmitted has been authenticated. By transmitting a renegotiation packet, the wireless power receiver requests renegotiation to update an existing power contract (e.g., increase to higher power). Here, the power contract may be updated with a higher required power (GP) (i.e., greater than 5 W) than the existing power.

After the renegotiation phase, the wireless power receiver transmits the second received power packet with the mode field set to '010'b to the wireless power transmitter (S1925). That is, the second received power packet is related to power adjustment, and upon receiving the second received power packet, the wireless power transmitter may perform power adjustment again under the requested power (or target power) updated by renegotiation.

When confirming that the mode field='010', the wireless power transmitter may store the received power value indicated by the second received power packet in the memory and perform power calibration. Through power calibration, a power transfer characteristic (or a calibration curve) as shown in FIG. 19 may be derived, for example. That is, when power calibration data (light load transmitted power (Ptr_light), light load calibration value (Prec_light), first connected-load transmitted power (Ptr_connected (1)), first connected-load calibration value (Prec_connected (1)), second connected-load transmitted power (Ptr_connected (2)), and second connected-load calibration value (Prec_connected (2)) are represented in the form of coordinates (x, y) composed of a pair of transmitted power and reception power by power calibration, first coordinates (Ptr_light, Prec_light), second coordinates (Ptr_connected(1), Prec_connected(1)), and third coordinates (Ptr_connected(2), Prec_connected(2)) may be derived and power transfer characteristics or calibration curves different in gradient in each section may be derived as shown in FIG. 19.

Meanwhile, steps S1920 and S1925 may be repeatedly performed.

Thereafter, when the wireless power receiver receives a received power packet indicating a normal value (i.e., mode field='000'b), rather than a received power packet (i.e., mode field='001'b or '010b') related to power calibration no longer for the power $P_{transmitted}$ transmitted by the wireless power transmitter (S1930), the wireless power transmitter performs FOD based on the transmitted power $P_{transmitted}$ and the received power $P_{received}$ (S1935). For example, step S1935 may include a step in which the wireless power transmitter performs FOD based on power loss according to FIG. 20.

Meanwhile, another embodiment includes a wireless power transmitter and method and a wireless power receiver and method for performing power calibration associated with an authentication procedure.

As an example, the wireless power receiver supporting authentication may adaptively perform power calibration according to whether the wireless power transmitter is authenticated or by authentication performing steps.

For example, the present embodiment includes a wireless power receiver and method including a step of performing power calibration using a connected load corresponding to a basic power profile (BPP or 5V) at the time of entering an initial power transfer phase, a step of verifying that the wireless power transmitter supports an authenticated (i.e., Qi-certified) extended power profile (EPP or 5 W or greater), a step of making a contract for power transfer with a desired target power value (i.e., 8 W or 15 W) when authentication is successfully performed as a result of verification, and a step of transmitting a received power packet regarding power calibration to the wireless power transmitter under a connected-load condition.

Thus, the wireless power transmitter is controlled to perform additional power calibration. Here, the step of making the contract for power transfer with the target power value (i.e. 8 W or 15 W) may be performed in a renegotiation phase. When receiving the received power packet RP/1 under the light load condition or the received power packet RP/2 under the connected-load condition, the wireless power transmitter may inform the wireless power received that the power calibration operation has been normally performed by sending an ACK signal for the RP(1) or RP(2) when it is controlled to the target operating point with reference to a control error packet value.

The wireless power transmitter in the embodiments according to FIG. 21 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, in this embodiment, the operation of transmitting wireless power may be performed by the power conversion unit 110. In addition, in the present embodiment, the operation of receiving the received power packet, the operation of performing power calibration, the operation of deriving or calculating the power transfer characteristic, the operation of performing FOD, etc., may be performed by the communication/control unit 120.

In addition, the wireless power receiver in the embodiment according to FIG. 21 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, in this embodiment, an operation of receiving wireless power may be performed by the power pickup unit 210. In addition, in this embodiment, the operation of generating and transmitting the received power packet, the operation of performing power calibration, the operation of performing FOD, etc., may be performed by the communication/control unit 220.

As described above, the wireless power transmitter and the wireless power receiver perform initial power calibration using RP/1 and RP/2 when entering the power transfer phase. Thereafter, when the wireless power receiver increases load power to RP/2 or greater, additional power calibration may be performed. However, the wireless power receiver may transmit an RP/2 packet for additional power calibration to the wireless power transmitter when the wireless power transmitter supports an additional power calibration mode (e.g., WPC ver.1.3 or higher). Here, whether additional power calibration is supported by the wireless power transmitter may be confirmed by a version number of a standard supported by the wireless power transmitter. For example, the WPC Qi wireless power transmitter may support additional power calibration only in ver.1.3 or higher. Meanwhile, regarding a wireless power transmitter supporting a higher version (e.g., WPC ver.1.3 or higher), the wireless power receiver may indicate RP/3 as shown in Table 5 and transmit the same to distinguish the RP/2 packet for additional power calibration from the existing RP/2.

Power Calibration Due to Change in Coupling and/or Foreign Object Insertion (1)

A position of the wireless power receiver may be changed by the user's intention or may be changed regardless of the user's intention. In addition, the change in the position of the wireless power receiver causes a change in coupling between the wireless power transmitter and the wireless power receiver. For example, if received power does not increase despite increased transmitted power, it may be due to a change in coupling or foreign object insertion. Alternatively, after a control error (CE) converges to 0, if the CE is suddenly changed despite no intentional change to a load of the wireless power receiver, it may be due to a change in coupling or foreign object insertion. The wireless power transmitter cannot discriminate between foreign object insertion and a change in coupling in the power transfer phase. When the wireless power transmitter detects a phenomenon related to a change in coupling or foreign object insertion, the wireless power transmitter may restart the entire foreign object detection procedure from the beginning.

When the coupling is changed, the existing power calibration is no longer valid because the power transfer characteristics at the light load/connected load depend on a specific coupling condition. In other words, the power transfer characteristic derived under a specific coupling condition is no longer valid if the coupling condition is changed.

Figure 22:
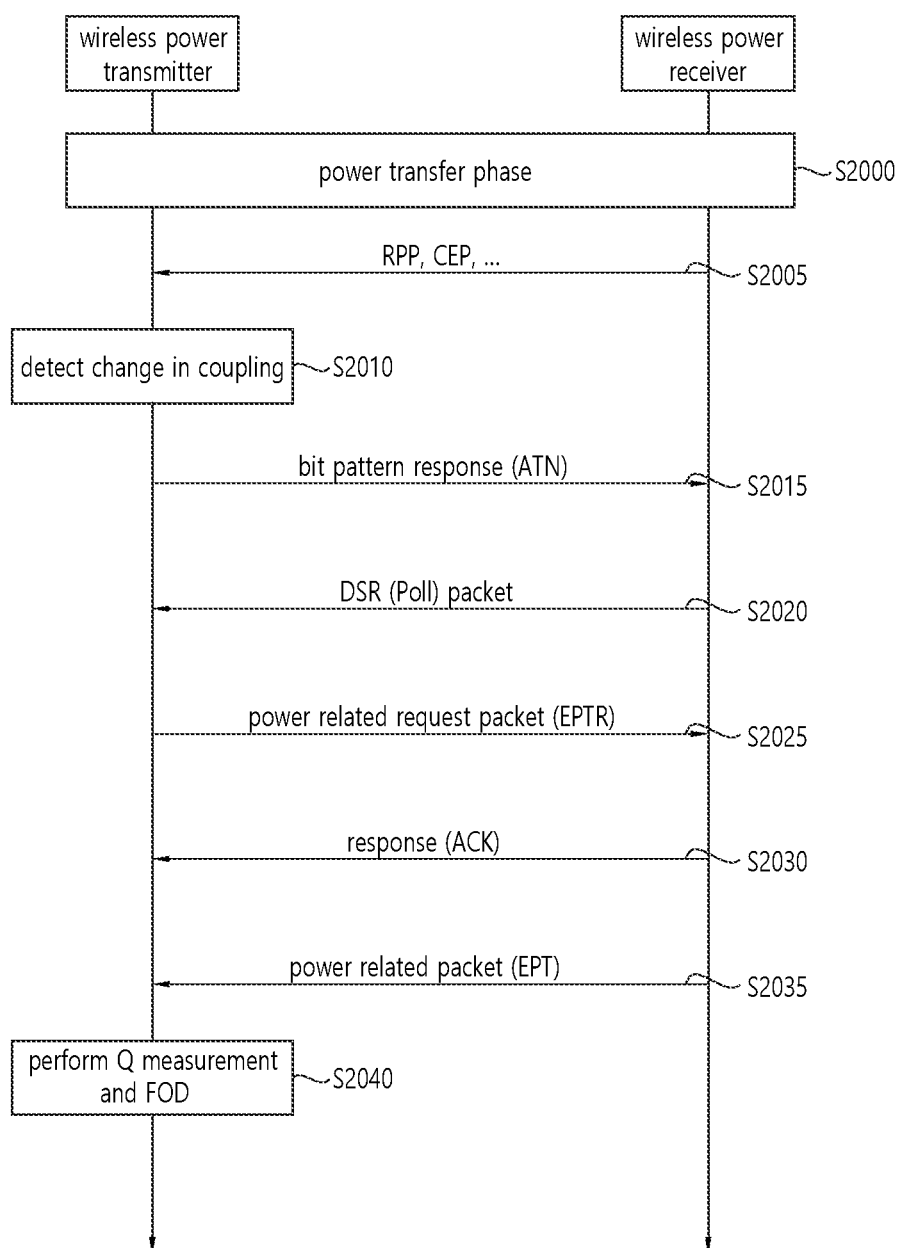
FIG. 22 is a flowchart illustrating a power calibration method based on a change in coupling according to an embodiment.

Hereinafter, a method of detecting a change in coupling and/or foreign object insertion and a method of re-performing FOD and/or performing power calibration according to a change in coupling and/or foreign object insertion will be described in more detail. Hereinafter, for convenience of description, the change in coupling and/or the insertion of a foreign object will be collectively referred to as a change in coupling. FIG. 22 is a flowchart illustrating an operation of the wireless power transmitter and the wireless power receiver according to the present embodiment.

FIG. 22 is a flowchart illustrating an operation of a wireless power transmitter and a wireless power receiver based on a change in coupling according to an embodiment.

Referring to FIG. 22, the wireless power transmitter transmits wireless power to the wireless power receiver in a power transfer phase (S2000). In the power transfer phase, the wireless power receiver transmits a received power packet (RPP) and a control error packet (CEP) to the wireless power transmitter (S2005).

The wireless power transmitter monitors information on power transmitted in the power transfer phase and/or information (or packet) received from the wireless power receiver and detects the occurrence of a change in coupling based on the monitoring result (S2010).

As an example, if transmitted power ($P_{transmitted}$) increases even though there is no increase in received power, the wireless power transmitter may determine that a change in coupling event has occurred or that a foreign object has been inserted.

As another example, after the control error (CE) converges to almost 0, if the CE is rapidly changed despite no intentional load change in the wireless power receiver while receiving RP/0, the wireless power transmitter may determine that a coupling change event has occurred or that a foreign object has been inserted. Here, the wireless power transmitter may determine whether the change in the CE is due to an intentional change in the load condition of the wireless power receiver through the mode field of the received power packet (RPP). That is, the wireless power transmitter may determine whether a coupling change event occurs based on CEP and RPP.

When the change in coupling (or foreign object insertion) is detected in step S2010, the wireless power transmitter performs the entire FOD procedure again (Q factor-based FOD and APLD) to detect a foreign object or perform power calibration. Here, the power calibration includes an operation of updating power calibration set before the change in coupling.

The wireless power transmitter may perform an operation of transmitting a specific bit pattern response to the wireless power receiver in response to the received power packet received in step S2005 in order to inform the wireless power receiver that a change in coupling has occurred (S2015).

FSK modulation may be used for transmission of the bit pattern response. For example, the bit pattern response is 8 bits and may be called ATN (attention) or RFC (request for communication). By setting the bit pattern response to a specific bit value and transmitting the same to the wireless power receiver, the wireless power transmitter may request the wireless power receiver to transmit a DSR (Poll) packet, request the wireless power receiver to transmit a power-related packet, draw the wireless power receiver's attention, request the wireless power receiver to transmit a specific packet (e.g., EPT packet), or provide a response for a packet received from the wireless power receiver. Here, the power-related packet may be an EPT packet or a re-ping initiation packet. When the power-related packet is the EPT packet, the EPT packet may include EPT/rst (0x0B).

As an example, an ACK response indicating a request approval may be indicated by a bit pattern of '11111111', a NAK response rejecting a request may be indicated by a bit pattern of '00000000', and an ND response indicating an unrecognizable or invalid request may be indicated by a bit pattern of '01010101'. In addition, ATN may be defined by various 8-bit sized bit patterns except for the bit patterns defined for the above ACK/NAK/ND responses. For example, ATN may be defined as '00001111', '11110000', '10101010', '10110110', '00110011', or '01001001'. However, this is merely an example, and the ATN may be configured with various bit patterns.

Since the ATN bit pattern response generally informs the wireless power receiver that there is a message to be transmitted by the wireless power transmitter, the wireless power receiver, upon receiving the ATN bit pattern response, transmits a DSR (poll) packet to the wireless power transmitter to specifically recognize for what reason the wireless power transmitter has sent the ATN bit pattern response (S2020).

In this case, the wireless power transmitter induces re-ping or power transfer interruption (EPT) by transmitting a power-related request packet to the wireless power receiver in response to a DSR (poll) packet (S2025). This is to perform power calibration again according to the change in coupling. Step S2025 corresponds to an operation requested by the wireless power transmitter to the wireless power receiver so that the wireless power receiver stops re-ping or power transfer. As an example, the power-related request packet is a packet transmitted by the wireless power transmitter to the wireless power receiver, and may also be referred to as an end power transfer request (EPTR) packet. In one aspect, the end power transfer request packet may have the same structure as the end power transfer (EPT) packet that the wireless power receiver transmits to the wireless power transmitter. For example, the end power transfer request packet may indicate the following values.

0x00—EPT/nul—use if none of the other codes is appropriate.

0x01—EPT/cc—charge complete; use to indicate that the battery is full.

0x02—EPT/if—internal fault; use if an internal logic error has been encountered.

0x03—EPT/ot—over temperature; use if (e.g.) the battery temperature exceeds a limit.

0x04—EPT/ov—over voltage; use if a voltage exceeds a limit.

0x05—EPT/oc—over current; use if the current exceeds a limit.

0x06—EPT/bf—battery failure; use if the battery cannot be charged.

0x08—EPT/nr—no response; use if the target operating point cannot be reached.

0x0A—EPT/an—aborted negotiation; use if a suitable Power Transfer Contract cannot be negotiated.

0x0B—EPT/rst—restart; use to restart the power transfer.

0x0C—EPT/rep—re-ping; use to restart the power transfer after a specified delay (the re-ping delay).

Here, a value of the end power transfer request packet in this embodiment may indicate restart or re-ping. Since an initiator of re-ping or power transfer stop is the wireless power receiver, the wireless power transmitter cannot arbitrarily enter re-ping or power transfer stop without permission of the wireless power receiver, and thus, a process of requesting re-ping or power transfer stop from the wireless power receiver which is an initiator of re-ping or power transfer stop is predeterminatively performed as in step S2025.

The wireless power receiver receiving the request of re-ping or power-related packet transmits ACK to the wireless power transmitter in response to the power-related request packet (S2030) and transmits the power-related packet to the wireless power transmitter (S2035). Here, the power-related packet may be called a re-ping initiation packet. As an example, the power-related packet may be an end power transfer (EPT) packet, and the EPT packet may be set to a value indicating re-ping (e.g., '0x0D' or '0x0C') or a value (e.g., '0x0B') indicating restart of power transfer. Re-ping may be performed after a specific predetermined re-ping delay. Here, the re-ping delay value may be set by, for example, a re-ping time (or delay) packet in a negotiation step (e.g., when the value of the EPT packet is '0x0C'). Alternatively, re-ping may be performed immediately during a negotiation step despite a specific re-ping delay time preset by the re-ping time (or delay) packet (e.g., in case where the value of the EPT packet='0x0D' or '0x0E').

When the power-related packet is received, the wireless power transmitter resets the wireless power receiver according to the value indicated by the power-related packet and performs Q measurement and FOD again (S2040). During the process of step S2040, the wireless power receiver may indicate that it is charging on a user interface although wireless power is not supplied to the wireless power receiver. The FOD in step S2040 may correspond to the FOD operation before power transfer. If the wireless power transmitter fails to receive the power-related packet within a certain time in step S2035, the wireless power transmitter may reset the wireless power receiver and perform the entire FOD procedure again.

In this case, the wireless power transmitter may suppress a step of transmitting an analog ping signal in the selection step and a step of detecting and identifying the wireless power receiver (a beep signal indicating detection/identification may be output here).

Here, power calibration may be performed again. In this case, in the present embodiment, the wireless power transmitter may include a step of performing FOD through Q measurement and new power calibration again. The new power calibration in this case may include the power calibration described in the embodiment of FIGS. 16 to 21. The new power calibration of the wireless power transmitter may include a power calibration operation of the wireless power transmitter according to the embodiments of FIGS. 16 to 21, and the new power calibration of the wireless power receiver may include a power calibration operation of the wireless power receiver according to the embodiment of FIGS. 16 to 21. Accordingly, additional power calibration according to the change in coupling is completed, and power calibration data such as the calibrated transmitted power value and/or a calibrated received power value according to the new power calibration may be derived.

The wireless power transmitter in the embodiments according to FIG. 22 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, in the present embodiment, the operation of transmitting wireless power to the wireless power receiver in the power transfer phase according to step S2000 may be performed by the power conversion unit 110. In addition, the operation of receiving RPP, CEP, etc., according to step S2005, the operation of detecting a change in coupling according to step S2010, the operation of transmitting a power-related request packet according to step S2025, the operation of receiving a power related packet according to step S2035, and the operation for performing Q measurement and FOD according to S2040 may be performed by the communication/control unit 120.

In addition, the wireless power receiver in the embodiment according to FIG. 22 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, in this embodiment, the operation of receiving wireless power from the wireless power transmitter in the power transfer phase according to step S2000 may be performed by the power pickup unit 210. In addition, the operation of generating and transmitting a packet such as RPP, CEP, etc., according to step S2005, the operation of detecting a change in coupling according to step S2010, the operation of receiving a power related request packet according to step S2025, and the operation of generating and transmitting a power related packet according to step S2035 may be performed by the communication/control unit 220.

The power calibration method according to FIG. 22 is an example of a case where the wireless power receiver is an initiator of re-ping. Hereinafter, however, for instant re-ping, the wireless power transmitter may be an initiator of re-ping. Accordingly, hereinafter, a method of calibrating power when the initiator of re-ping is a wireless power transmitter is disclosed.

Figure 23:
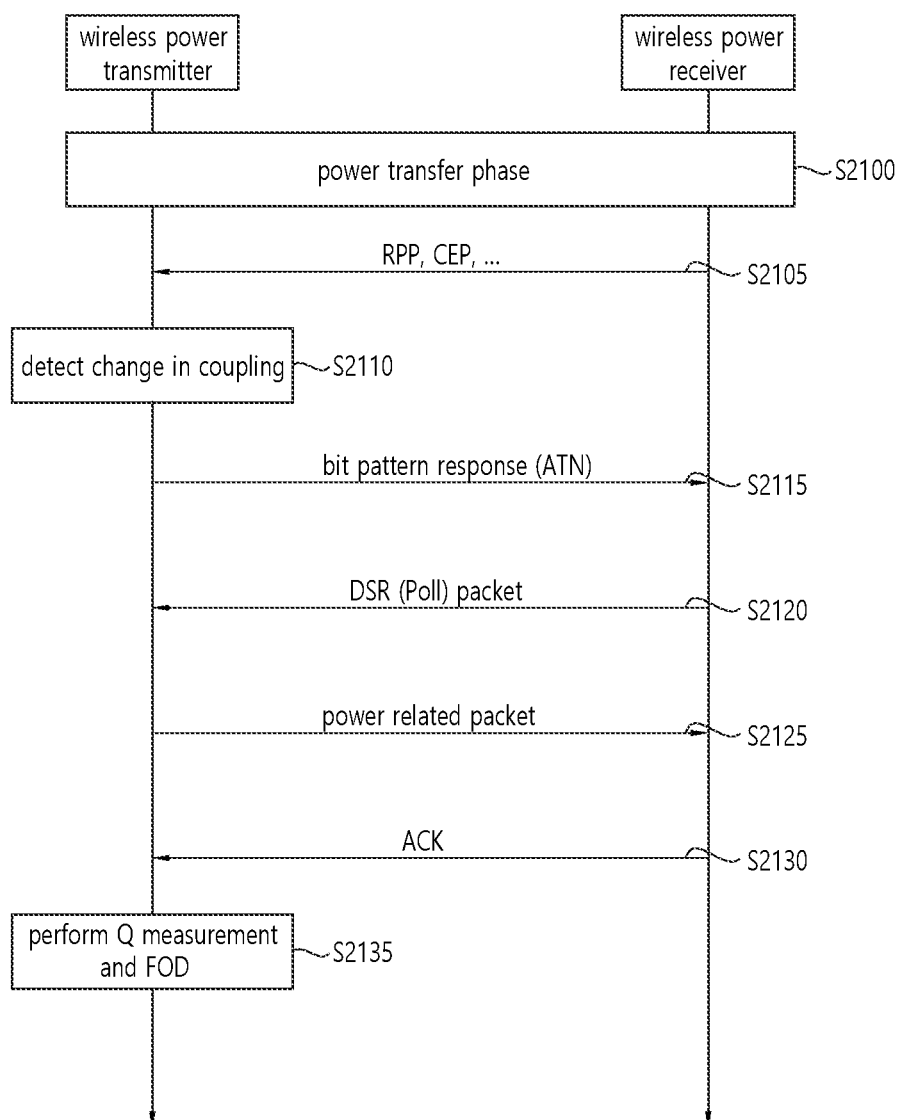
FIG. 23 is a flowchart illustrating a power calibration method based on a change in coupling according to another embodiment.

FIG. 23 is a flowchart illustrating a power calibration method based on a change in coupling according to another embodiment.

Referring to FIG. 23, steps S2100 to S2120 are the same as steps S2000 to S2020, respectively. However, in the embodiment of FIG. 23, since the wireless power transmitter is an initiator of re-ping, the wireless power transmitter transmits a power-related packet instead of sending a power-related request packet to the wireless power receiver (S2125) and receive ACK from the wireless power receiver (S2130) to enter the power calibration phase. The power-related packet in step S2125 is, for example, 1 byte (8 bits) and may have a format of a re-ping packet as shown in FIG. 24.

FIG. 24 shows a format of a re-ping packet according to an example.

Referring to FIG. 24, the re-ping packet may have a packet structure including reserved bits of 2 bits and a field (e.g., 6 bits) indicating re-ping time information. The re-ping time information is a natural number from 1 to 64 and is used to calculate the re-ping time Tre-ping. For example, the re-ping time may be Tre-ping=(ripping time information)× 0.2 s. Therefore, the re-ping time is 0.2 s, 0.4 s, . . . , 12.6 s. Of course, the number of bits included in the field indicating the reserved bit and the re-ping time may be variously modified.

Referring back to FIG. 23, the wireless power transmitter may perform the entire FOD procedure again (Q factor based FOD and APLD) to detect a foreign object or perform power calibration (S2135). The FOD in step S2135 may correspond to the FOD operation before power transfer. As an example, re-execution of the FOD procedure includes a process in which the wireless power transmitter removes power and restarts from Q measurement to a digital ping step. As another example, power calibration includes an operation of updating the power calibration set before the change in coupling.

While re-ping is performed, the wireless power transmitter may suppress a step of transmitting an analog ping signal in the selection step and a step of detecting and identifying the wireless power receiver (a beep signal indicating detection/identification may be output here).

If the wireless power receiver receives the digital ping signal earlier or later than the re-ping time, this may indicate that the wireless power receiver overlying the wireless power transmitter has been replaced by the user. Accordingly, the wireless power receiver may perform a default UX (a message indicating a beep signal or initiation of wireless charging to the user).

The wireless power transmitter in the embodiments according to FIG. 23 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, in the present embodiment, the operation of transmitting wireless power to the wireless power receiver in the power transfer phase according to step S2100 may be performed by the power conversion unit 110. In addition, the operation of receiving RPP, CEP, etc., according to step S2105, the operation of detecting a change in coupling and/or insertion of a foreign object according to step S2110, the operation of generating and transmitting a bit pattern response according to step S2115, the operation of receiving a DSR packet according to step S2120, the operation of transmitting the power-related packet according to step S2125, the operation of receiving the ACK response according to step S2130, and the operation of performing Q measurement and FOD or performing power calibration according to step S2135 may be performed by the communication/control unit 120.

In addition, the wireless power receiver in the embodiment according to FIG. 23 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, in this embodiment, the operation of receiving wireless power from the wireless power transmitter in the power transfer phase according to step S2100 may be performed by the power pickup unit 210. In addition, the operation of generating and transmitting a packet such as RPP, CEP, etc., according to step S2105, the operation of receiving a bit pattern response according to step S2115, the operation of generating and transmitting a DSR packet according to step S2120, the operation of receiving the power-related packet according to step S2125, and the operation of transmitting ACK according to S2130 may be performed by the communication/control unit 220.

Power Calibration Due to Load Change (2): using RP/3

Figure 25:
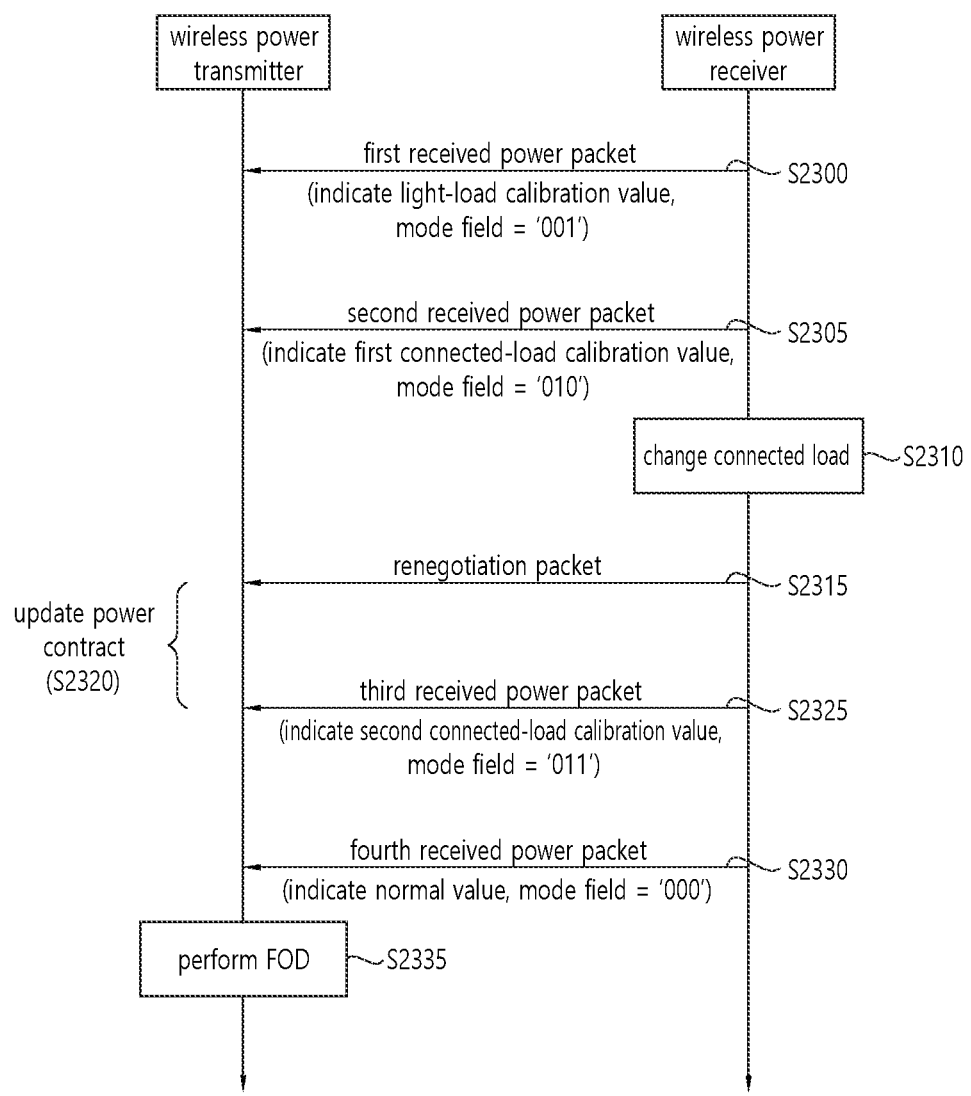
FIG. 25 is a flowchart illustrating a method of performing power calibration and FOD according to an embodiment.

FIG. 25 is a flowchart illustrating a method of performing power calibration and FOD according to an embodiment.

Referring to FIG. 25, the wireless power receiver receives and measures transmitted power (hereinafter, referred to as first light load transmitted power; Ptr_light) from the wireless power transmitter in a light-load condition and transmits a first received power packet (RPP) indicating a received power value under the light load condition to the wireless power transmitter (S2300). The first received power packet may have, for example, the format of FIG. 17. In addition, the mode field indicates a method for interpreting the received power value, and an example of the mode field is shown in Table 5.

TABLE 5

| Mode | Indication contents |
|---|---|
| '000' | Normal value; response requested |
| '001' | Light-load calibration value; response requested |
| '010' | Connected-load calibration value; response requested |
| '011' | Multi-point connected-load calibration value, response requested |
| '100' | Normal value; no response requested |

Referring to Table 5, the mode field='000' indicates that a received power value is a normal power value (which may be indicated as RP/0), and the mode field='001', '010', and '011' may indicate that the received power packet is related to power calibration (which may be represented by RP/1, RP/2, and RP/3, respectively). That is, the wireless power receiver may indicate power calibration by transmitting a received power packet having the mode field='001', '010', or '011' to the wireless power transmitter. Specifically, if the mode field='001' (i.e., RP/1), the received power packet may indicate a power value (hereinafter, referred to as a light-load calibration value, Prec_light) received by the wireless power receiver when the wireless power receiver is in the light-load condition. Also, if the mode field='010' (i.e., RP/2), the received power packet may indicate a power value (hereinafter, referred to as a connected-load calibration value, Prec_connected) received by the wireless power receiver when the wireless power receiver is in the connected-load condition. Also, if the mode field='011' (i.e., RP/3), it may indicate that the received power packet is related to a multi-point connected-load calibration value. The light load condition may refer to a condition in which a load (e.g., a battery) is not electrically connected to the wireless power receiver, and the connected-load condition may refer to a condition in which a load is connected to the wireless power receiver.

The wireless power transmitter and the wireless power receiver perform initial power calibration using RP/1 and RP/2 when entering the power transfer phase. Thereafter, when the wireless power receiver increases the load power to RP/2 or greater, additional power calibration is required. Accordingly, the wireless power receiver transmits the RP/3 to the wireless power transmitter, so that the wireless power transmitter may perform additional power calibration.

Here, the wireless power receiver may transmit an RP/3 packet for additional power calibration to the wireless power transmitter when the wireless power transmitter supports an additional power calibration mode (e.g., WPC ver.1.3 or higher). Whether the wireless power transmitter supports additional power calibration may be confirmed, for example, by a version number of a standard supported by the wireless power transmitter. That is, the WPC Qi wireless power transmitter may support additional power calibration only in ver.1.3 or higher.

Referring back to FIG. 25, since the first received power packet indicates the received power value (i.e., the light load calibration value, Prec_light) measured under the light load condition, the mode field of the first received power packet is '001' (i.e., RP/1). Therefore, step S2300 may further include a step in which the wireless power receiver sets the mode field='001'. When the mode field='010' is confirmed, the wireless power transmitter identifies that the received power value indicated by the second received power packet is the light-load calibration value (Prec_light). The wireless power transmitter may store the light-load calibration value (Prec_light) in the memory to perform power calibration. Although not shown, the wireless power transmitter may transmit an ACK or NAK to the wireless power receiver in response to the first received power packet. Also, the first received power packet may be transmitted multiple times or continuously. In this case, the first received power packet (i.e., RP/1) which is continuously transmitted may be treated as one received power packet (i.e., a single RP/1).

In one aspect, when receiving the RP/1, the wireless power transmitter transmits NAK until the wireless power receiver stably reaches the corresponding power level (while monitoring the CE value), and when the power level is stabilized, the wireless power transmitter transmits ACK and takes the RP1 value at that time.

The wireless power receiver receives and measures the first connected-load transmitted power (Ptr_connected (1)) from the wireless power transmitter under the first connected-load condition and then transmits the second received power packet (i.e., RP/2) indicating the first connected-load calibration value (Prec_connected (1)) to the wireless power transmitter (S2305).

Step S2305 may further include a step in which the wireless power receiver sets the mode field='010'. When the mode field='010' is confirmed, the wireless power transmitter identifies that the received power value indicated by the second received power packet is the first connected-load calibration value (Prec_connected (1)). The wireless power transmitter may store the first connected-load calibration value (Prec_connected (1)) in the memory to perform power calibration.

Power transfer characteristics or calibration curves according to FIG. 18 and Equations 1 to 2 may be derived, for example, based on RP/1 and RP/2.

The wireless power receiver changes the connected-load (S2310). The change in the connected-load may include an increase or decrease in the connected-load. The change in the connected-load may mean that a target rectified voltage (target Vrec) or target power of the wireless power receiver increases or decreases compared to the previous connected-load. A situation in which the connected-load is changed may include a case in which the wireless power receiver uses multiple load steps to reach the target power. When the connected-load is changed, at least a part of the previously set power transfer characteristics may be changed, or additional power transfer characteristics may be set, while maintaining the previously set power transfer characteristics. For example, if the transmitted power Ptr increases to a range where Ptr_connected (1)<Ptr due to an increase in the connected-load, the power transfer characteristic of FIG. 18 cannot cover this situation.

Accordingly, in order to reflect the state in which the connected-load is changed in the power calibration and improve FOD performance, the wireless power transmitter and/or the wireless power receiver perform multi-point power calibration. To this end, the wireless power receiver receives and measures the second connected-load transmitted power (Ptr_connected (2)) from the wireless power transmitter under the second connected-load condition, and then transmits a third received power packet RP/3 indicating the second connected-load calibration value (Prec_connected (2)) to the wireless power transmitter (S2315). When the wireless power transmitter responds with ACK to the second received power packet RP/2 in step S2310, additional RP/2 transmission of the wireless power receiver may not be permitted. However, in order to improve the power loss-based foreign object detection function, the limitation on the timing of power calibration may be removed and multi-point power calibration of two or more points may be required, and thus, the transmission of the third received power packet as in step S2325 may be permitted.

Step S2325 may further include a step in which the wireless power receiver set the mode field to '011' (mode field='011'). When it is confirmed that the mode field='011', the wireless power transmitter identifies that the received power value indicated by the third received power packet is a multi-point calibration value (Prec_connected (2)). Since the mode field='011', the wireless power transmitter may know that additional power calibration is required.

As an example related to a transmission timing of RP/3, the transmission of RP/3 may be performed at any time at which the wireless power receiver steps up the target load power. That is, initial power calibration is performed based on RP/1 and RP/2 at the start of the power transfer phase (according to steps S2300 to S2310), and after the initial power calibration, multi-point power calibration may be performed at any time at which the wireless power receiver gradually steps up the target load power.

As another example related to a transmission timing of RP/3, the wireless power receiver may transmit RP/3 between a plurality of RP/0s or between a plurality of RP/0s and CEP in the power transfer phase. Here, the transmission of the RP/3 may be performed at any time at which the wireless power receiver steps up the target load power.

In order to perform multi-point power calibration, the wireless power transmitter may store the second connected-load calibration value (Prec_connected (2)) in the memory.

Based on the power calibration data obtained through steps S2300, S2305, and S2325, power transfer characteristics may be derived or set. The derived power transfer characteristics may be, for example, shown in FIG. 19 and Equations 3 to 6.

Regarding the power $P_{transmitted}$ transmitted by the wireless power transmitter, if the wireless power receiver receives a fourth received power packet (i.e., RP/0) indicating a normal value (i.e., mode field='000'b) $P_{received}$, rather than the received power packet (i.e., mode field='001'b or '010b') related to power calibration no longer, (S2330), the wireless power transmitter completes power calibration and performs FOD based on the transmitted power $P_{transmitted}$ and the received power $P_{received}$ (S2335). For example, step S2335 may include a step in which the wireless power transmitter performs FOD based on power loss according to FIG. 20.

Although not shown, the wireless power transmitter may transmit ACK or NAK to the wireless power receiver in response to RP/1, RP/2, and RP/3. The wireless power transmitter may repeat the operation of transmitting the NAK to the wireless power receiver until control is achieved to a target operating point. In addition, the wireless power receiver may transmit one or more CE packet(s) between all received power packets including RP/2, RP/2, and RP/3.

For example, according to the embodiment of FIG. 25, the wireless power receiver transmits the first received power packet RP/1 to the wireless power transmitter (S2300). However, if the corresponding power level is not reached, the wireless power transmitter transmits the NAK to the wireless power receiver. In this case, the wireless power transmitter checks one or more CE packet(s) transmitted from the wireless power receiver, while changing the operating point and determines whether the wireless power receiver has reached the target operating point. This process (RP/1 (NAK)-CE-CE-CE-CE-RP1 (NAK)-CE-CE-CE) is repeated, and when the power level is stable, the wireless power transmitter transmits ACK and takes the RP/1 value at that time as power calibration data.

When the ACK is received in response to the first received power packet RP/1, the wireless power receiver transmits the second received power packet RP/2 to the wireless power transmitter (S2305). However, if the corresponding power level is not reached, the wireless power transmitter transmits NAK to the wireless power receiver. In this case, the wireless power transmitter checks one or more CE packet(s) transmitted from the wireless power receiver, while changing the operating points, and determines whether the wireless power receiver has reached a target operating point. The process (RP/2 (NAK)-CE-CE-CE-CE-RP2(NAK)-CE-CE-CE) is repeated and when the power level is stable, the wireless power transmitter transmits ACK and takes the RP/2 value at that time as a power calibration parameter.

Thereafter, the wireless power receiver transmits the third received power packet RP/3 to the wireless power transmitter according to a change in the connected-load (S2310) (S2325). However, if the corresponding power level is not reached, the wireless power transmitter transmits NAK to the wireless power receiver. In this case, the wireless power transmitter checks one or more CE packet(s) transmitted from the wireless power receiver, while changing the operating points, and determines whether the wireless power receiver has reached a target operating point. The process (RP/3(NAK)-CE-CE-CE-CE-RP3(NAK)-CE-CE-CE) is repeated and when the power level is stable, the wireless power transmitter transmits ACK and takes the RP/3 value at that time as power calibration data.

Thereafter, the wireless power receiver receives a received power packet indicating the normal value (i.e., mode field='000'b) $P_{received}$, rather than the received power packet (i.e., mode field='001'b or '010b') related to power calibration no longer, (S330), the wireless power transmitter calibrates the $P_{received}$ based on the power calibration, calculates power loss, and performs FOD based on the power loss (S2335).

The wireless power transmitter in the embodiments according to FIG. 25 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, processing of power calibration, transmission of ACK/NAK, and/or reception of RP and CEP by the wireless power transmitter in the above embodiments may be performed by the communication/control unit 120.

In addition, the wireless power receiver in the embodiment according to FIG. 25 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, processing of power calibration, transmission of RP and CEP, and/or reception of ACK/NAK by the wireless power receiver in the above embodiments may be performed by the communication/control unit 220.

Another embodiment of the present disclosure includes a wireless power transmitter and method and a wireless power receiver and method for performing power calibration associated with an authentication procedure, That is, multi-point power calibration may be performed in association with authentication.

As an example, a method of performing multi-point power calibration for a wireless power receiver without an authentication function may include performing an initial power calibration using RP/1 and/or RP/2 at an intermediate power level (e.g., basic power profile (BPP or 5 W) when the wireless power transmitter and the wireless power receiver enter an initial power transfer phase, performing power transfer at the intermediate power level by the wireless power transmitter, and continuously transmitting, by the wireless power receiver, the RP/3 packet to the wireless power transmitter after the initial power calibration to increase a load power to a target load power by stages. Here, the wireless power receiver may perform uncalibrated or partially power-calibrated FOD. In addition, the wireless power receiver may transmit RP/0, while maintaining the power level.

As another example, a method of performing multi-point power calibration for a wireless power receiver without an authentication function may include performing initial power calibration using RP/1 and/or RP/2 at an intermediate power level (e.g., basic power profile (BPP or 5 W) when the wireless power transmitter and the wireless power receiver enters the initial power transfer phase, performing power transfer by the wireless power transmitter at the intermediate power level, transmitting, by the wireless power receiver, RP/0 to the wireless power transmitter, while maintaining the target load power, and transmitting, by the wireless power receiver, an RP/3 packet to the wireless power transmitter at any timing to increase the load power by stages. Here, the wireless power receiver may perform uncalibrated or partially power-calibrated FOD.

As another example, a method of performing multi-point power calibration for a wireless power receiver that performs an authentication function includes performing initial power calibration based on RP/1 and/or RP/2 at an intermediate power level (i.e., BPP or 5 W) when the wireless power transmitter and the wireless power receiver enters the initial power transfer phase, performing authentication by the wireless power transmitter and/or the wireless power receiver transmits power at the intermediate power level, and transmitting, by the wireless power receiver, an RP/3 packet to the wireless power transmitter to increase the load power by stages after authentication is successfully completed. Here, the step of performing authentication may further include verifying whether authenticated (i.e., Qi-certified) extended power profile (EPP or 5 W or greater) is supported and making a contract for power transfer at a desired target power value (i.e., 8 W or 15 W) when authentication is successfully performed as a result of the verification. Also, the wireless power receiver may transmit an RP/0 packet to the wireless power transmitter during authentication.

Accordingly, the wireless power transmitter is controlled to perform additional power calibration. Here, the step of making the contract for power transfer with the target power value (i.e. 8 W or 15 W) may be performed in the renegotiation phase. That is, after the authentication is completed and the renegotiation phase, the wireless power receiver may increase the target power. In this case, the wireless power receiver performs additional power calibration by transmitting the RP/3 to the wireless power transmitter.

Power Calibration Due to Change in Coupling and/or FOD (2): Using EPT/fod

When the wireless power transmitter performs FOD using the RP/0 value, the wireless power transmitter does not clearly distinguish between a change due to actual foreign object insertion and a change caused by the user moving the wireless power receiver, and thus, the wireless power transmitter may re-perform FOD using Q and a resonant value to stop power transfer only when a foreign object is actually detected.

Accordingly, there is also a need for a method for preventing foreign object misdetection by redoing pre-power FOD when a foreign object is inserted midway or coupling is changed. This method may be performed based on an end power transfer (EPT) packet.

The method for performing FOD according to an embodiment includes monitoring, by the wireless power transmitter and/or the wireless power receiver, a RP/0 and/or CEP, detecting, by the wireless power transmitter and/or the wireless power receiver, the occurrence of a specific event, transmitting, by the wireless power receiver, a EPT packet (EPT/fod) for FOD to the wireless power transmitter, and performing, by the wireless power transmitter, FOD based on the EPT packet.

Here, the specific event includes, for example, a case where a foreign object is inserted or a case where coupling is changed as the wireless power receiver is moved due to an external influence during the power transfer phase.

The EPT packet for the FOD generated by the wireless power receiver may be, for example, EPT/fod or EPT/rst or EPT/rep ((0x0B—EPT/rst—restart; use to restart the power transfer/0x0C—EPT/rep—re-ping; use to restart the power transfer after a specified delay (the re-ping delay)). The EPT packet for the FOD may have a structure as shown in FIG. 17 and may indicate any one of the values in Table 6 below.

TABLE 6

> 0x00-EPT/nul-use if none of the other codes is appropriate.> 0x01-Reserved> 0x02-EPT/if-internal fault; use if an internal logic error has been encountered.> 0x03-EPT/ot-over temperature; use if (e.g.) the battery temperature exceeds a limit.> 0x04-EPT/ov-over voltage; use if a voltage exceeds a limit.> 0x05-EPT/oc-over current; use if the current exceeds a limit.> 0x06-Reserved> 0x08-Reserved.> 0x0A-Reserved.> 0x0B-EPT/rst-restart; use to restart the power transfer. NOTE Typically, a Power Transmitter engages in FOD after stopping the power transfer and before restarting it. For details about this procedure, see the Qi Specification, Foreign Object Detection.> 0x0C-EPT/rep-re-ping; use to restart the power transfer after a specified delay (the re-ping delay). NOTE A Power Receiver should use this End Power Transfer Code only if it has verified that the Power Transmitter complies with version 1.3 or higher of the Qi Specification.> EPT/rfid-RFID/NFC card; use if an RFID/NFC card has been detected> EPT/fod - Pre-power FOD and re-calibration Here, the EPT/fod may indicate a reason for pre-power FOD and additional power calibration. That is, the wireless power receiver may use the EPT/fod value when the necessity of FOD and additional power calibration before power transfer is recognized from internal observation. As an example, the wireless power transmitter may determine a case of suspected foreign object insertion using a calibrated power value and the wireless power receiver may suspect foreign object insertion when a received power value or an operating point (e.g., rectified voltage) value is abnormally changed.

The EPT/rst may cause the wireless power transmitter and/or the wireless power receiver to cause noise due to restart and may give the user an undesirable experience. EPT/rep may be used To provide a better wireless charging service to the user. That is, the wireless power receiver may transmit EPT/rep packets to the wireless power transmitter. In this case, the wireless power transmitter may further include measuring a Q factor before power transfer (pre-power) and performing FOD through new power calibration.

If the wireless power receiver uses EPT/rep, there is a problem that the wireless power transmitter cannot determine a time required for pre-power FOD. Therefore, it is necessary to define EPT/fod by a new code of the EPT packet. In addition, the wireless power receiver transmits the EPT/fod packet to the wireless power transmitter so that the wireless power transmitter stops power transfer and performs pre-power FOD. EPT/fod packets, like EPT/rep packets, are defined to prevent noise from occurring in the wireless power transmitter and/or the wireless power receiver.

A method for performing FOD according to another embodiment includes monitoring, by the wireless power transmitter and/or the wireless power receiver, a RP/0 and/or CEP, detecting, by the wireless power transmitter and/or the wireless power receiver, the occurrence of a specific event, transmitting, by the wireless power transmitter, an EPT packet (EPT/fod) for FOD to the wireless power receiver, performing FOD, by the wireless power transmitter, based on the EPT packet, and re-starting power transfer according to the result of FOD.

In one aspect, the EPT packet for FOD generated by the wireless power transmitter may have the same structure as the EPT packet for FOD generated by the wireless power receiver as shown in FIG. 17. In this case, the EPT packet may indicate any one of the values in Table 7 below

TABLE 7

> 0x00-EPT/nul-use if none of the other codes is appropriate.> 0x01-Reserved> 0x02-EPT/if-internal fault; use if an internal logic error has been encountered.> 0x03-EPT/ot-over temperature; use if (e.g.) the battery temperature exceeds a limit.> 0x04-EPT/ov-over voltage; use if a voltage exceeds a limit.> 0x05-EPT/oc-over current; use if the current exceeds a limit.> 0x06-Reserved> 0x08-Reserved.> 0x0A-Reserved.> 0x0B-EPT/rst-restart; use to restart the power transfer. NOTE Typically, a Power Transmitter engages in FOD after stopping the power transfer and before restarting it. For details about this procedure, see the Qi Specification, Foreign Object Detection.> 0x0C-EPT/rep-re-ping; use to restart the power transfer after a specified delay (the re-ping delay). NOTE A Power Receiver should use this End Power Transfer Code only if it has verified that the Power Transmitter complies with version 1.3 or higher of the Qi Specification.> EPT/rfid-RFID/NFC card; use if an RFID/NFC card has been detected> EPT/fod - Pre-power FOD and re-calibration For example, the EPT packet may indicate a specific value signifying EPT/fod, and here, EPT/fod may indicate pre-power FOD and a reason for additional power calibration. That is, the wireless power transmitter may use the EPT/fod value when the necessity of pre-power FOD and the additional power calibration is recognized from internal observation.

In another aspect, the EPT packet for FOD generated by the wireless power transmitter may have a different structure from the EPT packet for FOD generated by the wireless power receiver. In this case, at least some of the values in Table 8 below indicating the EPT packet may be reused.

TABLE 8

> 0x00-EPT/nul-use if none of the other codes is appropriate.>
0x01-Reserved> 0x02-EPT/if-internal fault; use if an internal logic error has been encountered.> 0x03-EPT/ot-over temperature; use if (e.g.) the battery temperature exceeds a limit.> 0x04-EPT/ov-over voltage; use if a voltage exceeds a limit.> 0x05-EPT/oc-over current; use if the current exceeds a limit.> 0x06-Reserved> 0x08-Reserved.> 0x0A-Reserved.> 0x0B-EPT/rst-restart; use to restart the power transfer. NOTE Typically, a Power Transmitter engages in FOD after stopping the power transfer and before restarting it. For details about this procedure, see the Qi Specification, Foreign Object Detection.> 0x0C-EPT/rep-re-ping; use to restart the power transfer after a specified delay (the re-ping delay). NOTE A Power Receiver should use this End Power Transfer Code only if it has verified that the Power Transmitter complies with version 1.3 or higher of the Qi Specification.> EPT/rfid-RFID/NFC card; use if an RFID/NFC card has been detected> EPT/fod - Pre-power FOD and re-calibration Meanwhile, before the step of transmitting, by the wireless power transmitter, the EPT packet for FOD to the wireless power receiver, a step of transmitting, by the wireless power transmitter, ATN to the wireless power receiver, a step of transmitting, by the wireless power receiver, CEP to the wireless power transmitter, and a step of transmitting, by the wireless power receiver, DSR/poll to the wireless power transmitter may be performed. In addition, upon receiving the EPT packet for FOD, the wireless power receiver may transmit DSR/ACK to the wireless power transmitter.

Meanwhile, after restarting power transfer based on the EPT/fod packet, the wireless power transmitter and the wireless power receiver may immediately enter the power transfer phase if it is determined that there is no foreign object. The method of entering the power transfer phase may be different depending on a case where the user wants to enter the power transfer phase immediately after restarting and a case where a full protocol is to be performed. Specifically, the operation of entering the power transfer phase may be defined as follows from the standpoint of the wireless power receiver and the wireless power transmitter.

First, the operation of the wireless power receiver is as follows.

As an example, the wireless power receiver may transmit RP/0 as a first packet to the wireless power transmitter when it is desired to enter the power transfer phase immediately after restarting. After the restart, initial power calibration may be performed at the power transfer phase, and the previous power contract may be effectively preserved.

As another example, when attempting to perform a full protocol after restart, the wireless power receiver may transmit a signal strength (SS) packet as a first packet to the wireless power transmitter.

In this case, the wireless power receiver enters the power transfer phase through a digital ping step, an identification and configuration step, and a negotiation step after restarting. In addition, the wireless power receiver performs initial power calibration by transmitting RP/1 and RP/2 at the start of power transfer, and thereafter, the wireless power receiver may perform additional power calibration by transmitting RP/3 each time the target load power is increased.

Next, the operation of the wireless power transmitter is as follows.

The wireless power transmitter may have a different procedure to enter the power transfer phase according to an initial packet of the wireless power receiver.

As an example, when the wireless power transmitter receives a signal strength (SS) packet as a first packet from the wireless power receiver, the wireless power transmitter performs a full protocol.

Figure 26:
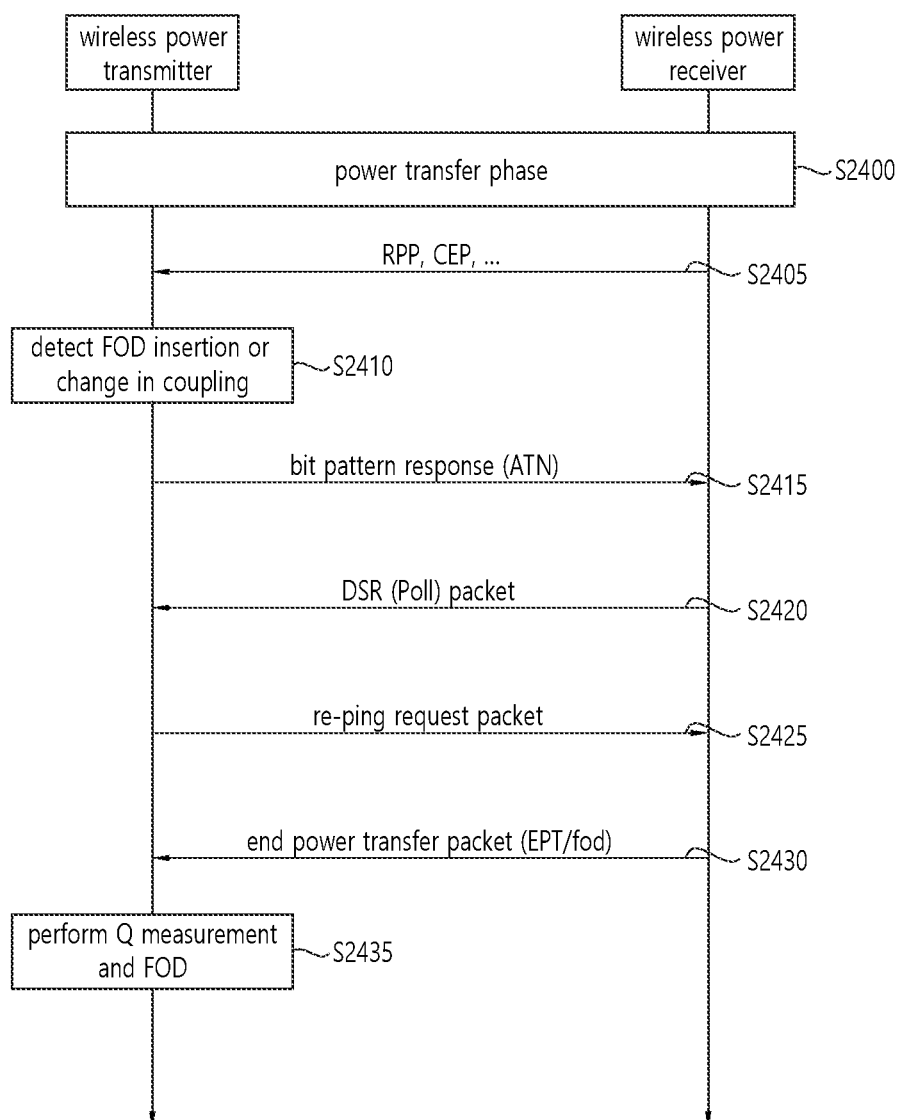
FIG. 26 is a flowchart illustrating a power calibration method based on foreign object insertion or a change in coupling according to an embodiment.

FIG. 26 is a flowchart illustrating a power calibration method based on a foreign object insertion or a change in coupling according to an embodiment.

Referring to FIG. 26, the wireless power transmitter transmits wireless power to the wireless power receiver in the power transfer phase (S2400). In the power transfer phase, the wireless power receiver transmits a received power packet (RPP) and a control error packet (CEP) to the wireless power transmitter (S2405).

The wireless power transmitter monitors information on power transmitted in the power transfer phase and/or information (or packet) received from the wireless power receiver and detects foreign object insertion or a change in coupling based on the monitoring result (S2410).

As an example, if the transmitted power ($P_{transmitted}$) is increased despite no increase in the received power, the wireless power transmitter may determine that a coupling change event has occurred or that a foreign object has been inserted.

As another example, after the control error (CE) converges to almost 0, if the CE is rapidly changed despite no intentional load change in the wireless power receiver, the wireless power transmitter may determine that a coupling change event has occurred or that a foreign object has been inserted. Here, the wireless power transmitter may determine whether the change in the CE is due to an intentional change in the load condition of the wireless power receiver through the mode field of the received power packet (RPP). That is, the wireless power transmitter may determine whether a coupling change event occurs based on CEP and RPP.

When the change in coupling (or foreign object insertion) is detected in step S2410, the wireless power transmitter performs the entire FOD procedure again (Q factor-based FOD and APLD) to detect a foreign object or perform power calibration. Here, the power calibration includes an operation of updating power calibration set before the change in coupling.

The wireless power transmitter may perform an operation of transmitting a specific bit pattern response to the wireless power receiver in response to the received power packet received in step S2405 in order to inform the wireless power receiver that a change in coupling has occurred (S2415).

FSK modulation may be used for transmission of the bit pattern response. For example, the bit pattern response is 8 bits and may be called ATN (attention) or RFC (request for communication). By setting the bit pattern response to a specific bit value and transmitting the same to the wireless power receiver, the wireless power transmitter may request the wireless power receiver to transmit a DSR (Poll) packet or to transmit an EPT/fod packet.

As an example, an ACK response indicating a request approval may be indicated by a bit pattern of '11111111', a NAK response rejecting a request may be indicated by a bit pattern of '00000000', and an ND response indicating an unrecognizable or invalid request may be indicated by a bit pattern of '01010101'. In addition, ATN may be defined by various 8-bit sized bit patterns except for the bit patterns defined for the above ACK/NAK/ND responses. For example, ATN may be defined as '00001111', '11110000', '10101010', '10110110', '00110011', or '01001001'. However, this is merely an example, and the ATN may be configured with various bit patterns.

Since the ATN bit pattern response generally informs the wireless power receiver that there is a message to be transmitted by the wireless power transmitter, the wireless power receiver, upon receiving the ATN bit pattern response, transmits a DSR (poll) packet to the wireless power transmitter to specifically recognize for what reason the wireless power transmitter has sent the ATN bit pattern response (S2420).

Here, the wireless power transmitter transmits a packet requesting re-ping for Q factor measurement to the wireless power receiver in response to the DSR (poll) packet (S2425). This is to perform power calibration again according to the change in coupling or foreign object insertion. Step S2425 corresponds to an operation requested by the wireless power transmitter to the wireless power receiver so that the wireless power receiver stops re-ping or power transfer.

The wireless power receiver receiving the packet requesting re-ping transmits an end power transfer packet (EPT/fod) for FOD for Q factor measurement to the wireless power transmitter (S2430). The EPT packet may be set to a value (e.g., '0x0B') indicating FOD or a value indicating restart of power transfer.

When the EPT packet is received, the wireless power transmitter resets the wireless power receiver according to the value indicated by the EPT packet and performs Q measurement and FOD (S2435). During the process of step S2435, the wireless power receiver may indicate that it is charging on a user interface although wireless power is not supplied to the wireless power receiver. The FOD in step S2435 may correspond to the pre-power FOD operation. If the wireless power transmitter fails to receive the EPT packet within a certain time in step S2430, the wireless power transmitter may reset the wireless power receiver and perform the entire FOD procedure again.

In this case, the wireless power transmitter may suppress a step of transmitting an analog ping signal in the selection step and a step of detecting and identifying the wireless power receiver (a beep signal indicating detection/identification may be output here).

Here, power calibration may be performed again. In this case, in the present embodiment, the wireless power transmitter may include a step of performing FOD through Q measurement and new power calibration again.

The new power calibration in this case may include the power calibration described in the embodiment of FIGS. 16 to 21. The new power calibration in this case may include the power calibration described in the embodiments of FIGS. 16 to 21. The new power calibration of the wireless power transmitter includes a power calibration operation of the wireless power transmitter according to the embodiments of FIGS. 16 to 21, and the new power calibration of the wireless power reception device according to the embodiments of FIGS. 16 to 21 It may include a power calibration operation of the wireless power receiver. Accordingly, additional power calibration according to the change in coupling is completed, and power calibration data such as a calibrated transmit power value and/or a calibrated received power value according to the new power calibration may be derived.

The wireless power transmitter in the embodiments according to FIG. 26 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, in the present embodiment, the operation of transmitting wireless power to the wireless power receiver in the power transfer step according to step S2400 may be performed by the power conversion unit 110. In addition, the operation of receiving RPP, CEP, etc., according to step S2405, the operation of detecting a change in coupling or foreign object insertion according to step S2410, the operation of transmitting a re-ping request packet according to step S2425, the operation of receiving an EPT packet according to step S2430, and the operation for performing Q measurement and FOD according to S2435 may be performed by the communication/control unit 120.

In addition, the wireless power receiver in the embodiment according to FIG. 26 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, in this embodiment, the operation of receiving wireless power from the wireless power transmitter in the power transfer step according to step S2400 may be performed by the power pickup unit 210. In addition, the operation of generating and transmitting a packet such as RPP, CEP, etc., according to step S2405, the operation of receiving a re-ping request packet according to step S2425, and the operation of generating and transmitting the EPT packet according to step S2430 may be performed by the communication/control unit 220.

Figure 27:
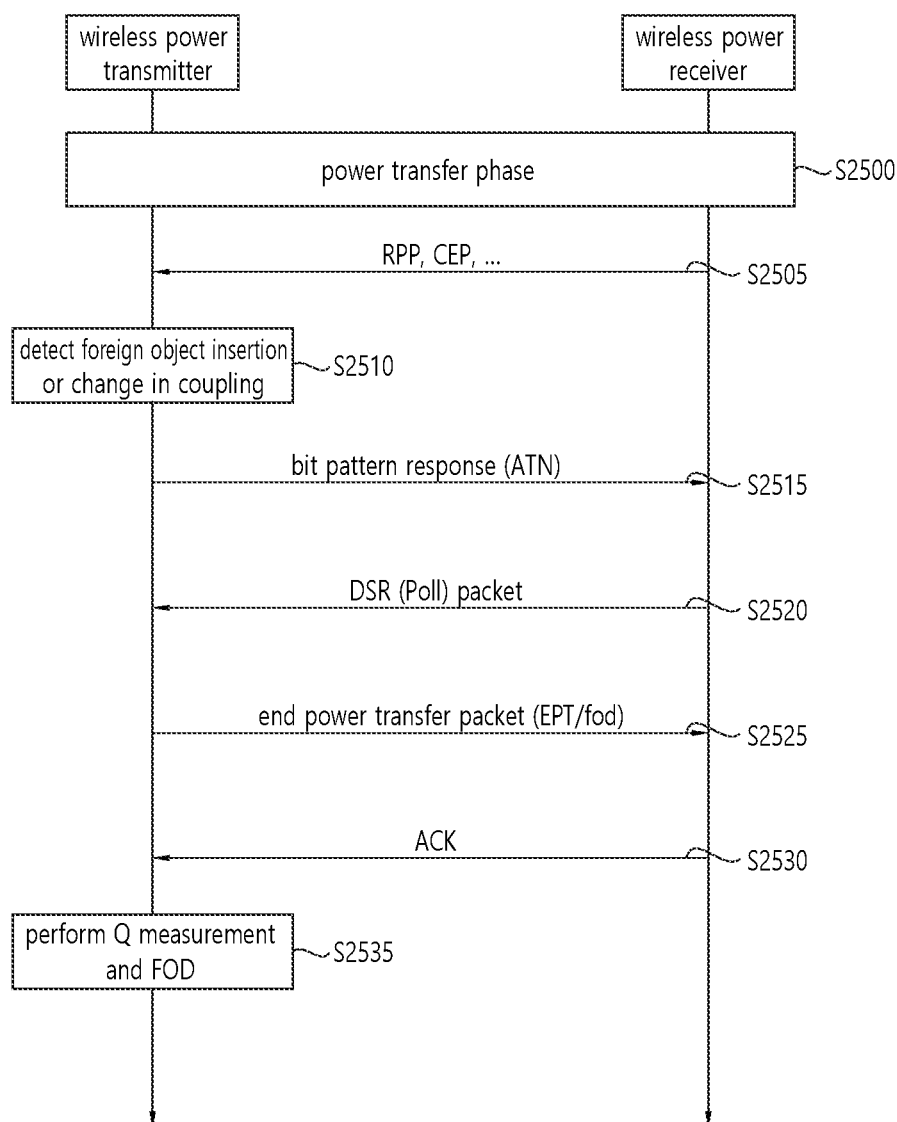
FIG. 27 is a flowchart illustrating a power calibration method based on a change in coupling or foreign object insertion according to another embodiment.

FIG. 27 is a flowchart illustrating a power calibration method based on a change in coupling or foreign object insertion according to another embodiment.

Referring to FIG. 27, steps S2500 to S2520 are the same as steps S2400 to S2420, respectively. However, in the embodiment of FIG. 27, since the wireless power transmitter is an initiator of re-ping, the wireless power transmitter transmits an EPT packet instead of sending a power-related request packet to the wireless power receiver (S2425) and receive ACK from the wireless power receiver (S2530) to enter the power calibration phase.

In step S2525, the EPT packet for FOD generated by the wireless power receiver may be, for example, EPT/fod or EPT/rst or EPT/rep ((0x0B—EPT/rst—restart; use to restart the power transfer/0x0C—EPT/rep—re-ping; use to restart the power transfer after a specified delay (the re-ping delay)). Here, the EPT/fod may indicate a reason for pre-power FOD and additional power calibration. That is, the wireless power receiver may use the EPT/fod value when the necessity of the pre-power FOD and additional power calibration is recognized from internal observation.

The EPT/rst may cause the wireless power transmitter and/or the wireless power receiver to cause noise due to restart and may give the user an undesirable experience. EPT/rep may be used To provide a better wireless charging service to the user. That is, the wireless power receiver may transmit EPT/rep packets to the wireless power transmitter.

The wireless power transmitter may perform the entire FOD procedure again (Q factor based FOD and APLD) to detect a foreign object or perform power calibration (S2535). As an example, re-execution of the FOD procedure includes a process in which the wireless power transmitter removes power and restarts from Q measurement to a digital ping step. As another example, power calibration includes an operation of updating the power calibration set before the change in coupling.

While re-ping is performed, the wireless power transmitter may suppress a step of transmitting an analog ping signal in the selection step and a step of detecting and identifying the wireless power receiver (a beep signal indicating detection/identification may be output here).

If the wireless power receiver receives the digital ping signal earlier or later than the re-ping time, this may indicate that the wireless power receiver overlying the wireless power transmitter has been replaced by the user. Accordingly, the wireless power receiver may perform a default UX (a message indicating a beep signal or initiation of wireless charging to the user).

The wireless power transmitter and the wireless power receiver may restart the power transfer based on the result of the FOD. Meanwhile, after restarting power transfer based on the EPT/fod packet, the wireless power transmitter and the wireless power receiver may immediately enter the power transfer phase if it is determined that there is no foreign object. The method of entering the power transfer phase may be different depending on a case where the user wants to enter the power transfer phase immediately after restarting and a case where a full protocol is to be performed. Specifically, the operation of entering the power transfer phase may be defined as follows from the standpoint of the wireless power receiver and the wireless power transmitter.

First, the operation of the wireless power receiver is as follows.

As an example, the wireless power receiver may transmit RP/0 as a first packet to the wireless power transmitter when it is desired to enter the power transfer phase immediately after restarting. After the restart, initial power calibration may be performed at the power transfer phase, and the previous power contract may be effectively preserved.

As another example, when attempting to perform a full protocol after restart, the wireless power receiver may transmit a signal strength (SS) packet as a first packet to the wireless power transmitter. After the restart, initial power calibration may be performed in the power transfer phase and the previous power contract may be effectively preserved.

Next, the operation of the wireless power transmitter is as follows.

The wireless power transmitter may have a different procedure to enter the power transfer phase according to an initial packet of the wireless power receiver.

As an example, when the wireless power transmitter receives a signal strength (SS) packet as a first packet from the wireless power receiver, the wireless power transmitter performs a full protocol.

The wireless power transmitter in the embodiments according to FIG. 27 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, in the present embodiment, the operation of transmitting wireless power to the wireless power receiver in the power transfer step according to step S2500 may be performed by the power conversion unit 110. In addition, the operation of receiving RPP, CEP, etc., according to step S2505, the operation of detecting a change in coupling and/or foreign object insertion according to step S2510, the operation of generating and transmitting a bit pattern response according to step S2514, the operation of receiving the DSR packet according to step S2520, the operation of transmitting EPT packet according to step S2525, the operation of receiving an ACK response according to step S2530, and the operation for performing Q measurement and FOD according to S2535 may be performed by the communication/control unit 120.

In addition, the wireless power receiver in the embodiment according to FIG. 27 corresponds to the wireless power reception device, the wireless power receiver, or the power reception part disclosed in FIGS. 1 to 15. Accordingly, the operation of the wireless power receiver in this embodiment is implemented by one or a combination of two or more of the components of the wireless power receiver in FIGS. 1 to 15. For example, in this embodiment, the operation of receiving wireless power from the wireless power transmitter in the power transfer step according to step S2500 may be performed by the power pickup unit 210. In addition, the operation of generating and transmitting a packet such as RPP, CEP, etc., according to step S2505, the operation of a bit pattern response according to step S2515, the operation of generating and transmitting a DSR packet according to step S2520, the operation of receiving the EPT packet according to step S2525, and the operation of transmitting ACK according to step S2530 may be performed by the communication/control unit 220.

Hereinafter, a method of configuring a power calibration curve according to another embodiment will be described.

The power calibration curve should be able to represent a charging profile of the wireless power receiver. In one aspect, the power calibration curve may include multiple segments. In another aspect, each segment of the power calibration curve may represent a charging profile of a specific power range at a specific operating point of the wireless power receiver.

Each segment of the power calibration curve may be represented by a received power value of the wireless power receiver. For example, each segment of the power calibration curve may be represented by a power level of the first received power RP/1, the second received power RP/2, and the third received power RP/3 of the wireless power receiver. In one aspect, the initial calibration curve is based on two points. Here, the two points may be determined by the first received power RP/1 and the second received power RP/2. In another aspect, an extended calibration curve is based on multiple points of double points or greater. Here, the multiple points may be determined by at least two of the first received power RP/1, the second received power RP/2, and the third received power RP/3. That is, one or multiple third reception powers RP/3 may be used to extend the initial calibration curve. In another aspect, a relationship of RP/1<=RP/2<=RP/3 may be established.

Figure 28:
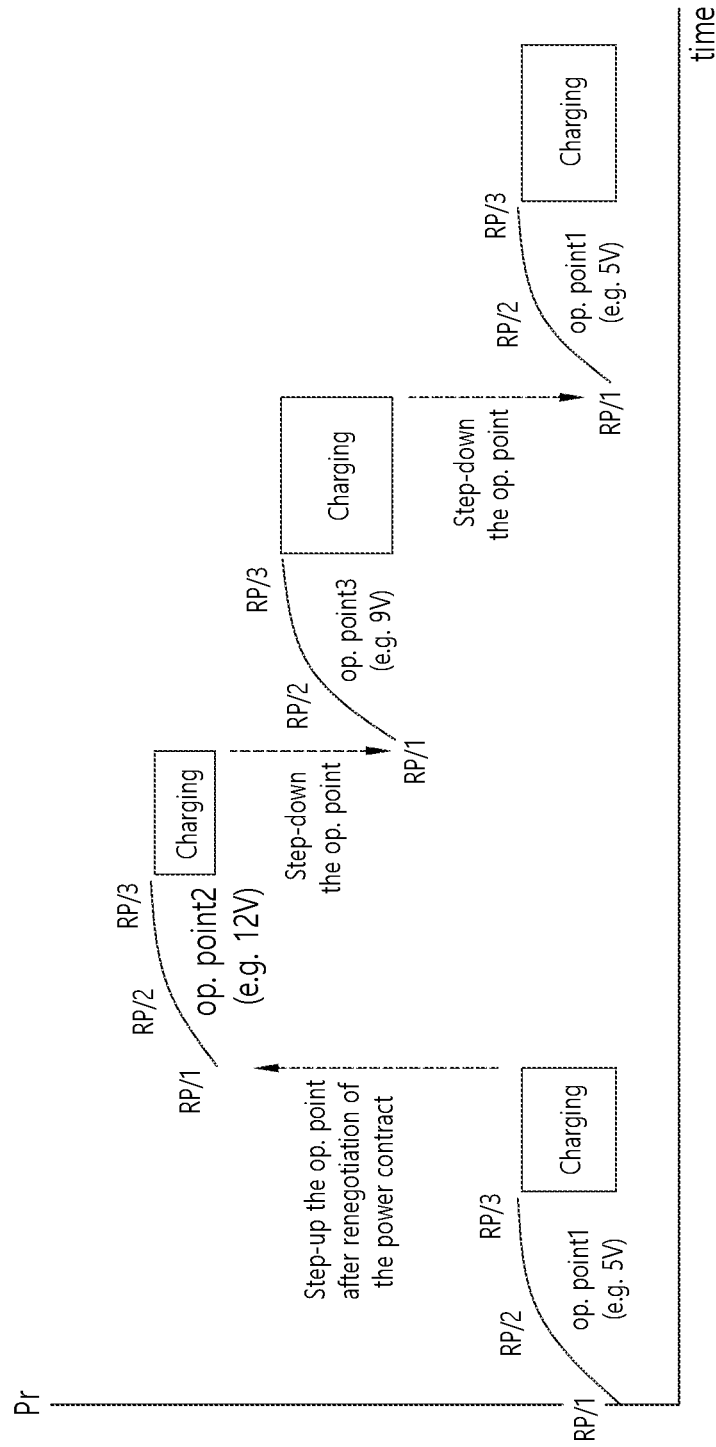
FIG. 28 is a power transfer characteristic or calibration curve according to another embodiment of the present disclosure.

FIG. 28 is a power transfer characteristic or calibration curve according to another embodiment of the present disclosure.

Referring to FIG. 28, when the wireless power receiver operates in a different operating mode (e.g., when the wireless power receiver operates at a different operating point), the wireless power receiver may transmit the first received power packet RP/1, the second received power packet RP/2, and the third received power packet RP/3 to the wireless power transmitter. In other words, the wireless power transmitter may receive the first received power packet RP/1, the second received power packet RP/2, and the third received power packet RP/3 from the wireless power receiver when the wireless power receiver changes its operating points (op. points 1, 2, 3).

An example of a time point at which the wireless power receiver changes its operating point may include an initiation time point of the power transfer phase. Another example of a time point at which the wireless power receiver changes its operating point may include a time point of stepping up the operating point after renegotiation of the power transfer contract (e.g., after successful authentication). Another example of a time point at which the wireless power receiver changes its operating point may include a time point of stepping down the operating point during the power transfer phase.

A format of the received power packet according to the present embodiment may be the same as the format shown in FIG. 17. However, the mode field may indicate 0 to 4 as shown in [Table 9] below, and the received power packets of modes '000', '001', '010', '011', and '100' are RP/It may be represented by RP/0, RP/1, RP/2, RP/3, and RP/4, respectively.

TABLE 9

| Mode | Indication contents |
| --- | --- |
| '000' | Normal value; response requested |
| '001' | First calibration data point; response requested |
| '010' | Second calibration data point or additional calibration data point; response requested |
| '011' | Extended calibration data point; response requested |
| '100' | Normal value; no response requested |

Protocol for Initial Power Calibration

The wireless power transmitter and/or the wireless power receiver may perform initial power calibration at each operating point using a plurality of received power packets. Here, the plurality of received power values may include the first received power packet RP/1 and the second received power packet RP/2. Each time the operating point of the wireless power receiver is changed, the wireless power transmitter and/or the wireless power receiver may derive a new calibration curve by new receiving power packets RP/1 and RP/2.

Specifically, the wireless power receiver transmits the first received power packet RP/1 and the second received power packet RP/2 at the first operating point (op. point 1). After receiving the first received power packet RP/1 and the second received power packet RP/2, the wireless power transmitter constructs a first power calibration curve at the first operating point (op. point 1) based on the first received power packet RP/1 and the second received power packet RP/2. The first power calibration curve becomes a first segment of the calibration curve.

Thereafter, the wireless power receiver transmits the first received power packet RP/1 and the second received power packet RP/2 at the second operating point (op. point 2). After receiving the first received power packet RP/1 and the second received power packet RP/2, the wireless power transmitter constructs a second power calibration curve at the second operating point (op. point 2) based on the first received power packet RP/1 and the second received power packet RP/2. The second power calibration curve becomes a second segment of the calibration curve.

Thereafter, the wireless power receiver transmits the first received power packet RP/1 and the second received power packet RP/2 at the third operating point (op. point 3). After receiving the first received power packet RP/1 and the second received power packet RP/2, the wireless power transmitter constructs a third power calibration curve at the third operating point (op. point 3) based on the first received power packet RP/1 and the second received power packet RP/2. The third power calibration curve becomes a third segment of the calibration curve.

FIG. 28 shows an example in which the power calibration curves are configured at three operating points (op. points 1, 2, and 3), respectively, but as the operating points of the wireless power receiver are changed, three or more power calibration curves may be constructed or three or less power calibration curves may be constructed.

Protocol for Extending Initial Power Calibration Curve

The wireless power transmitter and/or the wireless power receiver may derive an extended initial calibration curve at each operating point using the third received power packet RP/3.

The wireless power receiver may transmit a series of or multiple RP/3 to the wireless power transmitter so that the wireless power transmitter may extend the power calibration curve, each time the initial power calibration curve at the respective operating points (op. points 1, 2, and 3) needs to be extended.

Specifically, the wireless power receiver transmits the first received power packet RP/1 and the second received power packet RP/2 at the first operating point (op. point 1) and the wireless power transmitter constructs a first power calibration curve based on the first received power packet RP/1 and the second received power packet RP/2, and thereafter, the wireless power receiver transmits the third received power packet RP/3 to the wireless power transmitter. The wireless power transmitter is configured to expand the first power calibration curve based on the received third received power packet RP/3. The wireless power transmitter extends to a power calibration curve connecting the first power calibration curve to estimated received power values of the first received power packet RP/1 and the second received power packet RP/2 and connecting estimated received power values of the second received power packet RP/2 and the third received power packet RP/3 (see FIG. 17).

The wireless power receiver may transmit the third received power packet RP/3 to the wireless power transmitter even at the second operating point (op. point 2) and/or the third operating point (op. point 3), and the wireless power transmitter may extend the second power calibration curve and/or the third power calibration curve by receiving the third received power packet RP/3 according to each operating point.

According to an embodiment, the wireless power transmitter and/or the wireless power receiver may derive an extended initial calibration curve at each operating point using the second received power packet RP/2 instead of the third received power packet RP/3. That is, each time the initial power calibration curve at each operating point (op. point 1, 2, and 3) needs to be extended, the wireless power receiver additionally transmits a series of or multiple RP/2 to the wireless power transmitter so that the wireless power transmitter may extend the power calibration curve.

According to an embodiment, the second received power packet RP/2 may be referred to as an additional received power packet, and the third received power packet RP/3 may be referred to as an extended received power packet.

Figure 29:
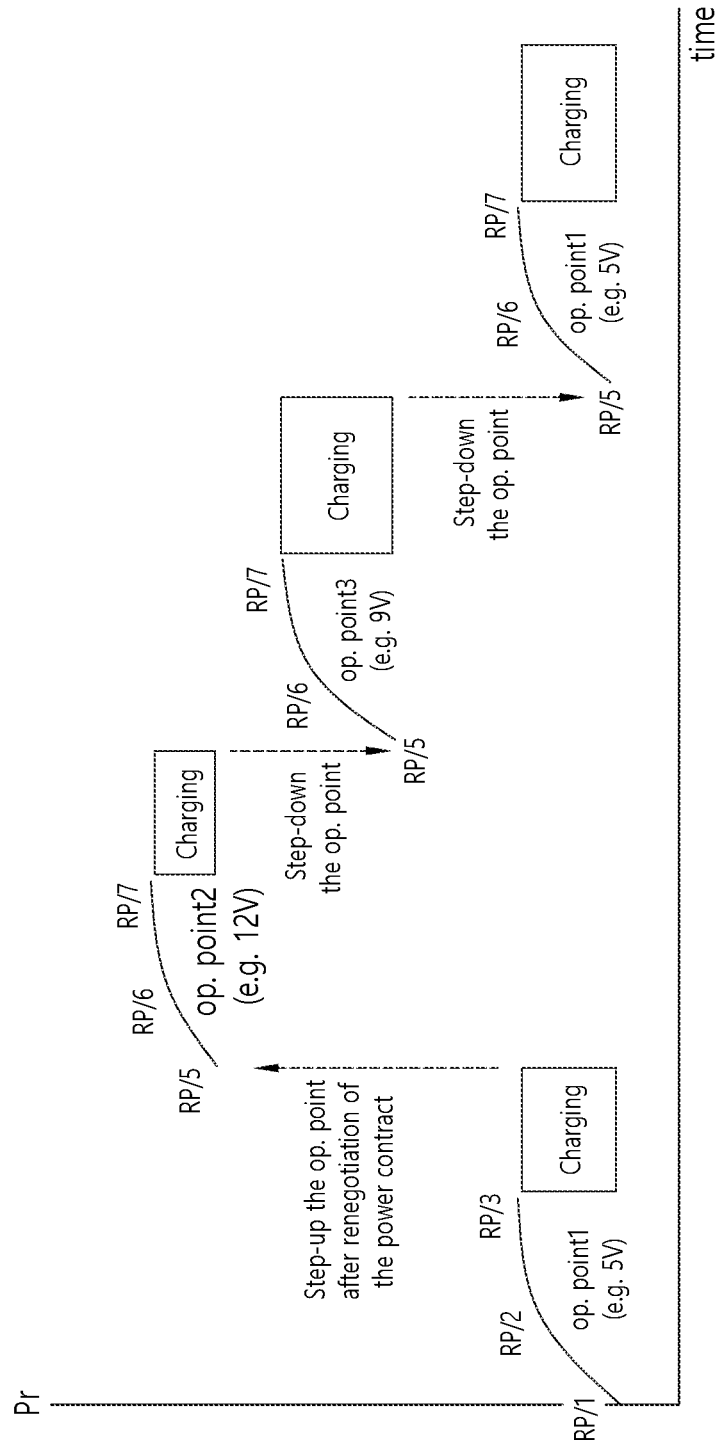
FIG. 29 is a power transfer characteristic or calibration curve according to another embodiment of the present disclosure.

FIG. 29 is a power transfer characteristic or calibration curve according to another embodiment of the present disclosure.

Referring to FIG. 29, a first segment (first power calibration curve) of the calibration curve may be defined by RP/1, RP/2, and RP/3. In one aspect, the wireless power transmitter and/or wireless power receiver may use two points based on RP/1 and RP/2 to derive or calculate the initial calibration curve of the first power calibration curve. In another aspect, the wireless power transmitter and/or wireless power receiver may use RP/3 to derive or calculate an extended calibration curve of the first power calibration curve. Here, one or multiple RP/3 may be used to extend the initial calibration curve of the first power calibration curve. In addition, a relationship of RP/1<=RP/2<=RP/3 may be established.

A second segment of the calibration curve may be determined or defined by received power packets RP of a plurality of modes different from the received power packets RP used to determine the first segment. As an example, a next segment of the calibration curve may be defined by a fifth received power packet RP/5, a sixth received power packet RP/6, and a seventh received power packet RP/7. In one aspect, the wireless power transmitter and/or wireless power receiver may use two points based on RP/5 and RP/6 to derive or calculate an initial calibration curve of the second segment (second power calibration curve). In another aspect, the wireless power transmitter and/or wireless power receiver may use the seventh received power packet RP/7 to derive or calculate an extended calibration curve of the second power calibration curve. Here, one or multiple seventh received power packets RP/7 may be used to extend the initial calibration curve of the second power calibration curve. In addition, a relationship of RP/5<=RP/6<=RP/7 may be established.

As shown in FIG. 29, the fifth received power packet RP/5, the sixth received power packet RP/6, and the seventh received power packet RP/7 may be used to configure segments (power calibration curve) of the third segment (third power calibration curve) or higher.

A format of the received power packet according to the present embodiment may be the same as the format shown in FIG. 17. However, the mode field may indicate 0 to 7 as shown in [Table 10] below, and received power packets of the modes '000', '001', '010', '011', '100', '101', '110', and '111' may be represented by RP/0, RP/1, RP/2, RP/3, RP/4, RP/5, RP/6, and RP/7, respectively.

TABLE 10

| Mode | Indication contents |
|---|---|
| '000' | normal value |
| '001' | First calibration data point of first segment of calibration curve |
| '010' | Second calibration data point of first segment of calibration curve |
| '011' | Extended calibration data point of first segment of calibration curve |
| '100' | Normal value; no response requested |
| '101' | First calibration data point of second segment of calibration curve |
| '110' | Second calibration data point of second segment of calibration curve |
| '111' | Extended calibration data point of second segment of calibration curve |

That is, when the wireless power receiver changes its operating point, the wireless power receiver may use a first received power packet set (RP/1, RP/2, RP/3) or a second received power packet set (RP/5, RP/6, RP/7). In other words, the wireless power transmitter may receive the first received power packet set (RP/1, RP/2, RP3) or the second set of received power packets (RP/5, RP/6, RP/7) from the wireless power receiver when the wireless power receiver changes its operating points (op. Point 1, 2, 3). An example of a time point at which the wireless power receiver changes its operating point may include an initiation time point of the power transfer phase. Another example of a time point at which the wireless power receiver changes its operating point may include a time point of stepping up the operating point after renegotiation of the power transfer contract (e.g., after successful authentication). Another example of a time point at which the wireless power receiver changes its operating point may include a time point of stepping down the operating point during the power transfer phase.

Protocol for Initial Power Calibration

The wireless power transmitter and/or the wireless power receiver may perform initial power calibration at each operating point using a plurality of received power packets. Here, the plurality of received power values may include the first received power packet RP/1 and the second received power packet RP/2. Each time the operating point of the wireless power receiver is changed, the wireless power transmitter and/or the wireless power receiver may derive a new calibration curve by new receiving power packets RP/5 and RP/6.

Specifically, the wireless power receiver transmits the first received power packet RP/1 and the second received power packet RP/2 at the first operating point (op. point 1). After receiving the first received power packet RP/1 and the second received power packet RP/2, the wireless power transmitter constructs a first power calibration curve at the first operating point (op. point 1) based on the first received power packet RP/1 and the second received power packet RP/2. The first power calibration curve becomes a first segment of the calibration curve.

Thereafter, the wireless power receiver transmits the fifth received power packet RP/5 and the sixth received power packet RP/6 at the second operating point (op. point 2). After receiving the fifth received power packet RP/5 and the sixth received power packet RP/6, the wireless power transmitter constructs a second power calibration curve at the second operating point (op. point 2) based on the first received power packet RP/1 and the second received power packet RP/2. The second power calibration curve becomes a second segment of the calibration curve.

Thereafter, the wireless power receiver transmits the fifth received power packet RP/5 and the sixth received power packet RP/6 at the third operating point (op. point 3) again. After receiving the fifth received power packet RP/5 and the sixth received power packet RP/6, the wireless power transmitter constructs a third power calibration curve at the third operating point (op. point 3) based on the first received power packet RP/1 and the second received power packet RP/2. The third power calibration curve becomes a third segment of the calibration curve.

FIG. 29 shows an example in which the power calibration curves are configured at three operating points (op. points 1, 2, and 3), respectively, but as the operating points of the wireless power receiver are changed, three or more power calibration curves may be configured or three or less power calibration curves may be configured.

Protocol for Extending Initial Power Calibration Curve

The wireless power transmitter and/or the wireless power receiver may derive an extended initial calibration curve at each operating point using the third received power packet RP/3 or the seventh received power packet RP/7. The wireless power receiver may transmit a series of or multiple third received power packet RP/3 or the seventh received power packet RP/7 to the wireless power transmitter so that the wireless power transmitter may extend the power calibration curve, each time the initial power calibration curve at the respective operating points (op. points 1, 2, and 3) needs to be extended.

Specifically, the wireless power receiver transmits the first received power packet RP/1 and the second received power packet RP/2 at the first operating point (op. point 1) and the wireless power transmitter constructs a first power calibration curve based on the first received power packet RP/1 and the second received power packet RP/2, and thereafter, the wireless power receiver transmits the third received power packet RP/3 to the wireless power transmitter. The wireless power transmitter is configured to expand the first power calibration curve based on the received third received power packet RP/3. The wireless power transmitter extends to a power calibration curve connecting the first power calibration curve to estimated received power values of the first received power packet RP/1 and the second received power packet RP/2 and connecting estimated received power values of the second received power packet RP/2 and the third received power packet RP/3 (see FIG. 17).

The wireless power receiver may transmit the seventh received power packet RP/7 to the wireless power transmitter even at the second operating point (op. point 2) and/or the third operating point (op. point 3), and the wireless power transmitter may extend the second power calibration curve and/or the third power calibration curve by receiving the seventh received power packet RP/7 according to each operating point.

According to an embodiment, the first received power packet RP/1 and the fifth received power packet RP/5 may be referred to as first received power packets, the second received power packet RP/2 and the sixth received power packet RP/6 may be referred to as additional received power packets, and the third received power packet RP/2 and the seventh received power packet RP/7 may be referred to as extended received power packets.

Figure 30:
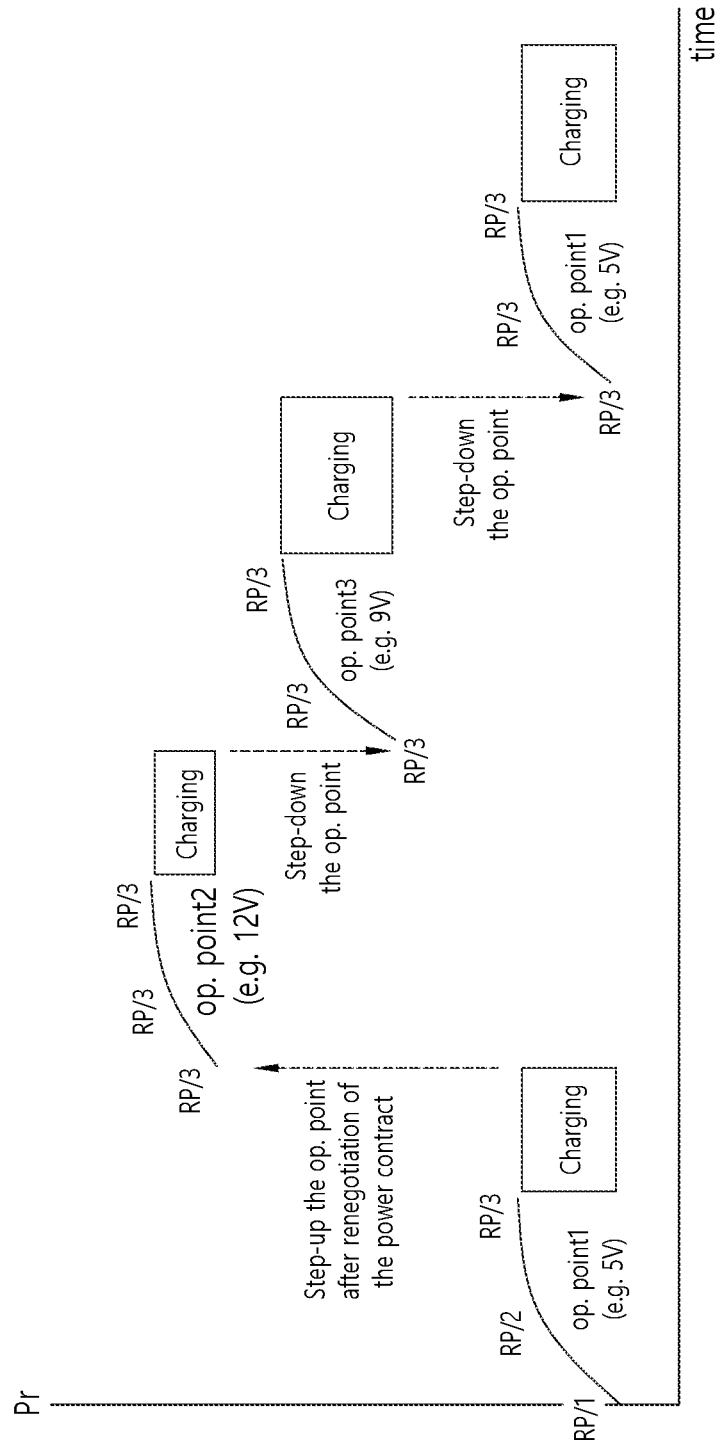
FIG. 30 is a power transfer characteristic or calibration curve according to another embodiment of the present disclosure.

FIG. 30 is a power transfer characteristic or calibration curve according to another embodiment of the present disclosure.

Referring to FIG. 30, a first segment (first power calibration curve) of the calibration curve may be defined by RP/1, RP/2, and RP/3. In one aspect, the wireless power transmitter and/or wireless power receiver may use two points based on RP/1 and RP/2 to derive or calculate the initial calibration curve of the first power calibration curve. In another aspect, the wireless power transmitter and/or wireless power receiver may use RP/3 to derive or calculate an extended calibration curve of the first power calibration curve. Here, one or multiple RP/3 may be used to extend the initial calibration curve of the first power calibration curve. In addition, a relationship of RP/1<=RP/2<=RP/3 may be established.

A next segment of the calibration curve may be determined or defined by RP/3. In one aspect, the wireless power transmitter and/or wireless power receiver may use two points based on two RP/3 to derive or calculate the initial calibration curve. In another aspect, the wireless power transmitter and/or wireless power receiver may use additional RP/3 to derive or calculate an extended calibration curve.

A format of the received power packet according to the present embodiment may be the same as the format shown in FIG. 17. The mode field may be as shown in [Table 8].

After the wireless power transmitter constructs the extended first power calibration curve by receiving the first received power packet RP/1, the second received power packet RP/2, and/or the third received power packet RP/3 from the wireless power receiver, the wireless power receiver may transmit the third received power packet RP/3 when changing its operating points. In other words, the wireless power transmitter may receive the third received power packet RP/3 from the wireless power receiver when the wireless power receiver changes its operating points (op. Point 1, 2, 3).

An example of a time point at which the wireless power receiver changes its operating point may include an initiation time point of the power transfer phase. Another example of a time point at which the wireless power receiver changes its operating point may include a time point of stepping up the operating point after renegotiation of the power transfer contract (e.g., after successful authentication). Another example of a time point at which the wireless power receiver changes its operating point may include a time point of stepping down the operating point during the power transfer phase.

Protocol for Initial Power Calibration

The wireless power transmitter and/or the wireless power receiver may perform initial power calibration at each operating point using a plurality of received power packets. Here, the plurality of received power values may include the first received power packet RP/1 and the second received power packet RP/2. Each time the operating point of the wireless power receiver is changed, the wireless power transmitter and/or the wireless power receiver may derive a new calibration curve by new receiving power packets RP/1 and RP/2.

Specifically, the wireless power receiver transmits the first received power packet RP/1 and the second received power packet RP/2 at the first operating point (op. point 1). After receiving the first received power packet RP/1 and the second received power packet RP/2, the wireless power transmitter constructs a first power calibration curve at the first operating point (op. point 1) based on the first received power packet RP/1 and the second received power packet RP/2. The first power calibration curve becomes a first segment of the calibration curve.

Thereafter, the wireless power receiver sequentially transmits two third received power packet RP/3 at the second operating point (op. point 2). After receiving the two third received power packets RP/3, the wireless power transmitter constructs a second power calibration curve at the second operating point (op. point 2) based on the received power packets RP/3. The second power calibration curve becomes a second segment of the calibration curve.

Thereafter, the wireless power receiver sequentially transmits two third received power packet RP/3 at the third operating point (op. point 3). After receiving the two third received power packets RP/3, the wireless power transmitter constructs a third power calibration curve at the third operating point (op. point 3) based on the received power packets RP/3. The third power calibration curve becomes a third segment of the calibration curve.

FIG. 30 shows an example in which the power calibration curves are configured at three operating points (op. points 1, 2, and 3), respectively, but as the operating points of the wireless power receiver are changed, three or more power calibration curves may be configured or three or less power calibration curves may be configured.

Protocol for Extending Initial Power Calibration Curve

The wireless power transmitter and/or the wireless power receiver may derive an extended initial calibration curve at each operating point using the third received power packet RP/3.

The wireless power receiver may transmit a series of or multiple RP/3 to the wireless power transmitter so that the wireless power transmitter may extend the power calibration curve, each time the initial power calibration curve at the respective operating points (op. points 1, 2, and 3) needs to be extended.

Specifically, the wireless power receiver transmits the first received power packet RP/1 and the second received power packet RP/2 at the first operating point (op. point 1) and the wireless power transmitter constructs a first power calibration curve based on the first received power packet RP/1 and the second received power packet RP/2, and thereafter, the wireless power receiver transmits the third received power packet RP/3 to the wireless power transmitter. The wireless power transmitter is configured to expand the first power calibration curve based on the received third received power packet RP/3. The wireless power transmitter extends to a power calibration curve connecting the first power calibration curve to estimated received power values of the first received power packet RP/1 and the second received power packet RP/2 and connecting estimated received power values of the second received power packet RP/2 and the third received power packet RP/3 (see FIG. 17).

The wireless power receiver may transmit the third received power packet RP/3 to the wireless power transmitter even at the second operating point (op. point 2) and/or the third operating point (op. point 3), and the wireless power transmitter may extend the second power calibration curve and/or the third power calibration curve by receiving the third received power packet RP/3 according to each operating point.

According to an embodiment, the second received power packet RP/2 may be referred to as an additional received power packet, and the third received power packet RP/3 may be referred to as an extended received power packet.

Hereinafter, a method of constructing a power calibration curve according to another embodiment will be described.

Figure 31:
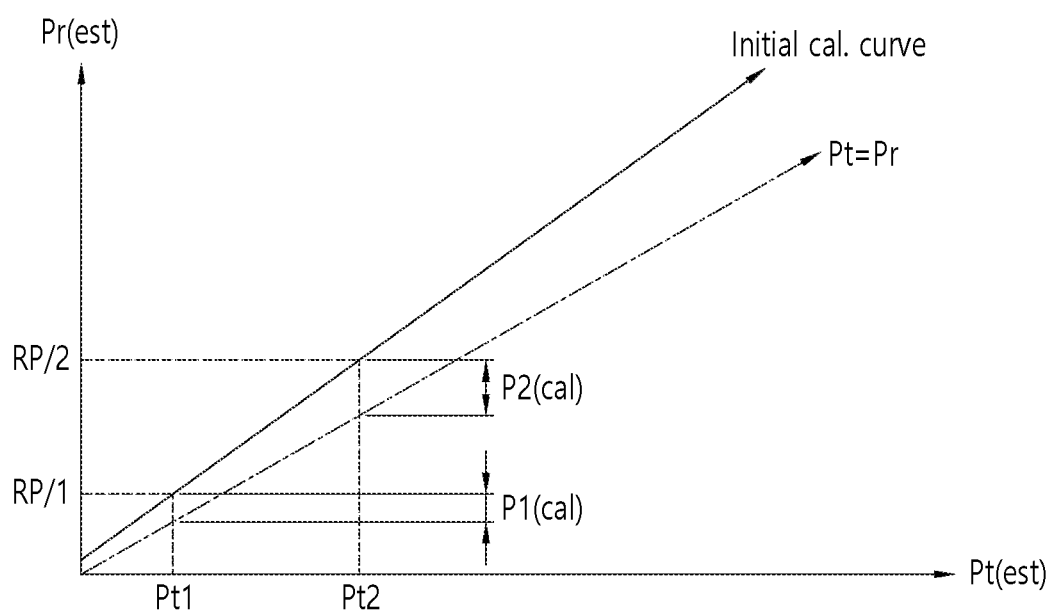
FIG. 31 is a graph illustrating an initial power calibration curve.

FIG. 31 is a graph illustrating an initial power calibration curve.

Referring to FIG. 31, the wireless power receiver may wirelessly transmit at least the first received power packet RP/1 and the second received power packet RP/2 when constructing an initial calibration curve. In other words, the wireless power transmitter may receive at least RP/1 and RP/2 from the wireless power receiver when the wireless power receiver constructs the initial calibration curve.

An example of a time point at which the wireless power receiver constructs the initial calibration curve may include an initiation time point of the power transfer phase.

It is assumed that the x-axis and y-axis are a measured transmitted power value (Pt(est)) and a measured received power value (Pr(est)), respectively, an actual transmitted power value is Pt, and an actual received power value is Pr. In this case, [Equation 7] below is established.

$$Pt(est)+\delta Pt=Pt=Pr=Pr(est)-\delta Pr$$

Here, δPt is an error between the actual transmitted power value and the measured transmitted power value, and δPr may be an error between the actual received power value and the measured received power value. This is a case where a foreign object is not detected when pre-power FOD is used.

Based on [Equation 7], the calibrated power value (cal) may be calculated by [Equation 8] below.

$$(cal)=\delta Pt+\delta Pr=Pr(est)-Pt(est) \qquad \text{[Equation 8]}$$

Therefore, when RP/1 and RP/2 are substituted into [Equation 8], the calibrated power value may be expressed by [Equation 9], respectively.

$$P1(cal)=RP/1-Pt1(est) \qquad \text{[Equation 9]}$$

$$P2(cal)=RP/2-Pt2(est)$$

Figure 32:
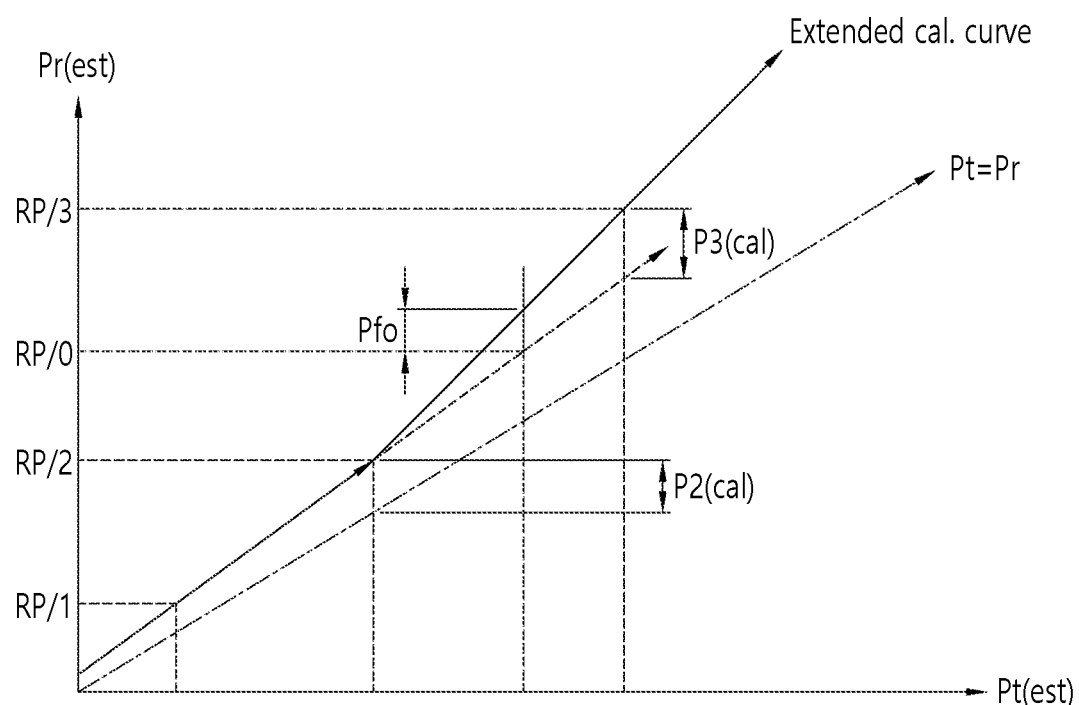
FIG. 32 is a graph illustrating an extended power calibration curve.

FIG. 32 is a graph illustrating an extended power calibration curve.

Referring to FIG. 32, after the initial calibration curve is configured based on Equations 7 to 9, the wireless power transmitter and the wireless power receiver may extend the initial calibration curve based on a changed event (e.g., change in operating points of the wireless power receiver). For example, when a specific event related to the wireless power receiver occurs, the wireless power receiver may transmit the third received power packet RP/3 to the wireless power transmitter. Here, the wireless power transmitter may configure an extended calibration curve by extending the initial calibration curve using RP/3. In FIG. 32, it can be seen that the gradients of the calibration curves before and after P2(cal) are changed. That is, the gradient before P2(cal) corresponds to the initial calibration curve and the gradient after P2(cal) corresponds to the extended calibration curve.

When Equation 9 is applied to RP/3 as it is, an additional calibrated power value may be derived as shown in Equation 10.

$$P3(cal)=RP/3-Pt3(est) \qquad \text{[Equation 10]}$$

Meanwhile, by taking RP/3, which is located above the existing (or initial) calibration curve section (or range), as a new calibration point, foreign object detectability may be improved.

As an example, when the RP/3 exceeds the range of the existing calibration curve, the existing calibration curve may be extended or changed.

As another example, when the RP/3 is lower than the range of the existing calibration curve, the existing calibration curve may be maintained or pre-power FOD may be performed according to more detailed conditions.

For example, the wireless power transmitter may maintain the existing calibration curve or perform pre-power FOD according to a result of comparing the Pfo derived by Equation 11 below and the threshold value TH.

$$Pfo=\{Pt(est)+Pcal\})-Pr(est) \qquad \text{[Equation 11]}$$

When the Pfo is less than the threshold value, it is assumed that a foreign object does not exist and the wireless power transmitter and/or the wireless power receiver may maintain the existing calibration curve.

Meanwhile, when the Pfo is greater than or equal to the threshold value, it is estimated that there is a high possibility of foreign object being present, and the wireless power transmitter may perform an operation of confirming the existence of the foreign object by performing pre-power FOD. A specific operation thereof is illustrated in FIG. 33.

Figure 33:
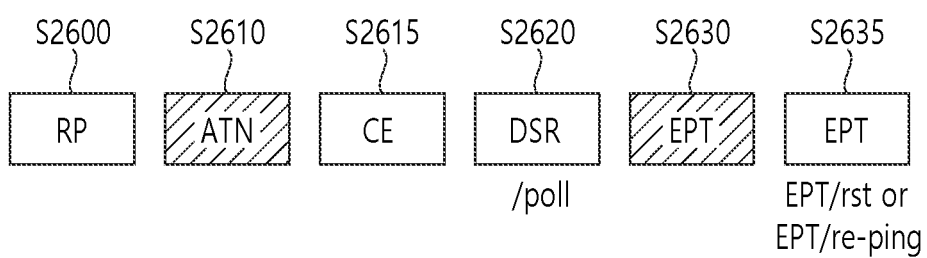
FIG. 33 shows a method of performing FOD when Pfo is greater than or equal to a threshold value.

FIG. 33 shows a method of performing FOD when Pfo is greater than or equal to a threshold value.

Referring to FIG. 33, the method includes transmitting, by the wireless power receiver, the third received power packet RP/3 (S2600), determining, by the wireless power transmitted which has received the third received power packet RP/3, that Pfo is equal to or greater than the threshold value and transmitting an ATN pattern (S2610), transmitting, by the wireless power receiver, a CE packet to the wireless power transmitter (S2615), transmitting, by the wireless power receiver, a DSR (poll) packet to the wireless power transmitter (S2620), transmitting, by the wireless power transmitter which has received the DSR (poll) packet, an end power transfer (EPT) (PTx) packet for requesting the wireless power receiver to transfer an EPT packet to the wireless power receiver in response to the DSR (poll) packet (S2630), and transmitting, by the wireless power receiver which has received the EPT (PTx) packet, to the wireless power transmitter (S2635).

When the EPT packet (EPT/rst or EPT/re-ping) is received from the wireless power receiver, the wireless power transmitter performs pre-power FOD, and when it is determined that there is no foreign object as a result of FOD detection, the wireless power transmitter may perform re-ping so that recalibration may be performed in the power transfer phase.

The EPT (PTx) packet of the wireless power transmitter may have the same format as the EPT packet of the wireless power receiver, and following values of the EPT code may be used.

0x00—EPT/nul-use if none of the other codes is appropriate.

0x01—Reserved

0x02—EPT/if-PTx internal fault; use if an internal logic error has been encountered.

0x03—EPT/ot-PTx over temperature; use if (e.g.) the battery temperature exceeds a limit 0x04—EPT/ov-PTx over voltage; use if a voltage exceeds a limit.

0x05—EPT/oc-PTx over current; use if the current exceeds a limit.

0x06—Reserve

0x08—Reserved.

0x0A—Reserved.

0x0B—EPT/rst-PTx restart; use to restart the power transfer.

NOTE PTx engages in FOD after stopping the power transfer and before restarting it. For details about this procedure 0x0C—EPT/rep-PTx re-ping; use to restart the power transfer after a specified delay (the re-ping delay).

NOTE. PTx should use this End Power Transfer Code only if it has verified that the PRx complies with version 1.3 or higher of the Qi Specification.

EPT/rfid-RFID/NFC card; use if an RFID/NFC card has been detected by PTx

Hereinafter, a method of constructing a power calibration curve according to another embodiment will be described.

Figure 34:
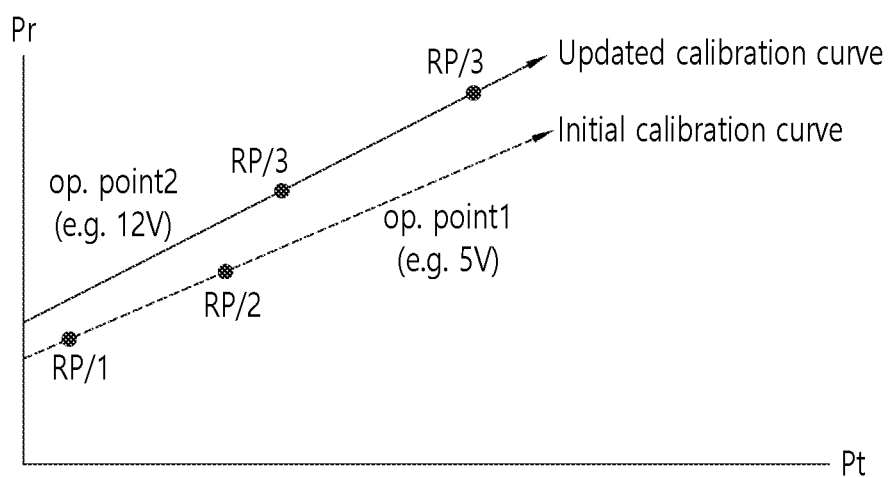
FIG. 34 is a graph illustrating a method of modeling a calibration curve according to an example.

FIG. 34 is a graph illustrating a method of modeling a calibration curve according to an example.

Referring to FIG. 34, the wireless power transmitter constructs an initial calibration curve (first power calibration curve) using a first received power packet RP/1 and a second received power packet RP/2 received from the wireless power receiver and constructs an updated calibration curve (second power calibration curve) by receiving a plurality of third received power packets RP/3 transmitted from the wireless power receiver while the wireless power receiver changes an operating point from a first operating point (op. point 1) to a second operating point (op. point 2). The second received power packet RP/2 may be referred to as an additional received power packet, and the third received power packet RP/3 may be referred to as an extended received power packet.

Figure 35:
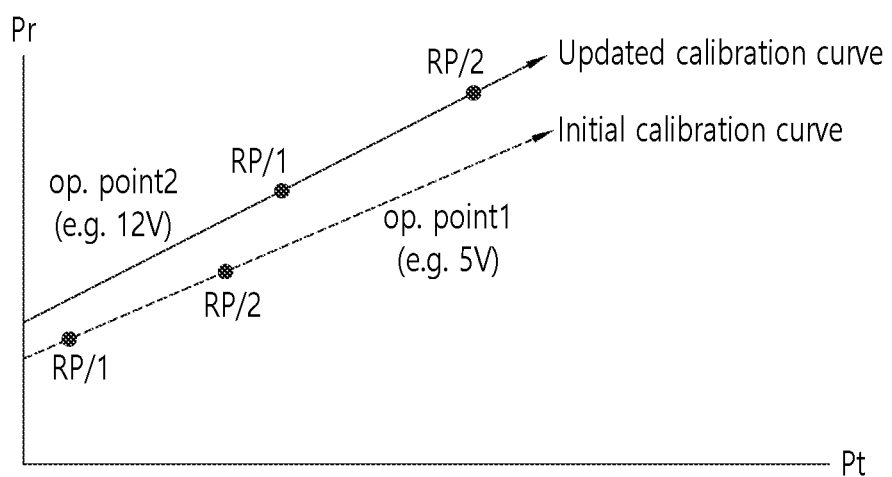
FIG. 35 is a graph illustrating a method of modeling a calibration curve according to another example.

FIG. 35 is a graph illustrating a method of modeling a calibration curve according to another example.

Referring to FIG. 35, the wireless power transmitter constructs an initial calibration curve (first power calibration curve) using a first received power packet RP/1 and a second received power packet RP/2 received from the wireless power receiver and constructs an updated calibration curve (second power calibration curve) by receiving the first received power packet RP/1 and the second received power packet RP/2 retransmitted from the wireless power receiver while the wireless power receiver changes an operating point from a first operating point (op. point 1) to a second operating point (op. point 2). The second received power packet RP/2 may be referred to as an additional received power packet.

Figure 36:
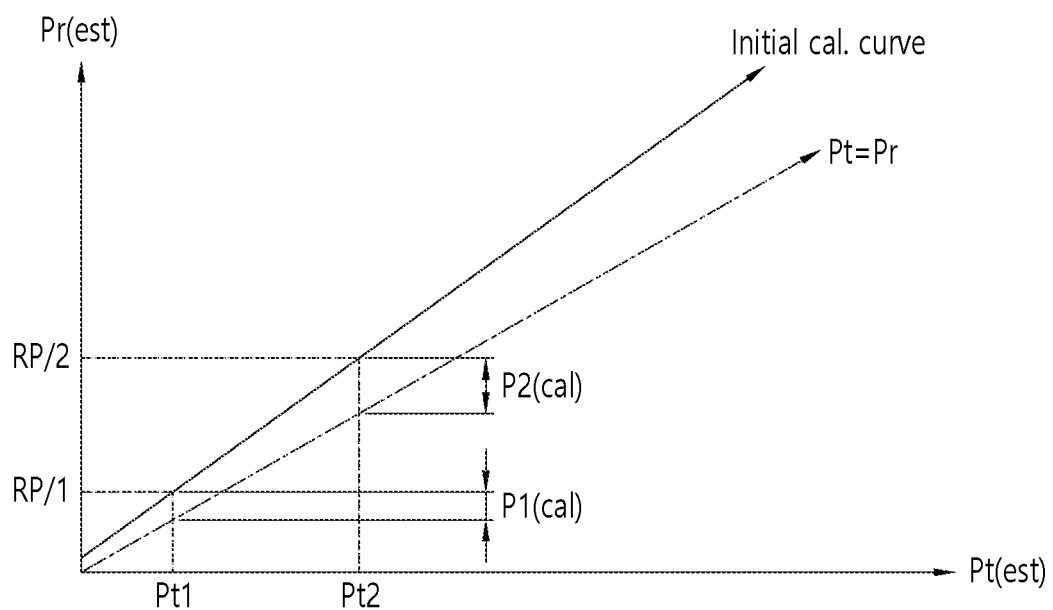
FIG. 36 is a diagram illustrating a method of configuring an initial calibration curve according to an embodiment.

FIG. 36 is a view for explaining a method of constructing an initial calibration curve according to an embodiment.

Referring to FIG. 36, in order to construct an initial calibration curve, the wireless power receiver may transmit the first received power packet RP/1 and the second received power packet RP/2. In other words, the wireless power transmitter may receive the first received power packet RP/1 and the second received power packet RP/2 from the wireless power receiver and construct an initial calibration curve based thereon. An example of a time point at which the wireless power receiver configures the initial calibration curve may include an initiation time point of the power transfer phase.

P(cal) (e.g., P1(cal) and/or P2(cal)) calculated based on Equation 7, Equation 8, Equation 9, etc., described in the embodiment of FIG. 31 described above are negative numbers, the values may be set to zero. This is because if the P(cal) is negative, an erroneous FOD event may be increased. Therefore, the initial calibration curve is configured in a manner that goes beyond an uncalibrated curve, so that it is possible to further improve detectability of a foreign object compared to the uncalibrated case.

According to FIG. 36, the initial calibration curve configured based on the first received power packet RP/1 and the second received power packet RP/2 may be interpreted as a linear function of gradient a.

The gradient a may be expressed by Equation 12 below.

$$a = \frac{Pr2(est) - Pr2(est)}{Pt2(est) - Pt1(est)} \qquad \text{[Equation 12]}$$

Meanwhile, when the wireless power transmitter identifies a danger of the foreign object using the calibration curve, the wireless power transmitter needs to check the presence of a foreign object using pre-power FOD.

The wireless power transmitter may calculate Pfo based on Equation 11 described in the embodiment of FIG. 31 described above and estimate the presence or absence of a foreign object based on the Pfo. As described in the embodiment of FIG. 31, the wireless power transmitter compares Pfo with the threshold value TH. If Pfo is less than the threshold value, the wireless power transmitter estimates that a foreign object does not exist and if Pfo is greater than or equal to the threshold value, the wireless power transmitter estimates that a foreign object exists, and performs a protocol to perform FOD as shown in FIG. 33.

Meanwhile, a calibration time-out for initial calibration may be defined. If the wireless power transmitter cannot transmit an ACK response within the calibration time-out for the second received power packet RP/2 received from the wireless power receiver, a power signal may be removed. The calibration time-out may be defined, for example, within a range of 13.5±1.5 seconds.

After the initial calibration curve is constructed, the calibration curve may be updated in a specific situation.

As an example, the wireless power receiver may update a y-intercept of the calibration curve by transmitting only a single calibration point to the wireless power transmitter using RP/3.

Figure 37:
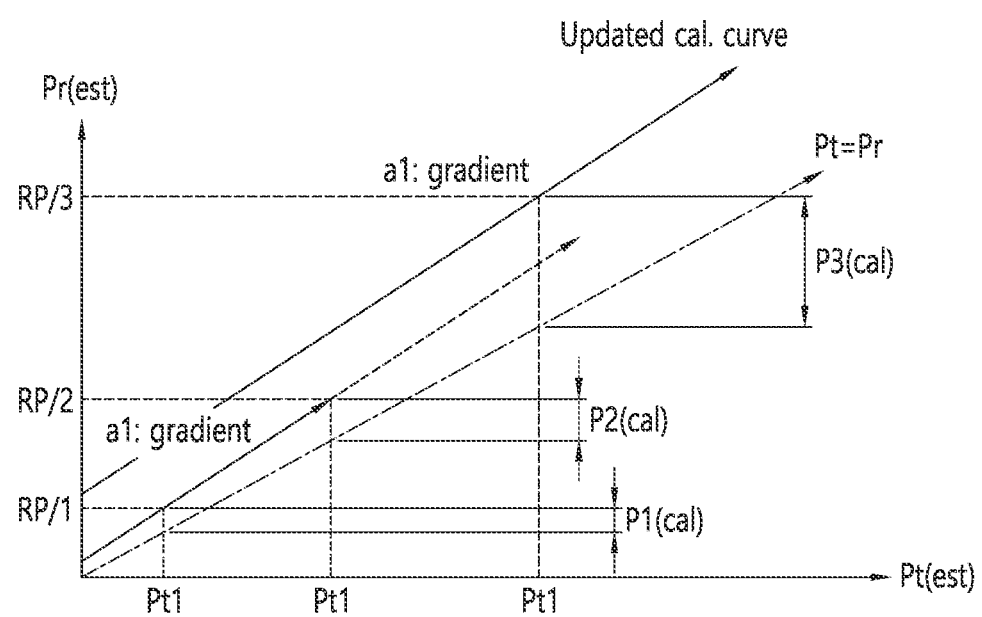
FIG. 37 shows a calibration curve obtained by updating a y intercept of an initial calibration curve.

FIG. 37 shows a calibration curve obtained by updating the y-intercept of the initial calibration curve.

Referring to FIG. 37, when a specific event related to the wireless power receiver (e.g., a change in operating point) occurs, the wireless power receiver may transmit a third received power packet RP/3 to the wireless power transmitter. The wireless power transmitter may construct a new calibration curve by updating the y-intercept while maintaining the gradient a1 of the initial calibration curve using the received single third received power packet RP/3. The wireless power receiver may continuously transmit the third received power packet RP/3 until ACK is received from the wireless power transmitter, and the wireless power transmitter may construct a new calibration curve using the third received power packet RP/3 that has transmitted the ACK among the third received power packets RP/3 transmitted by the wireless power receiver. The third received power packet RP/3 may be referred to as an extended received power packet.

When Equation 9 is applied to RP/3, an additionally calibrated power value (P3(cal)) may be derived as shown in Equation 10 described above.

As described above, in order to prevent an erroneous FOD event, if P(cal) is negative, the value may be set to 0. Therefore, the calibration curve updated by the third received power packet RP/3 is configured in a manner that exceeds the uncalibrated curve, so that it is possible to further improve detectability of a foreign object compared to the case where it is not calibrated.

The wireless power transmitter may calculate Pfo based on Equation 11 described in the embodiment of FIG. 31 described above and estimate the presence or absence of a foreign object based on Pfo. As described in the embodiment of FIG. 31, the wireless power transmitter compares Pfo with the threshold value TH. If Pfo is less than the threshold value, the wireless power transmitter estimates that there is no foreign object, and if Pfo is equal to or greater than the threshold value, the wireless power transmitter may estimate that there is a high possibility of a foreign object being present and perform a protocol for performing FOD as shown in FIG. 33.

An example of configuring an updated calibration curve using a single third received power packet RP/3 has been described, but the updated calibration curve may be configured using the first received power packet RP/1 instead of the third received power packet RP/3. That is, when a specific event (e.g., a change in operating point) occurs, the wireless power receiver additionally transmits the first received power packet RP/1 to the wireless power transmitter and configures a new calibration curve by updating the y-intercept, while maintaining the gradient a1 of the initial calibration curve, using the received first received power packet RP/1.

An example of configuring an updated calibration curve using the single third received power packet RP/3 has been described, but the updated calibration curve may be configured using the second received power packet RP/2 instead of the third received power packet RP/3. That is, when a specific event (e.g., a change in operating point) occurs, the wireless power receiver additionally transmits the second received power packet RP/2 to the wireless power transmitter and configures a new calibration curve by updating the y-intercept, while maintaining the gradient a1 of the initial calibration curve, using the received second received power packet RP/2. The second received power packet RP/2 may be referred to as an additional received power packet.

As another example, the wireless power receiver may update the gradient and the y-intercept of the calibration curve by transmitting a plurality of consecutive calibration points to the wireless power transmitter using RP/3.

Figure 38:
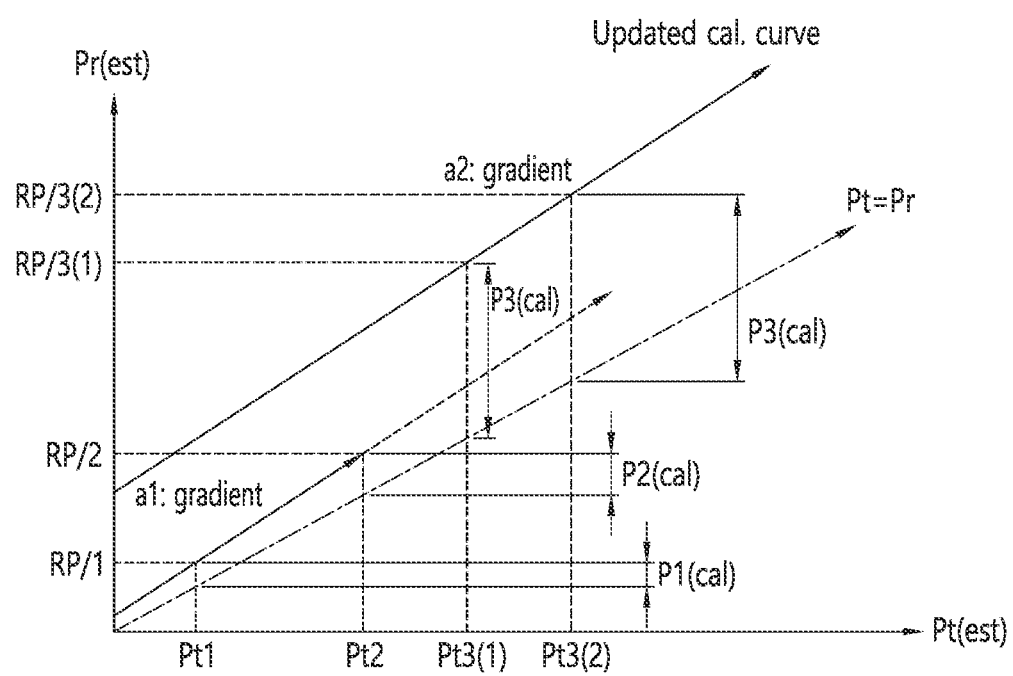
FIG. 38 shows a calibration curve obtained by updating a gradient and a y intercept of an initial calibration curve.

FIG. 38 shows a calibration curve obtained by updating the gradient and y-intercept of the initial calibration curve.

Referring to FIG. 38, when a specific event (e.g., a change in operating point) related to the wireless power receiver occurs, the wireless power receiver may transmit a plurality of consecutive third received power packets RP/3 to the wireless power transmitter. Here, the wireless power transmitter may construct a new calibration curve by updating the gradient and y-intercept of the initial calibration curve using the plurality of third received power packets RP/3.

As shown in FIG. 38, the new calibration curves may be configured to have a new gradient a2 and y intercept passing through (Pt3(1), RP3(1)) and (Pt3(2), RP3(2)).

When Equation 9 is applied to RP/3, an additional calibrated power value P3(cal) may be derived as shown in Equation 10 described above.

As described above, in order to prevent an erroneous FOD event, if P(cal) is negative, the value may be set to 0. Therefore, the calibration curve updated by the third received power packet RP/3 is configured in a manner that exceeds the uncalibrated curve, so that it is possible to further improve detectability of a foreign object compared to the case where it is not calibrated.

The wireless power transmitter may calculate Pfo based on Equation 11 described in the embodiment of FIG. 31 described above and estimate the presence or absence of a foreign object based on Pfo. As described in the embodiment of FIG. 31, the wireless power transmitter compares Pfo with the threshold value TH. If Pfo is less than the threshold value, the wireless power transmitter estimates that there is no foreign object, and if Pfo is equal to or greater than the threshold value, the wireless power transmitter may estimate that there is a high possibility of a foreign object being present and perform a protocol for performing FOD as shown in FIG. 33.

Meanwhile, a calibration time-out for updating the calibration curve may be defined.

The calibration time-out for updating the calibration curve may be defined as a time required for the wireless power transmitter to transmit an ACK response for the third received power packet RP/3 received next after the wireless power transmitter receives a first third received power packet RP/3 transmitted from the wireless power receiver to update the calibration curve. For example, the calibration time-out for updating the calibration curve may be defined within a range of 7±1.5 seconds.

An example of configuring the updated calibration curve using a plurality of third received power packets RP/3 has been described, but the updated calibration curve may be configured using new first received power packet RP/1 and second received power packet RP/2 instead of the plurality of third received power packets RP/3. That is, when a specific event (e.g., a change in operating point) occurs, the wireless power receiver may additionally transmit the first received power packet RP/1 and the second received power packet RP/2 to the wireless power transmitter, and the wireless power transmitter may construct a new calibration curve using the received new first received power packet RP/1 and the second received power packet RP/2. The second received power packet RP/2 may be referred to as an additional received power packet.

In this case, the calibration time-out for updating the calibration curve may be defined as a time required for the wireless power transmitter to transmit an ACK response for a second received power packet RP/2 received next after the wireless power transmitter receives the first received power packet RP/1 transmitted from the wireless power receiver to update the calibration curve.

The wireless power transmitter in the embodiment according to FIGS. 28 to 38 corresponds to the wireless power transmission device, the wireless power transmitter, or power transmission part disclosed in FIGS. 1 to 15. Accordingly, the operation of the wireless power transmitter in this embodiment is implemented by one or a combination of two or more of the components of the wireless power transmitter in FIGS. 1 to 15. For example, the operation of receiving the received power packet from the wireless power receiver, the operation of constructing a calibration curve, and the like may be performed by the communication/control unit 120.

The wireless power receiver in the embodiments according to FIGS. 28 to 38 corresponds to the wireless power reception device, the wireless power receiver, or power reception part disclosed in FIGS. 1 to 15. Accordingly, the operation of the wireless power receiver in this embodiment is implemented by one or a combination of two or more of the components of the wireless power transmitter in FIGS. 1 to 15. For example, the operation of transmitting the received power packet to the wireless power transmitter or the like may be performed by the communication/control unit 220.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earner.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power receiver comprising:
a power pickup configured to receive, from a wireless power transmitter, wireless power; and
a controller configured to:
transmit, to the wireless power transmitter, a control error packet including a control error value,
transmit, to the wireless power transmitter, a first received power packet related to power calibration at a first operating mode,
receive, from the wireless power transmitter in response to the first received power packet, ACK based on the control error value,
transmit, to the wireless power transmitter, a second received power packet related to power calibration at the first operating mode after receiving the ACK,
transmit, to the wireless power transmitter, a third received power packet related to power calibration at a second operating mode, and
transmit, to the wireless power transmitter, a fourth received power packet related to power calibration at the second operating mode.

2. The wireless power receiver of claim 1, wherein the controller configured to transmit the fourth received power packet after receiving ACK from the wireless power transmitter in response to the third received power packet.

3. The wireless power receiver of claim 2, wherein the controller configured to transmit a control error packet including a control error value and, receive the ACK from the wireless power transmitter based on the control error value.

4. The wireless power receiver of claim 1, wherein the first operating mode and the second operating mode have different operating points.

5. The wireless power receiver of claim 1, wherein each of the first received power packet and the third received power packet includes information on a power value received by the wireless power receiver when the wireless power receiver is under a light load condition, and each of the second received power packet and the fourth received power packet includes information on a power values received by the wireless power receiver when the wireless power receiver is under a connected-load condition.

6. The wireless power receiver of claim 1, wherein a value of a mode field included in the third received power packet is the same as a value of a mode field included in the first received power packet, and a value of a mode field included in the fourth received power packet is the same as a value of a mode field included in the second received power packet.

7. The wireless power receiver of claim 1, wherein a value of a mode field included in the third received power packet is the same as a value of a mode field included in the fourth received power packet.

8. A wireless power receiver comprising:
a power pickup configured to receive, from a wireless power transmitter, wireless power; and
a controller configured to:
transmit, to the wireless power transmitter, a control error packet including a control error value,
transmit, to the wireless power transmitter, a first received power packet of a first operating mode related to power calibration, and
receive, from the wireless power transmitter in response to the first received power packet, ACK based on the control error value,
transmit, to the wireless power transmitter, a second received power packet of the first operating mode related to power calibration after receiving the ACK, and
transmit, to the wireless power transmitter, a first received power packet of a second operating mode related to power calibration, and transmit, to the wireless power transmitter, a second received power packet of the second operating mode related to power calibration, wherein an operating mode is changed from the first operating mode to the second operating mode.

9. The wireless power receiver of claim 8, wherein the controller configured to transmit the second received power packet of the second operating mode after receiving ACK from the wireless power transmitter in response to the first received power packet of the second operating mode.

10. The wireless power receiver of claim 9, wherein the controller configured to transmit a control error packet including a control error value and, receive the ACK from the wireless power transmitter based on the control error value.

11. The wireless power receiver of claim 8, wherein the first operating mode and the second operating mode have different operating points.

\* \* \* \* \*